US011503951B2

(12) United States Patent
Hunt et al.

(10) Patent No.: US 11,503,951 B2
(45) Date of Patent: Nov. 22, 2022

(54) PORTABLE GRILLS

(71) Applicant: Weber-Stephen Products LLC, Palatine, IL (US)

(72) Inventors: Paul R. Hunt, Lake Zurich, IL (US); Karol Polaczek, Hickory Hills, IL (US); Karol Polaczek, Jr., Hickory Hills, IL (US); Jerzy Latocha, Chicago, IL (US); Jeffrey L. Crull, McFarland, WI (US); Simon Livingston-Jha, Madison, WI (US); William R. Mathias, Middleton, WI (US); Evan Sparks, Cottage Grove, WI (US); Joel Kramka, Madison, WI (US); Montel Caruthers, Madison, WI (US); Henry M. Hillstrom, Chicago, IL (US)

(73) Assignee: WEBER-STEPHEN PRODUCTS LLC, Palatine, IL (US)

(*) Notice: Subject to any disclaimer, the term of this patent is extended or adjusted under 35 U.S.C. 154(b) by 270 days.

(21) Appl. No.: 17/025,360

(22) Filed: Sep. 18, 2020

(65) Prior Publication Data
US 2021/0212507 A1 Jul. 15, 2021

Related U.S. Application Data

(60) Provisional application No. 63/048,457, filed on Jul. 6, 2020, provisional application No. 62/959,520, filed on Jan. 10, 2020.

(51) Int. Cl.
*A47J 37/07* (2006.01)
*F23N 1/00* (2006.01)
(Continued)

(52) U.S. Cl.
CPC ....... *A47J 37/0763* (2013.01); *A47J 37/0704* (2013.01); *A47J 37/0713* (2013.01);
(Continued)

(58) Field of Classification Search
CPC ........ A47J 2037/0777; A47J 2037/0795; A47J 37/0704; A47J 37/0713; A47J 37/0763;
(Continued)

(56) References Cited

U.S. PATENT DOCUMENTS 4,881,520 A 11/1989 Hefling
5,318,322 A 6/1994 Home
(Continued)

FOREIGN PATENT DOCUMENTS

CN 1725970 1/2006
CN 2015903185 1/2017
(Continued)

OTHER PUBLICATIONS

Taiwan Intellectual Property Office, "Examination Report and Search Report," issued in connection with Taiwan Patent Application No. 109146856, dated Sep. 23, 2021, 9 pages. (Translation provided).
(Continued)

*Primary Examiner* — Jorge A Pereiro
*Assistant Examiner* — Logan P Jones
(74) *Attorney, Agent, or Firm* — Hanley, Flight & Zimmerman, LLC

(57) ABSTRACT

Portable grills are disclosed. An example portable grill movable between an erected configuration and a collapsed configuration includes a valve and regulator assembly and a tank blocker. The valve and regulator assembly includes a tank connector configured to removably couple a fuel tank to the valve and regulator assembly. The tank blocker is configured to prevent the portable grill from being moved from the erected configuration into the collapsed configuration when the portable grill is in the erected configuration and the fuel tank is coupled to the tank connector.

16 Claims, 57 Drawing Sheets

(51) Int. Cl.
*F24C 1/16* (2021.01)
*F24C 15/08* (2006.01)

(52) U.S. Cl.
CPC .......... *A47J 37/0786* (2013.01); *F23N 1/007* (2013.01); *F24C 1/16* (2013.01); *F24C 15/086* (2013.01); *A47J 2037/0777* (2013.01); *A47J 2037/0795* (2013.01); *F23N 2235/24* (2020.01)

(58) Field of Classification Search
CPC .. A47J 37/0786; F23N 1/007; F23N 2235/24; F24C 1/16; F24C 15/086
See application file for complete search history.

(56) References Cited

U.S. PATENT DOCUMENTS

| | | |
|---|---|---|
| 6,684,877 B2 | 2/2004 | Wu |
| 6,910,475 B2 | 6/2005 | Zelek et al. |
| 6,951,213 B2 | 10/2005 | Coleman et al. |
| D680,365 S | 4/2013 | Chung |
| D726,491 S | 4/2015 | Witzel et al. |
| 9,096,247 B2 | 8/2015 | Witzel et al. |
| 9,187,108 B2 | 11/2015 | Bruno et al. |
| 9,505,421 B2 | 11/2016 | Bruno et al. |
| 2004/0025859 A1 | 2/2004 | Schulte |
| 2004/0118393 A1 | 6/2004 | Schulte |
| 2005/0087182 A1 | 4/2005 | Schulte |
| 2010/0326417 A1 | 12/2010 | Groth et al. |
| 2011/0094494 A1* | 4/2011 | Malumyan .......... A47J 37/0704 126/39 R |
| 2015/0342401 A1 | 12/2015 | Alden et al. |

FOREIGN PATENT DOCUMENTS

| | | |
|---|---|---|
| CN | 206641770 | 11/2017 |
| CN | 108056675 | 5/2018 |
| CN | 208524626 | 2/2019 |
| CN | 209360456 | 9/2019 |
| CN | 209846957 | 12/2019 |
| WO | 2006050068 | 5/2006 |
| WO | 2010151642 | 12/2010 |

OTHER PUBLICATIONS

Taiwan Intellectual Property Office, "Allowance Decision of Examination," issued in connection with Taiwan Patent Application No. 109146856, dated Nov. 9, 2021, 3 pages. (Translation provided).

Taiwan Intellectual Property Office, "Patent Certificate No. 1758043," issued in connection with Taiwan Patent Application No. 109146856, dated Mar. 11, 2022, 64 pages. (Translation provided).

International Bureau, "International Preliminary Report on Patentability," issued in connection with International Patent Application No. PCT/US2020/052827, dated Jul. 21, 2022, 8 pages.

Cuisinart, "Roll-Away Portable LP Gas Grill Assembly and Operating Instructions," Model No. CGG-240, 9 pages, retrieved Feb. 6, 2020.

International Searching Authority, "International Search Report and Written Opinion", issued in connection with Application No. PCT/US2020/052837, dated Jan. 12, 2021, 10 pages.

* cited by examiner

SECTION B-B

PORTABLE GRILLS

RELATED APPLICATIONS

This application claims priority to U.S. Provisional Patent Application No. 63/048,457, filed Jul. 6, 2020, and to U.S. Provisional Patent Application No. 62/959,520, filed Jan. 10, 2020. The entireties of U.S. Provisional Patent Application No. 63/048,457 and U.S. Provisional Patent Application No. 62/959,520 are hereby incorporated by reference herein.

FIELD OF THE DISCLOSURE

This disclosure relates generally to grills and, more specifically, to portable grills.

BACKGROUND

Portable grills are intended to be transported from a storage location (e.g., a home, a garage, a shed, a commercial storage unit, a vehicle, etc.) to a variety of remotely-located destinations which may be suitable for using the portable grill to cook food. For example, portable grills are commonly transported to campsites, tailgating sites, hiking sites, parks, beaches, etc. for use at such destinations. Portable grills are conventionally configured to cook (e.g., grill, smoke, bake, roast, broil, sear, and/or otherwise heat) food items located within (e.g., placed on one or more cooking grate(s) positioned within) a cooking chamber of the portable grill. In some instances, the cooking chamber of the portable grill is fueled by a combustible supply of liquid petroleum gas (LP gas) that is contained under pressure within a fuel tank, with the fuel tank being removably couplable to and/or from a valve and regulator assembly of the portable grill, and/or removably couplable to and/or from one or more other mechanical structure(s) of the portable grill. In some such instances, the portable grill includes a cookbox having one or more burner tube(s) that is/are operatively coupled to the valve and regulator assembly, with the burner tube(s) being configured to generate, carry, and/or otherwise provide flames within the cookbox and/or within the cooking chamber of the portable grill in response to ignition and/or combustion of the LP gas as the LP gas flows from the fuel tank, through the valve and regulator assembly, and into the burner tube(s) of the portable grill.

Many portable grills are capable of being transitioned (e.g., via one or more foldable and/or collapsible leg(s) of the portable grill) between an erected configuration that is intended and/or purposed for cooking food, and a collapsed configuration that is intended and/or purposed for transporting and/or stowing the portable grill at a time when it is not being used to cook food. Such portable grills typically have a reduced form factor (e.g., a reduced height and/or a reduced width) when positioned in their collapsed configuration relative to the corresponding form factor when positioned in their erected configuration. In some instances, the reduced form factor associated with the collapsed configuration of the portable grill facilitates loading the portable grill into a storage compartment (e.g., a trunk, a flatbed, a cargo area, etc.) of a vehicle. In some such instances, the portable grill may be unable to fit within the storage compartment when the portable grill is positioned in the erected configuration, but is able to fit within the storage compartment when the portable grill is positioned in the collapsed configuration.

Figure 1:
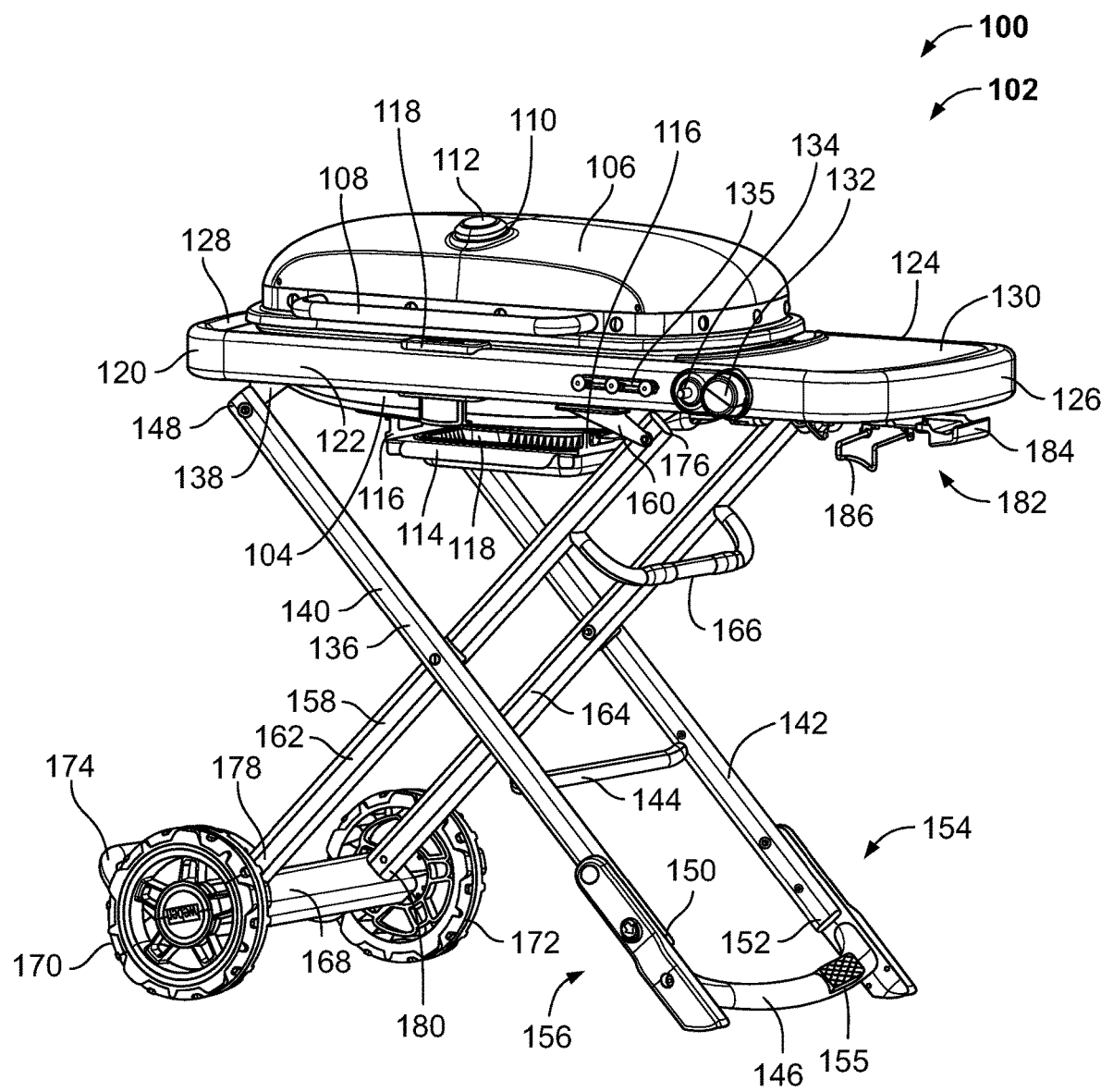
FIG. 1 is a first perspective view of an example portable grill constructed in accordance with teachings of this disclosure, with the portable grill shown positioned in an example erected configuration.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example portable grills disclosed herein include features that provide numerous advantages over conventional portable grills. As one example, the disclosed portable grills include a leg lock assembly configured to lock a position of one or more leg(s) and/or one or more leg unit(s) of the portable grill relative to a frame of the portable grill when the portable grill is positioned in an erected configuration. In some examples, one or more portion(s) of one or more component(s) of the leg lock assembly is/are located and/or positioned within one or more rail(s) of the frame of the portable grill such that said portion(s) of said component(s) of the leg lock assembly is/are partially or fully concealed from exposure, thereby advantageously reducing wear on, and/or reducing the possibility of mechanical damage to, the concealed portion(s) of the component(s) of the leg lock assembly.

In some examples, the above-described leg lock assembly of the disclosed portable grills includes a handle configured to unlock and/or release the locked position of the leg(s) and/or the leg unit(s) relative to the frame of the portable grill in response to actuation of the handle by a user of the portable grill. In some examples, the handle is actuatable to unlock and/or release the locked position of the leg(s) and/or the leg unit(s) relative to the frame when the portable grill is positioned in the erected configuration. In some examples, actuation of the handle facilitates transitioning the portable grill from the erected configuration into the collapsed configuration. In some examples, the handle of the leg lock assembly is configured to be actuated using only one hand of the user of the portable grill, thereby advantageously leaving the other hand of the user free to assist with tasks aside from actuating the handle. In some examples, one or more portion(s) of the handle is/are located below (e.g., along an under side of) a frame-mounted table of the portable grill such that said portion(s) of the handle is/are partially or fully concealed from exposure, thereby advantageously reducing wear on, and/or reducing the possibility of mechanical damage to, the concealed portion(s) of the handle.

As another example, the disclosed portable grills include a tank blocker configured to restrict (e.g., prevent) the portable grill from being transitioned from the erected configuration into the collapsed configuration when a fuel tank that is removably couplable to and/or from the portable grill remains coupled to the portable grill. In some examples, the tank blocker is operatively coupled to the above-described leg lock assembly and to an attached fuel tank of the portable grill such that movement of the tank blocker from a blocked configuration (e.g., which prevents actuation of the handle of the leg lock assembly) into an unblocked configuration (e.g., which enables actuation of the handle of the leg lock assembly) occurs automatically in response to the attached fuel tank becoming uncoupled and/or detached from the portable grill. Thus, the tank blocker advantageously provides a mechanically-automated failsafe against the possibility of a user of the portable grill failing to uncouple and/or remove the fuel tank from the portable grill prior to initiating the transition of the portable grill from the erected configuration into the collapsed configuration.

In some examples, the tank blocker is further configured (e.g., dually configured) to restrict (e.g., prevent) a fuel tank that is removably couplable to and/or from the portable grill from becoming coupled to the portable grill while the portable grill is in the process of being transitioned from the erected configuration into the collapsed configuration. In some examples, the tank blocker is operatively coupled to the above-described leg lock assembly such that movement of the tank blocker from an unblocked configuration (e.g., which enables a fuel tank to be coupled to the portable grill) into a blocked configuration (e.g., which prevents a fuel tank from being coupled to the portable grill) occurs automatically in response to actuation of the handle of the leg lock assembly in connection with transitioning the portable grill from the erected configuration into the collapsed configuration. Thus, the tank blocker also advantageously provides a mechanically-automated failsafe against the possibility of a user of the portable grill coupling and/or attaching the fuel tank to the portable grill while the portable grill is in the process of transitioning from the erected configuration into the collapsed configuration, and/or while the handle of the leg lock assembly is actuated.

As another example, the disclosed portable grills include a leg latch assembly configured to selectively latch one or more leg(s) and/or one or more leg unit(s) of the portable grill in a fixed position relative to a frame of the portable grill when the portable grill is positioned in a collapsed configuration. In some examples, the leg latch assembly includes a post rigidly coupled a leg and/or a leg unit of the portable grill, and a swing plate pivotally coupled to the frame of the portable grill, with the swing plate including an opening configured to selectively receive the post when the portable grill is in the collapsed configuration. In some examples, the opening of the swing plate includes a first post-receiving portion having a first diameter and a second post-receiving portion having a second diameter less than the first diameter, with the swing plate being pivotable to selectively locate the post in the first post-receiving portion or the second post-receiving portion. In some examples, the swing plate is separable from the post when the post is located in the first post-receiving portion, and inseparable from the post when the post is located in the second post-receiving portion. In some examples, the leg latch assembly is advantageously configured to latch the leg unit in a fixed position relative to the frame to prevent movement of the portable grill from the collapsed configuration into the erected configuration when the post is located in the second post-receiving portion, and to unlatch the leg unit from the fixed position to enable movement of the portable grill from the collapsed configuration into the erected configuration when the post is located in the first post-receiving portion.

As another example, the disclosed portable grills include a lid lock assembly configured to restrict (e.g., prevent) a lid of the portable grill from opening relative to a cookbox of the portable grill when the portable grill is positioned in the collapsed configuration. In some examples, the lid lock assembly is further configured (e.g., dually configured) to enable the lid to open relative to the cookbox when the portable grill is positioned in the erected configuration. In some examples, one or more portion(s) of one or more component(s) of the lid lock assembly is/are located and/or positioned within one or more rail(s) of a frame of the portable grill such that said portion(s) of said component(s) of the lid lock assembly is/are partially or fully concealed from exposure, thereby advantageously reducing wear on, and/or reducing the possibility of mechanical damage to, the concealed portion(s) of the component(s) of the lid lock assembly. In some examples, movement and/or actuation of the lid lock assembly from an unlocked configuration (e.g., which enables the lid to open relative to the cookbox) into a locked configuration (e.g., which prevents the lid from opening relative to the cookbox) occurs automatically in response to one or more leg(s) of the portable grill engaging and/or contacting one or more actuatable component(s) of the lid lock assembly in connection with transitioning the portable grill from the erected configuration into the collapsed configuration. Thus, the lid lock assembly advantageously provides a mechanically-automated failsafe against the possibility of the lid opening relative to the cookbox when the portable grill is positioned in the collapsed configuration, as may occur when the portable grill is being transported and/or stowed.

As another example, the disclosed portable grills include a leg unit having one or more leg(s) and a foldable foot pivotally coupled to the leg(s). In some examples, the foldable foot of the leg unit is movable (e.g., rotatable) between an unfolded configuration in which the foldable foot is generally aligned with (e.g., extending in a same direction as) the leg(s) of the leg unit, and a folded configuration in which the foldable foot is rotated and/or pivoted at an upward angle relative to the leg(s) of the leg unit. In some examples, the foldable foot of the leg unit is configured to engage and/or contact an underlying surface (e.g., a ground surface, a floor surface, etc.) in connection with supporting the portable grill when the foldable foot is positioned in the unfolded configuration, and the portable grill is positioned in the erected configuration and oriented horizontally (e.g., parallel) relative to the underlying surface. In some examples, the foldable foot of the leg unit is further configured (e.g., dually configured) to operate as and/or provide a handle by which the portable grill can be picked up and/or carried when the foldable foot is positioned in the folded configuration, and the portable grill is positioned in the collapsed configuration and oriented horizontally (e.g., parallel) relative to the underlying surface. The dually-configured nature of the foldable foot of the leg unit advantageously eliminates any need for separate and/or multiple structures to facilitate the supporting and carrying functions described above. The dually-configured nature of the foldable foot of the leg unit also advantageously reduces the width of the portable grill when the foldable foot is positioned in the folded configuration (e.g., when the foldable foot is rotated and/or pivoted at an upward angle relative to the leg(s) of the leg unit) relative to the width of the grill when the foldable foot is positioned in the unfolded configuration (e.g., when the foldable foot is generally aligned with and/or extends in a same direction as the leg(s) of the leg unit).

As another example, the disclosed portable grills include a leg unit having a pair of legs and a support bar extending between the legs and further extending at an angle (e.g., orthogonally) away from the legs. In some examples, the support bar is configured to engage and/or contact an underlying surface (e.g., a ground surface, a floor surface, etc.) when the portable grill is positioned in the collapsed configuration and oriented vertically (e.g., perpendicular) relative to the underlying surface, thereby advantageously providing and/or functioning as a mechanical support to maintain the portable grill in a vertical orientation relative to the underlying surface. In some examples, the support bar of the leg unit is further configured (e.g., dually configured) to advantageously provide and/or function as a handle by which the portable grill can be picked up and/or carried when the portable grill is positioned in the collapsed configuration and oriented horizontally (e.g., parallel) relative to the underlying surface. The dually-configured nature of the support bar of the leg unit advantageously eliminates any need for separate and/or multiple structures to facilitate the supporting and carrying functions described above.

As another example, the disclosed portable grills include a leg unit having a pair of legs and a support bar extending between the legs and further extending at an angle (e.g., orthogonally) away from the legs. In some examples, the support bar of the leg unit is configured to maintain a cookbox and/or one or more other component(s) (e.g., a catch pan, a valve and regulator assembly, a leg lock assembly, a tank blocker, etc.) of the portable grill at a separated distance above and/or apart from an underlying surface (e.g., a ground surface, a floor surface, etc.) when the portable grill is positioned in the collapsed configuration and oriented horizontally (e.g., parallel) relative to the underlying surface, thereby advantageously reducing wear on, and/or reducing the possibility of mechanical damage to, the cookbox and/or the other component(s). In some examples, the support bar of the leg unit is further configured (e.g., dually configured) to advantageously provide and/or function as a structure by which the portable grill can be hung (e.g., from a hanging mechanism, such as one or more hook(s)) when the portable grill is positioned in the collapsed configuration and oriented vertically (e.g., perpendicular) relative to the underlying surface. The dually-configured nature of the support bar of the leg unit advantageously eliminates any need for separate and/or multiple structures to facilitate the supporting and hanging functions described above.

As another example, the disclosed portable grills include a frame, a leg unit having one or more leg(s) pivotally coupled to the frame, and a gas spring having a first end coupled to the frame and a second end located opposite to the first end and coupled to one of the leg(s). In some examples, the first end of the gas spring is coupled to a rear rail of the frame, and the second end of the gas spring is coupled to a rear leg of the leg unit. In other examples, the first end of the gas spring can alternatively be coupled to a front rail of the frame, and the second end of the gas spring can alternatively be coupled to a front leg of the leg unit. In some examples, the gas spring is configured to restrict (e.g., prevent) the leg(s) from rapidly and/or freely collapsing under the weight of a cookbox of the portable grill following actuation of a handle of a leg lock assembly of the portable grill. Thus, the gas spring advantageously provides a mechanically-damped transition of the portable grill from the erected configuration into the collapsed configuration.

As another example, the disclosed portable grills include a cooking chamber having one or more grate retainer(s) extending inwardly therefrom. In some examples, the grate retainer(s) is/are configured to restrict (e.g., prevent) movement of one or more cooking grate(s) located within the cooking chamber of the portable grill. In some examples, the grate retainer(s) is/are advantageously configured to restrict (e.g., prevent) movement of the cooking grate(s) relative to the cookbox when the portable grill is positioned in the collapsed configuration and oriented vertically (e.g., perpendicular) relative to an underlying surface. Thus, the grate retainer(s) advantageously eliminate any shifting and/or movement of the cooking grate(s) relative to the cookbox that might otherwise occur in connection with transporting and/or stowing the portable grill.

The above-identified features as well as other advantageous features of the disclosed portable grills are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field. As used herein, the term "fastener" means any device(s), structure(s), and/or material(s) that is/are configured, individually or collectively, to couple, connect, attach, and/or fasten one or more component(s) to one or more other component(s). For example, a fastener can be implemented by any type(s) and/or any number(s) of bolts, nuts, screws, posts, anchors, rivets, pins, clips, ties, welds, adhesives, etc.

Figure 2:
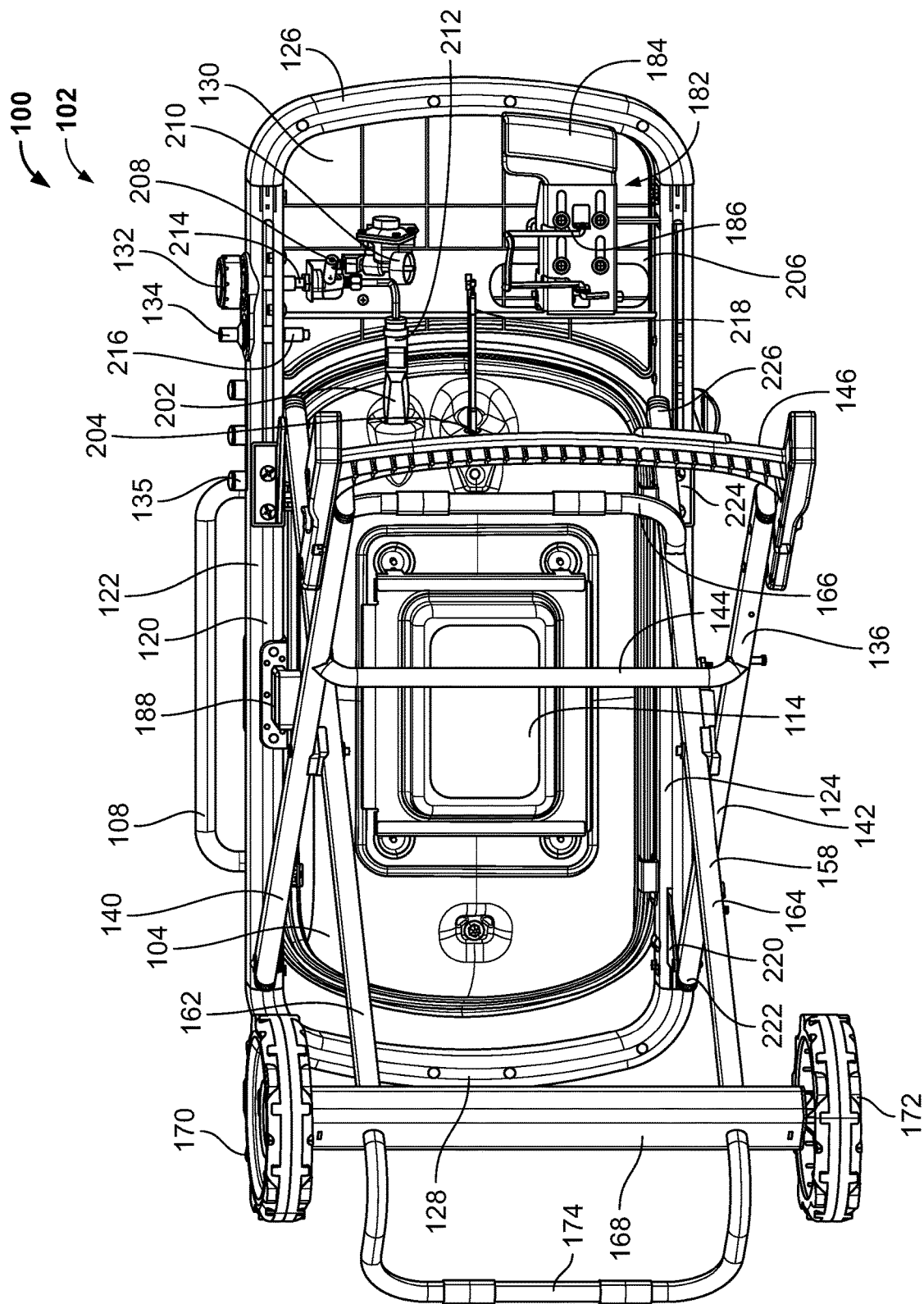
FIG. 2 is a second perspective view of the portable grill of FIG. 1, with the portable grill shown positioned in the erected configuration of FIG. 1.
Figure 3:
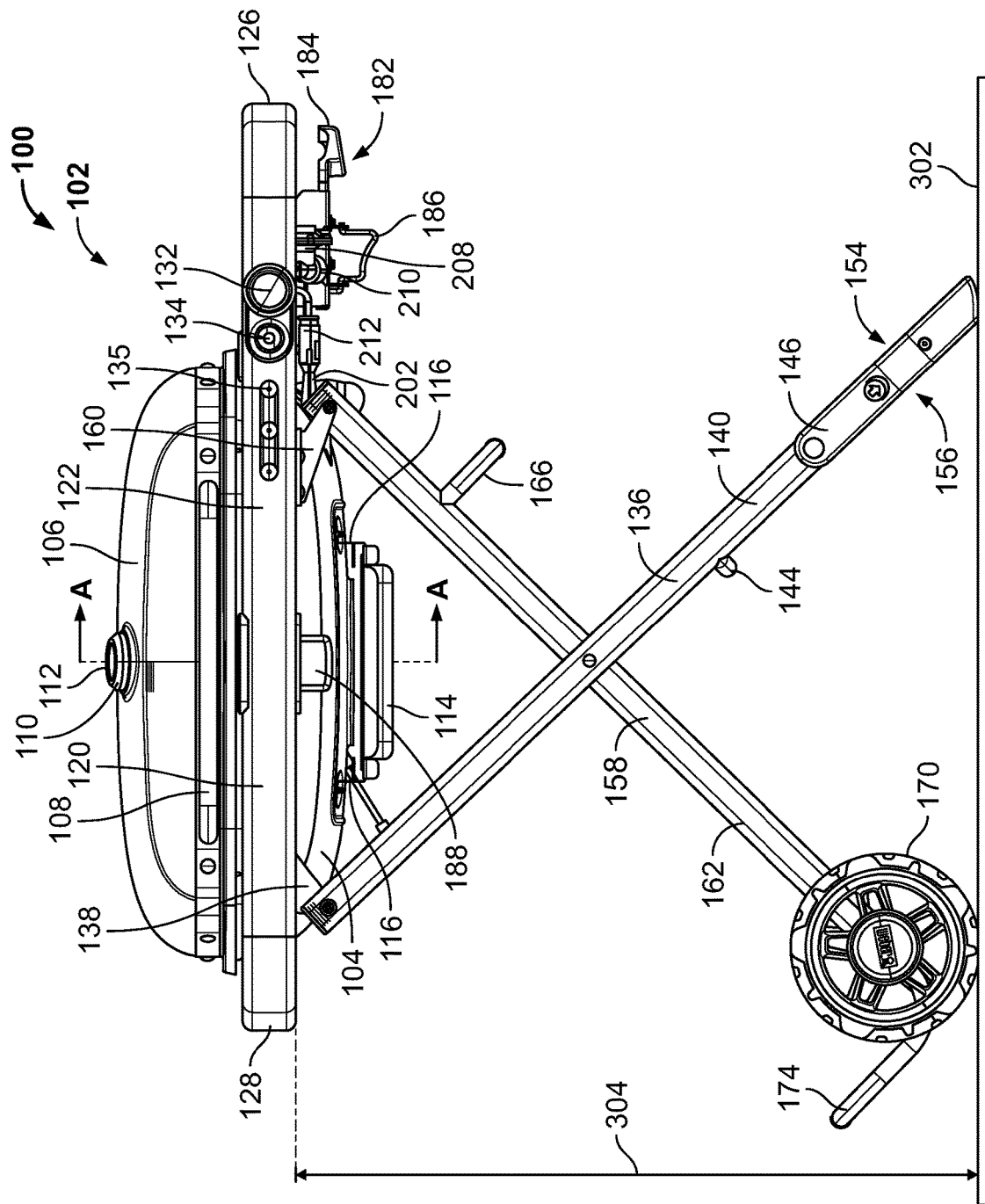
FIG. 3 is a front view of the portable grill of FIGS. 1 and 2, with the portable grill shown positioned in the erected configuration of FIGS. 1 and 2.
Figure 4:
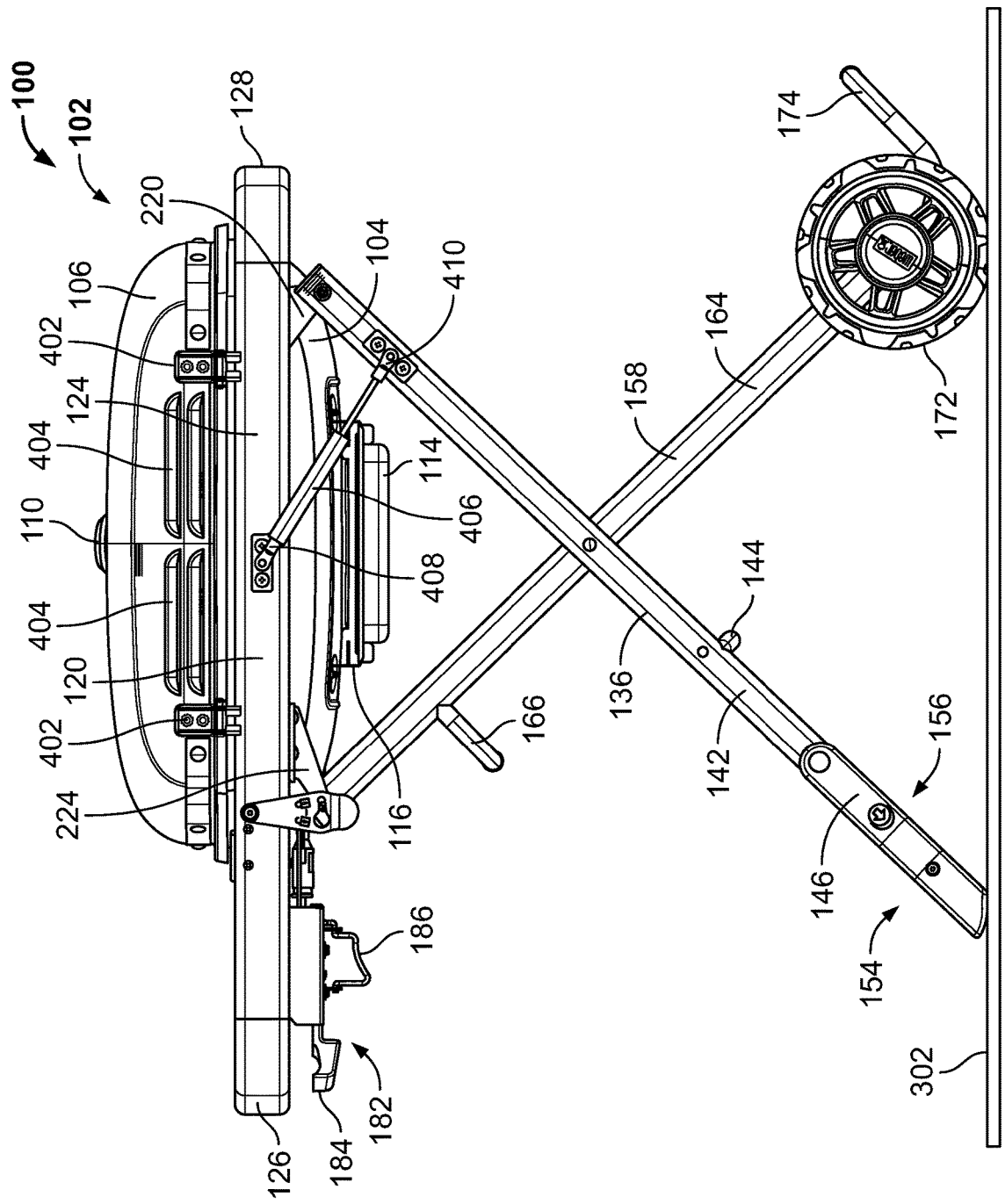
FIG. 4 is a rear view of the portable grill of FIGS. 1-3, with the portable grill shown positioned in the erected configuration of FIGS. 1-3.
Figure 5:
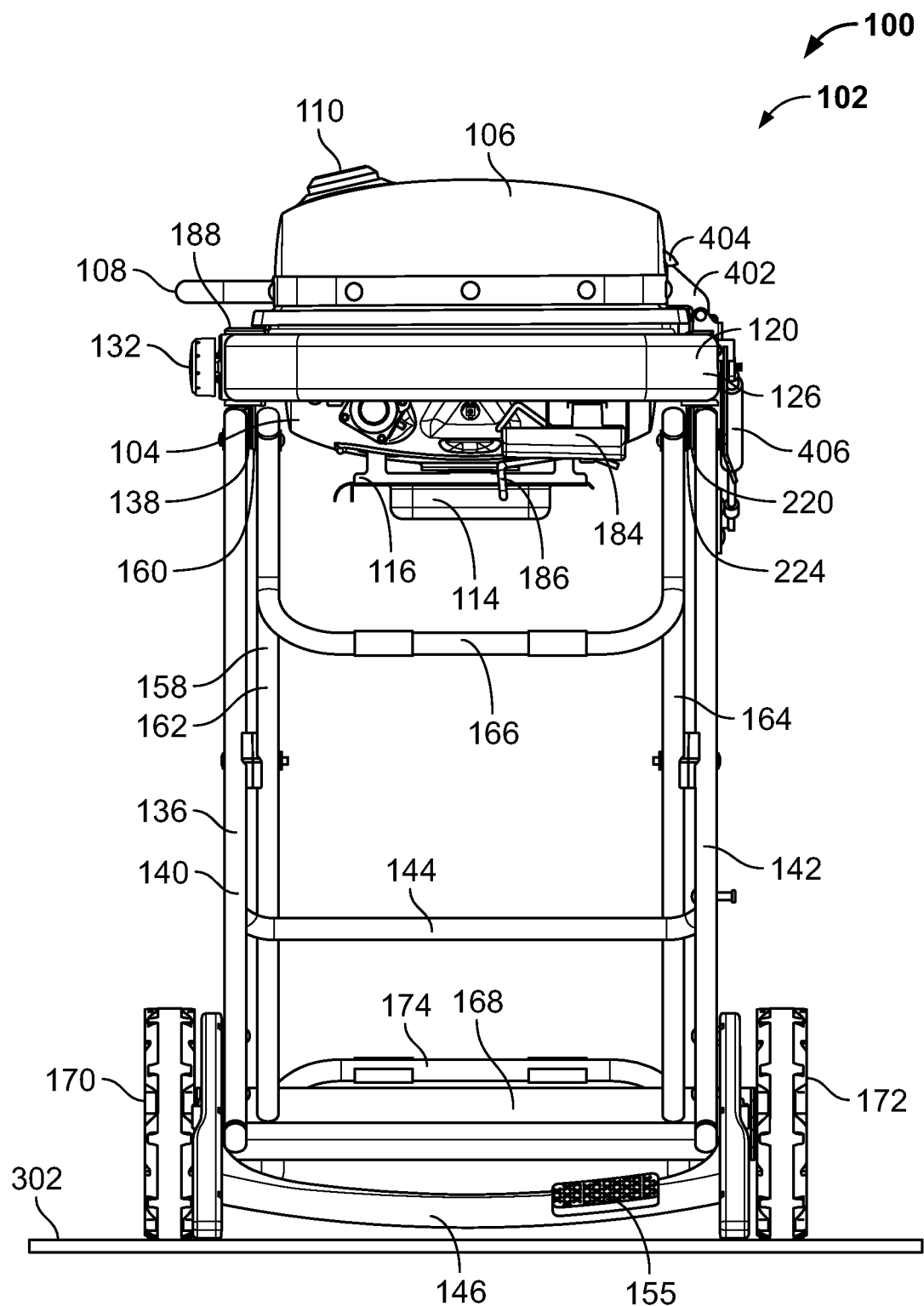
FIG. 5 is a right side view of the portable grill of FIGS. 1-4, with the portable grill shown positioned in the erected configuration of FIGS. 1-4.
Figure 6:
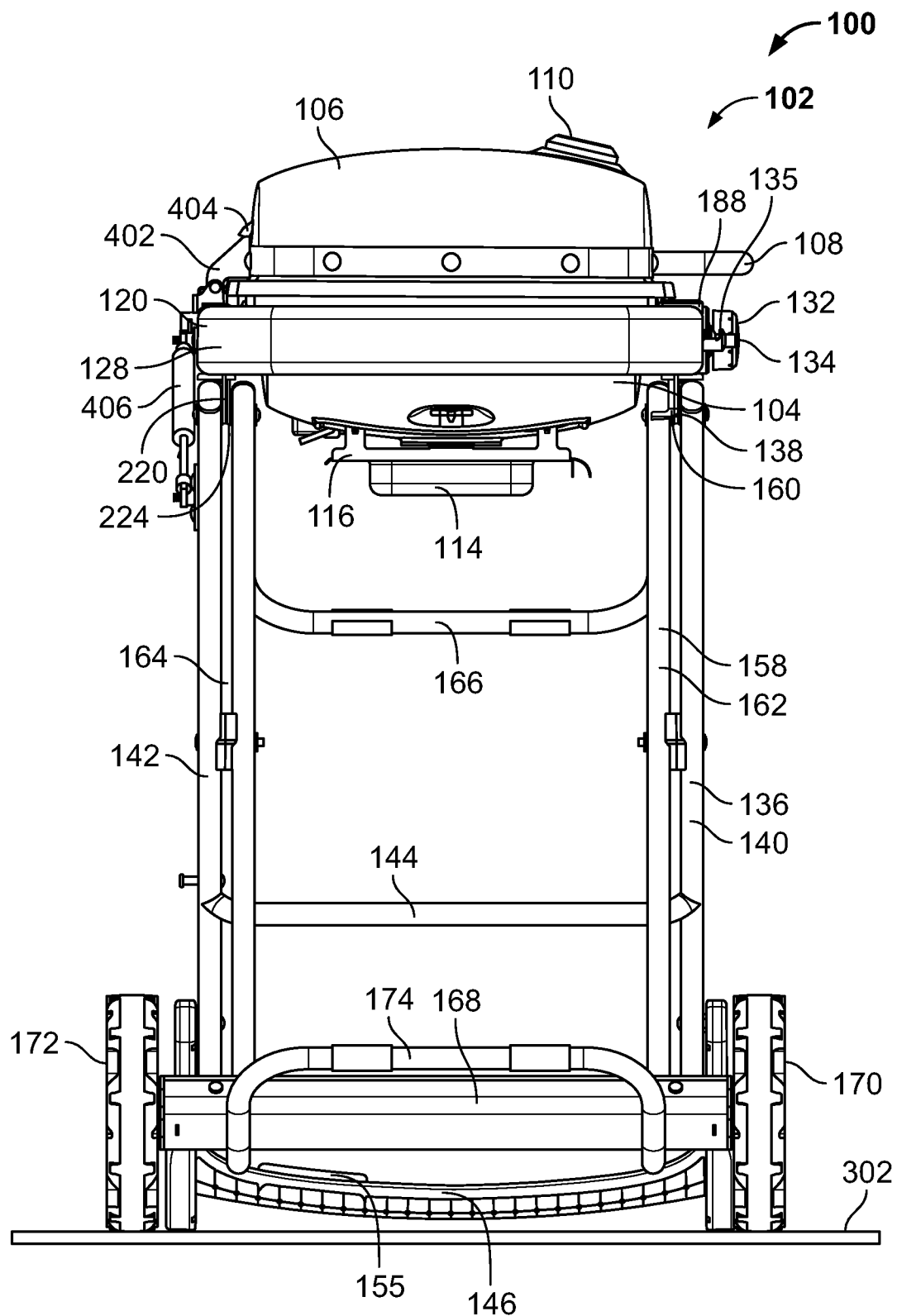
FIG. 6 is a left side view of the portable grill of FIGS. 1-5, with the portable grill shown positioned in the erected configuration of FIGS. 1-5.
Figure 7:
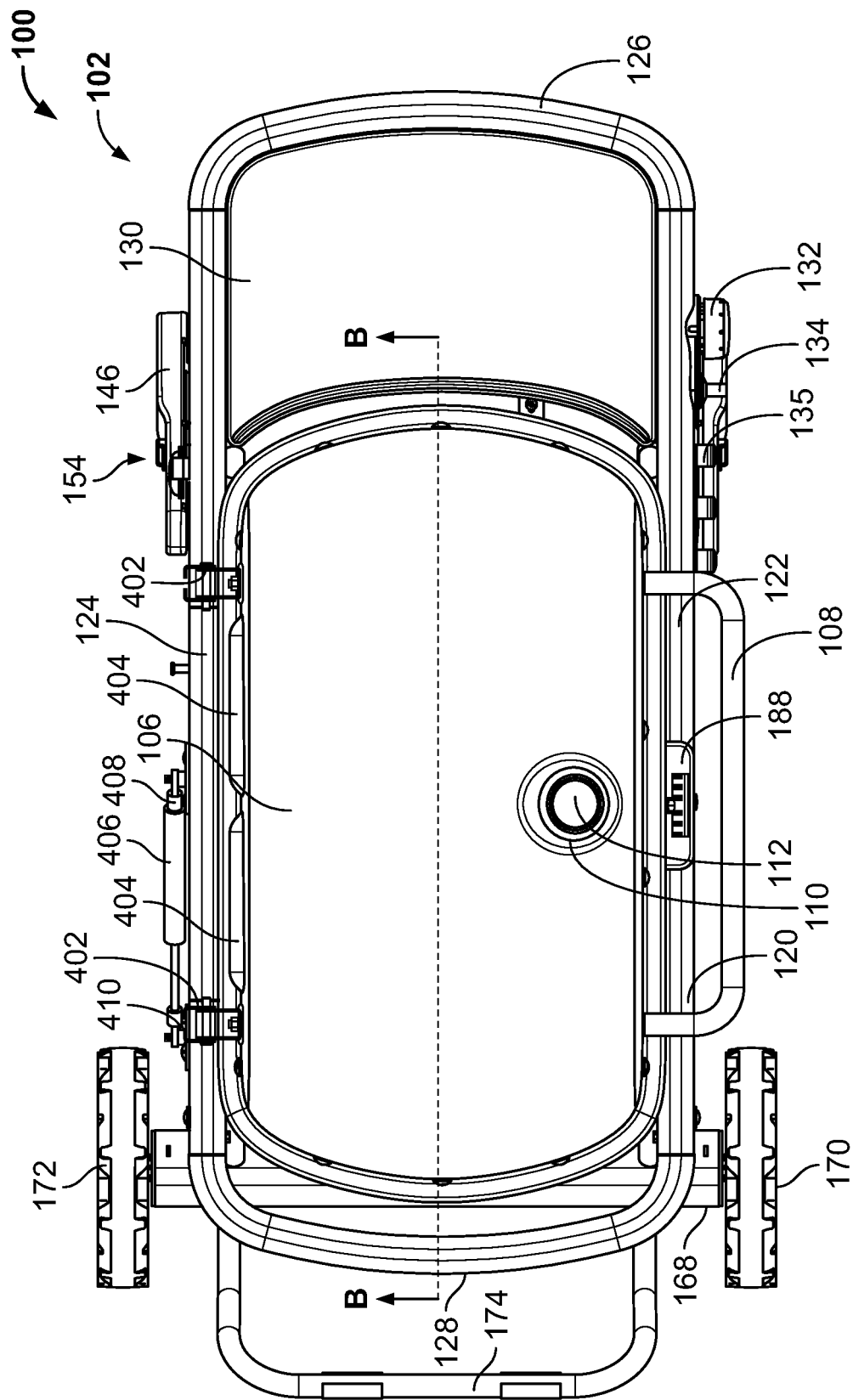
FIG. 7 is a top view of the portable grill of FIGS. 1-6, with the portable grill shown positioned in the erected configuration of FIGS. 1-6.
Figure 8:
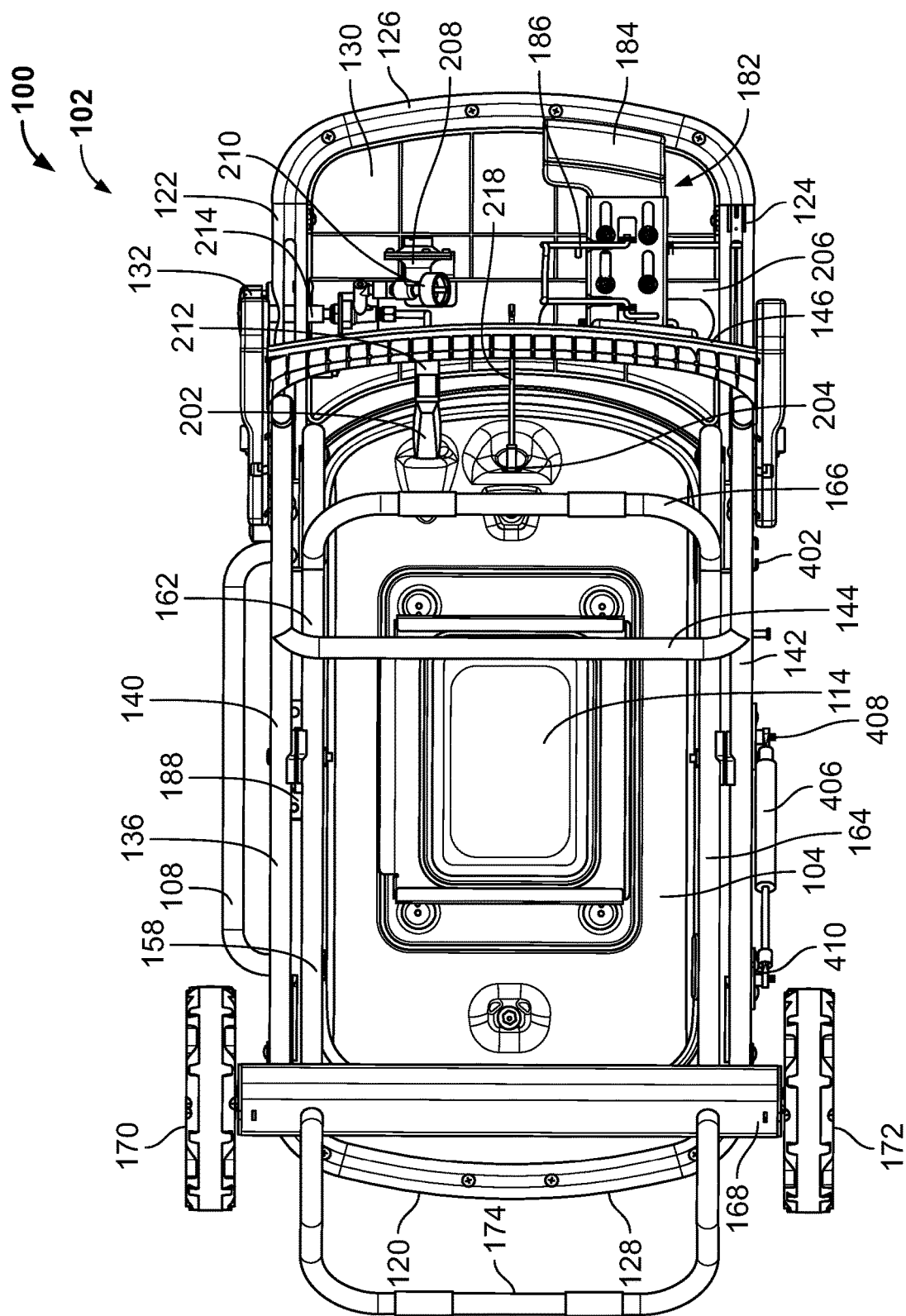
FIG. 8 is a bottom view of the portable grill of FIGS. 1-7, with the portable grill shown positioned in the erected configuration of FIGS. 1-7.
Figure 9:
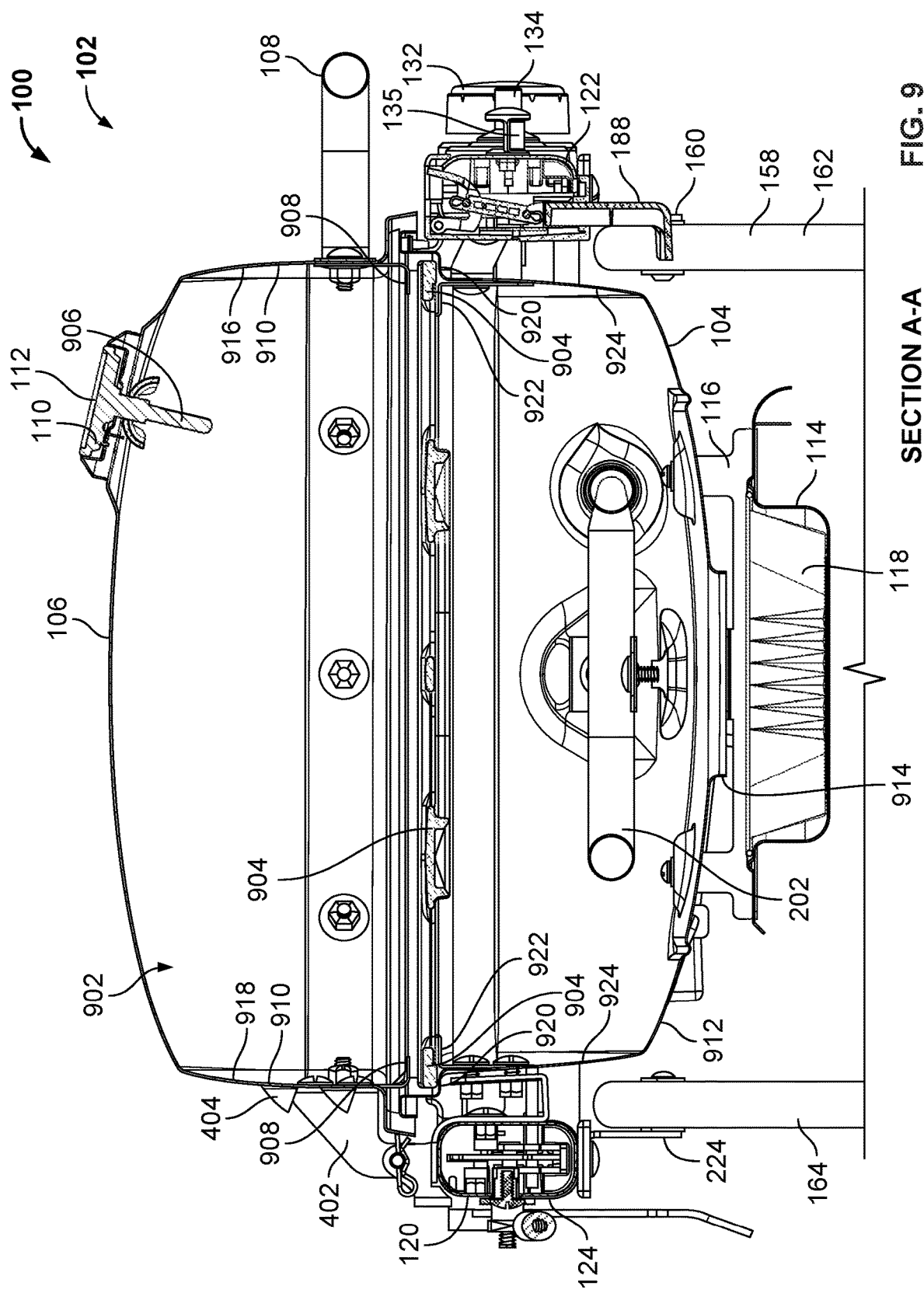
FIG. 9 is a cross-sectional view of the portable grill of FIGS. 1-8 taken along section A-A of FIG. 3.
Figure 10:
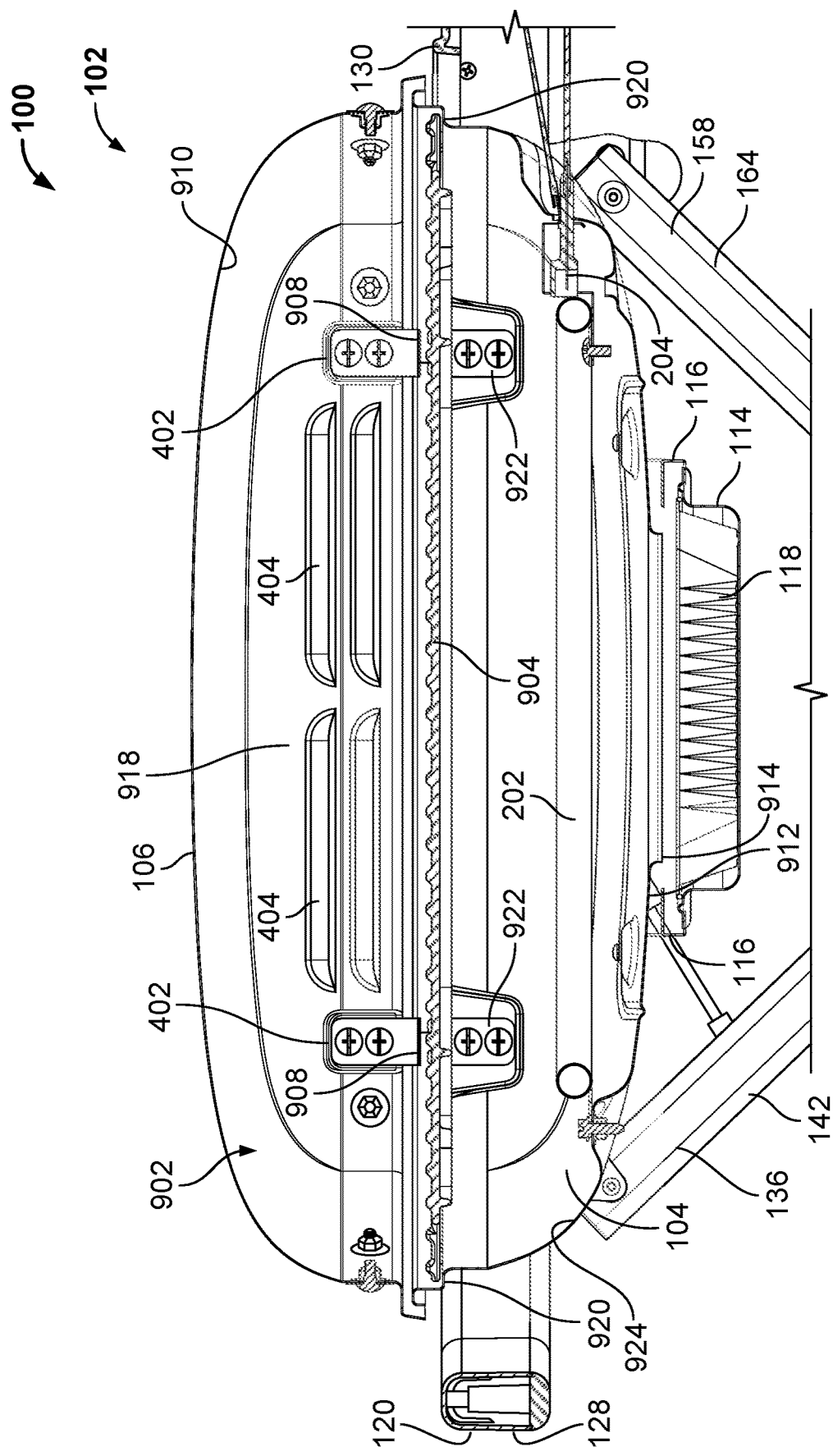
FIG. 10 is a cross-sectional view of the portable grill of FIGS. 1-9 taken along section B-B of FIG. 7.

FIGS. 1-10 illustrate an example portable grill 100 constructed in accordance with the teachings of this disclosure, with the portable grill 100 shown positioned in an example erected configuration 102. More specifically, FIG. 1 is a first perspective view of the portable grill 100 shown positioned in the erected configuration 102. FIG. 2 is a second perspective view of the portable grill 100 shown positioned in the erected configuration 102. FIG. 3 is a front view of the portable grill 100 shown positioned in the erected configuration 102. FIG. 4 is a rear view of the portable grill 100 shown positioned in the erected configuration 102. FIG. 5 is a right side view of the portable grill 100 shown positioned in the erected configuration 102. FIG. 6 is a left side view of the portable grill 100 shown positioned in the erected configuration 102. FIG. 7 is a top view of the portable grill 100 shown positioned in the erected configuration 102. FIG. 8 is a bottom view of the portable grill 100 shown positioned in the erected configuration 102. FIG. 9 is a cross-sectional view of the portable grill 100 taken along section A-A of FIG. 3. FIG. 10 is a cross-sectional view of the portable grill 100 taken along section B-B of FIG. 7.

The portable grill 100 is configured to be positioned in the erected configuration 102 shown in FIGS. 1-10 while the portable grill 100 is being used to cook one or more food item(s). As shown in FIGS. 3-6, the portable grill 100 can be located on and/or supported by an example underlying surface 302 (e.g., a ground surface, a floor surface, etc.) when the portable grill 100 is positioned in the erected configuration 102. In the illustrated example of FIGS. 3-6, the portable grill 100 is shown positioned in the erected configuration 102 and oriented horizontally (e.g., parallel) relative to the underlying surface 302, as further described below.

Figure 11:
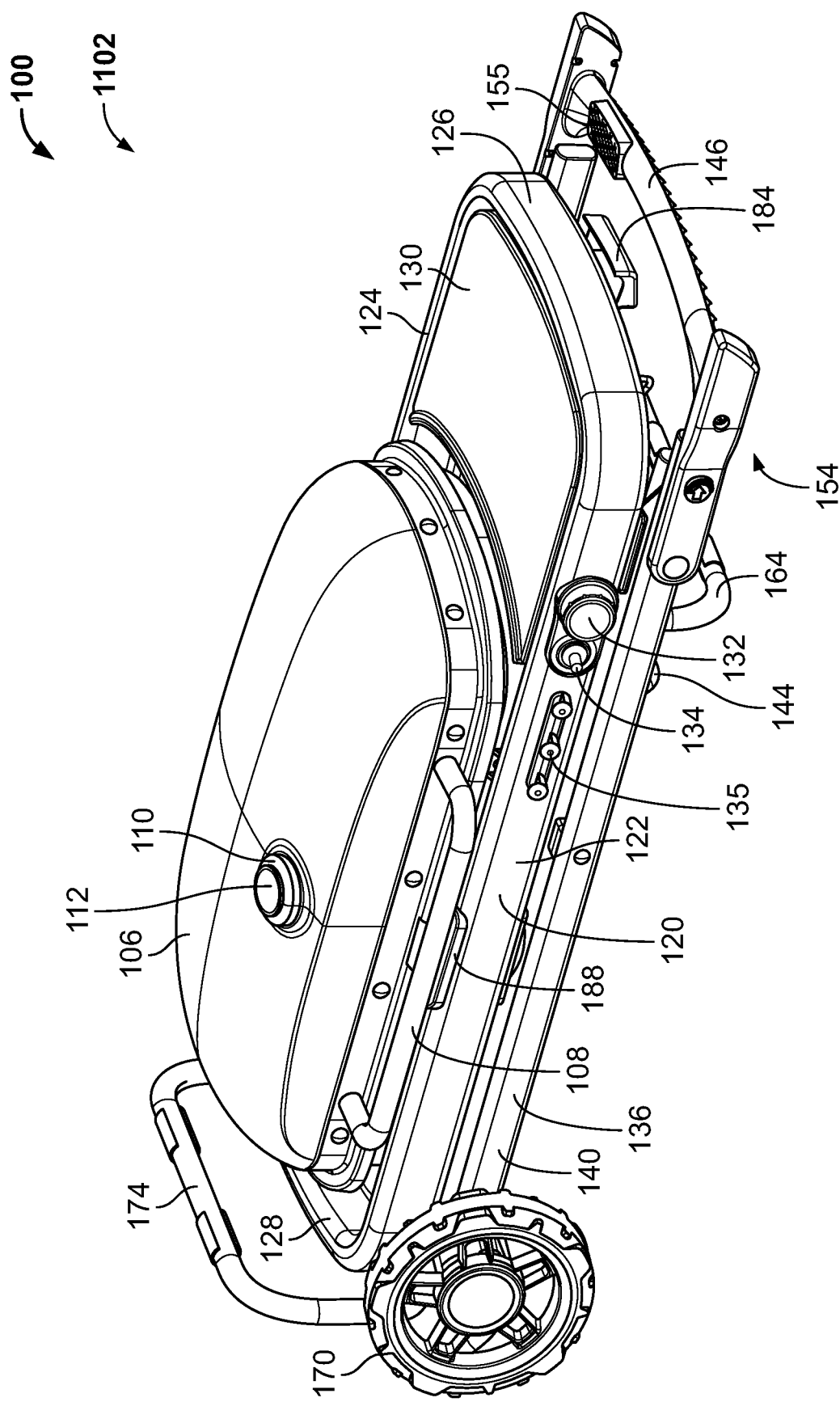
FIG. 11 is a first perspective view of the portable grill of FIGS. 1-10, with the portable grill shown positioned in an example collapsed configuration.
Figure 12:
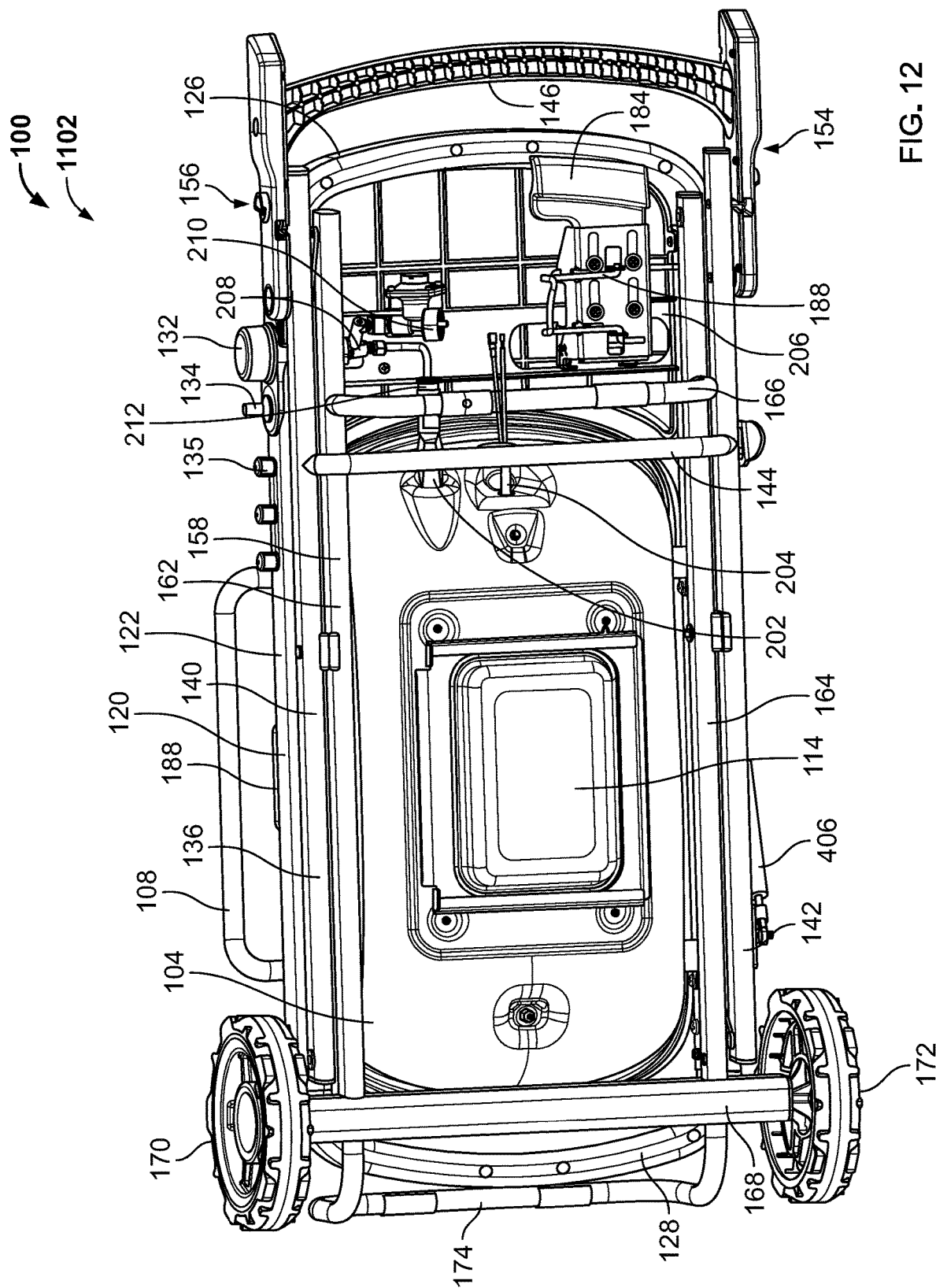
FIG. 12 is a second perspective view of the portable grill of FIGS. 1-11, with the portable grill shown positioned the collapsed configuration of FIG. 11.
Figure 13:
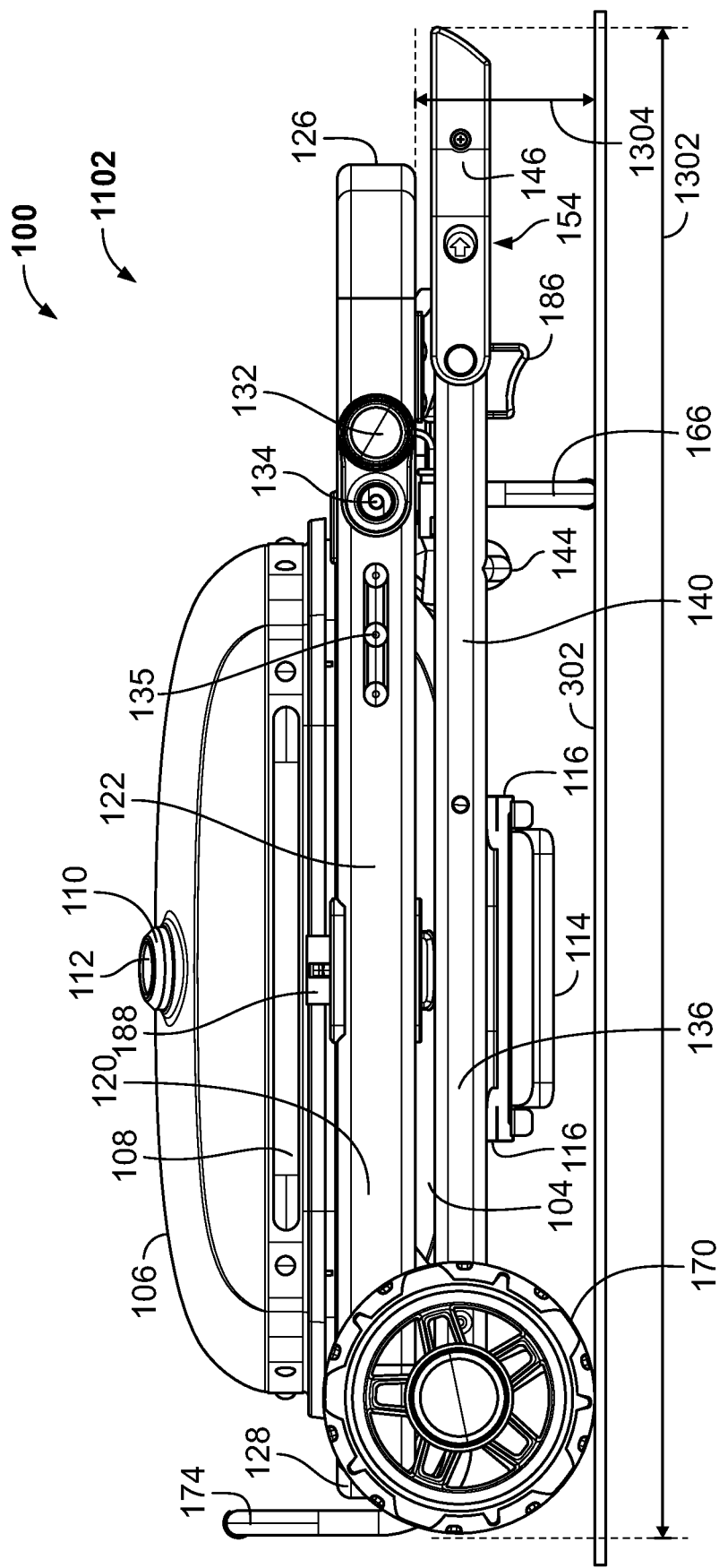
FIG. 13 is a front view of the portable grill of FIGS. 1-12, with the portable grill shown positioned in the collapsed configuration of FIGS. 11 and 12.
Figure 14:
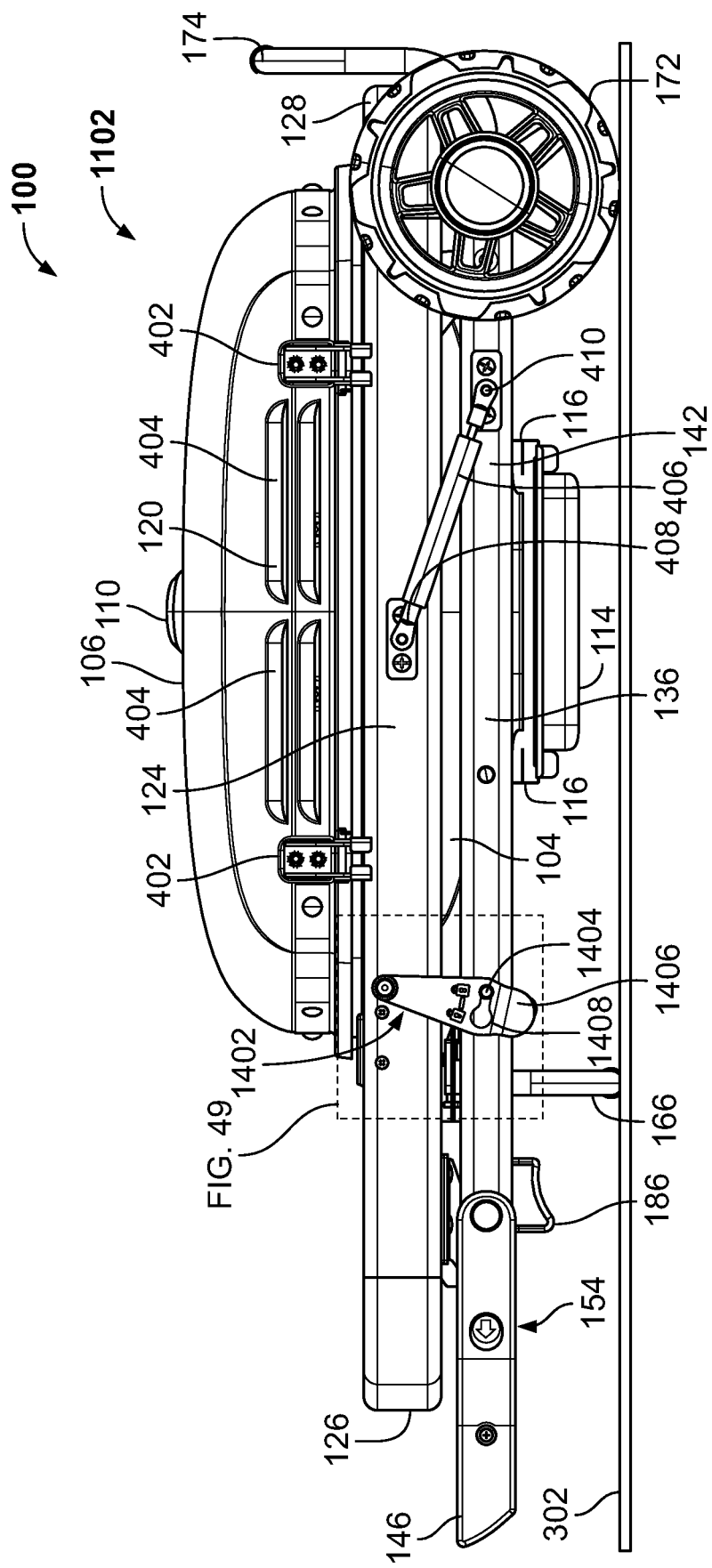
FIG. 14 is a rear view of the portable grill of FIGS. 1-13, with the portable grill shown positioned in the collapsed configuration of FIGS. 11-13.
Figure 15:
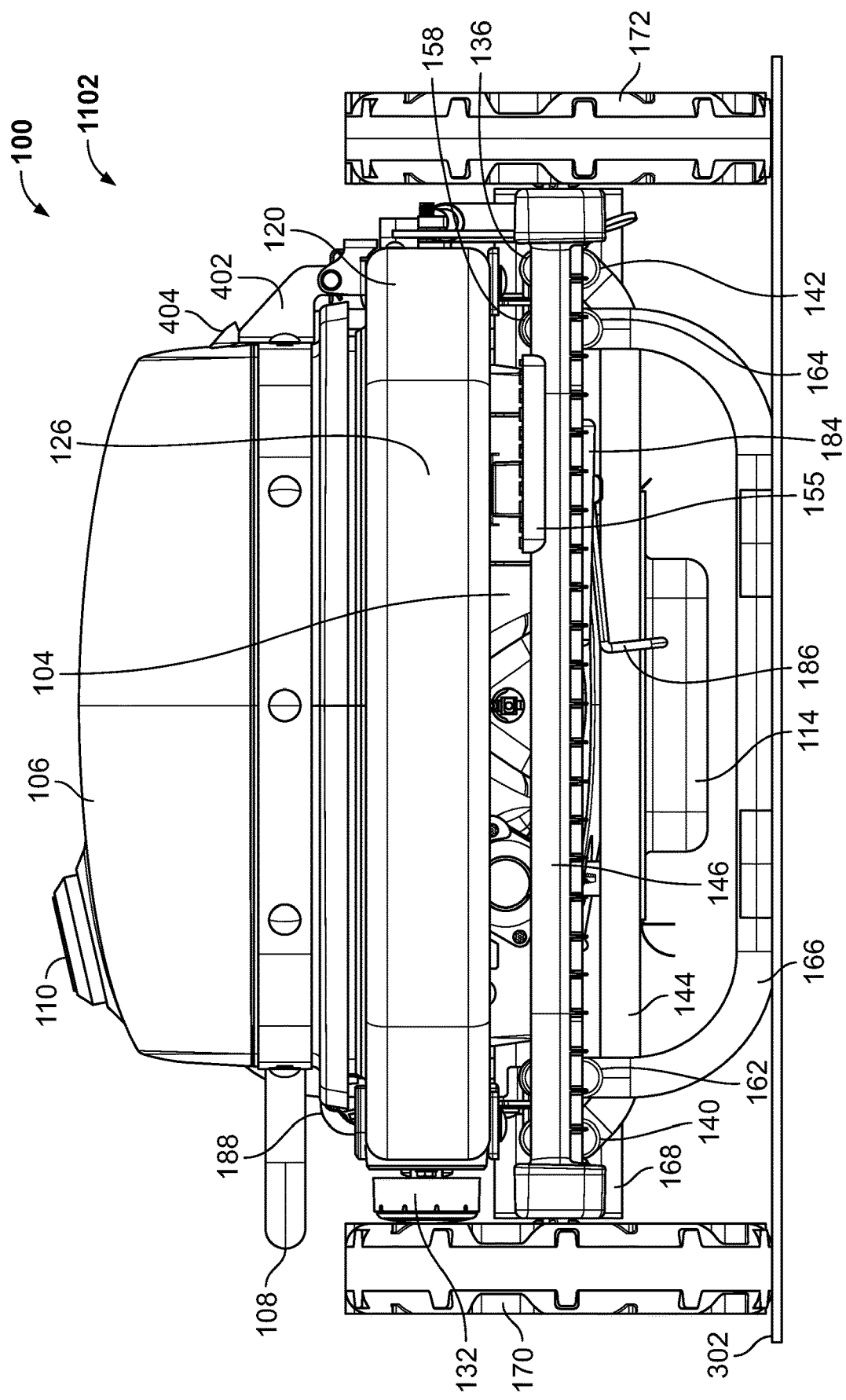
FIG. 15 is a right side view of the portable grill of FIGS. 1-14, with the portable grill shown positioned in the collapsed configuration of FIGS. 11-14.
Figure 16:
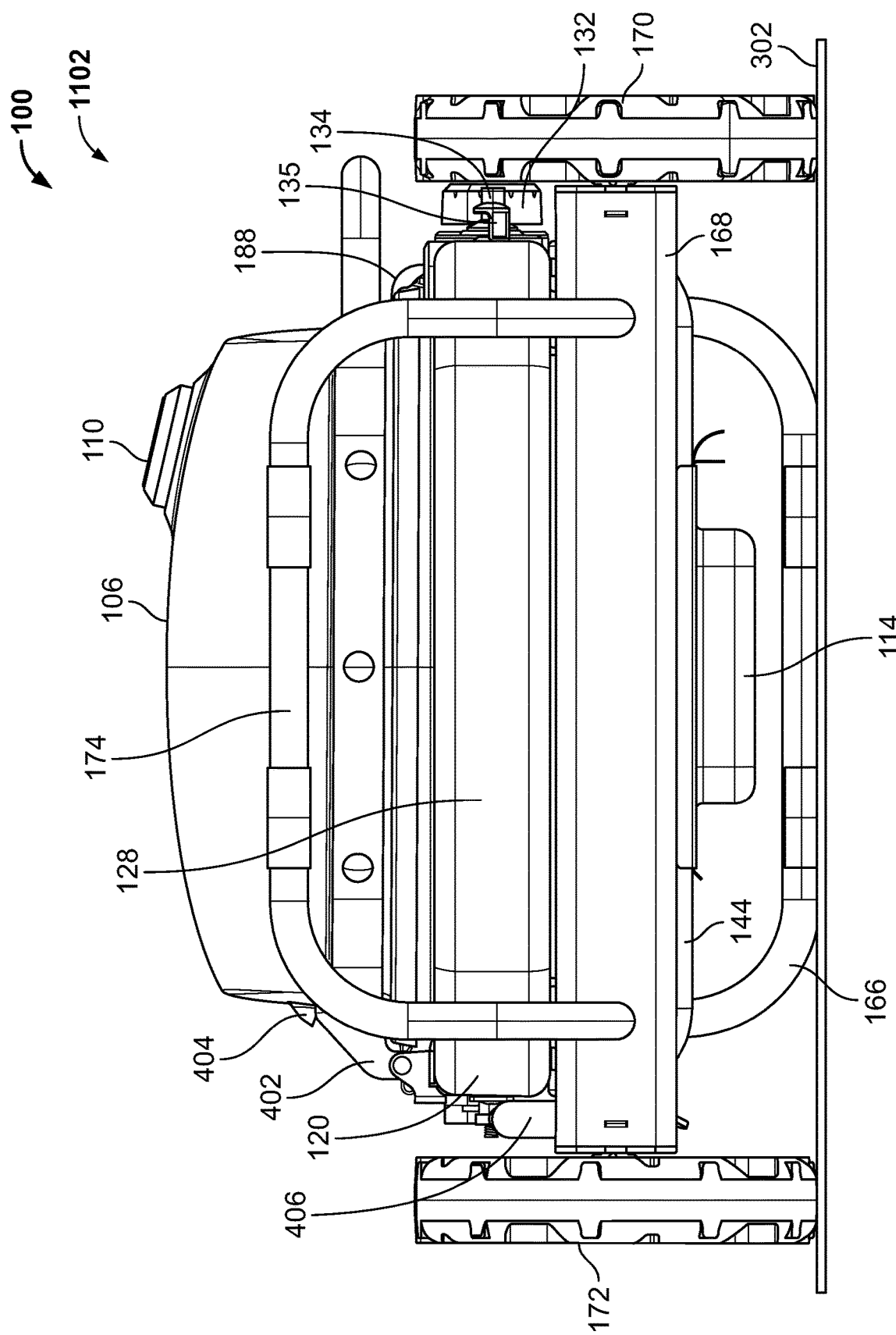
FIG. 16 is a left side view of the portable grill of FIGS. 1-15, with the portable grill shown positioned in the collapsed configuration of FIGS. 11-15.
Figure 17:
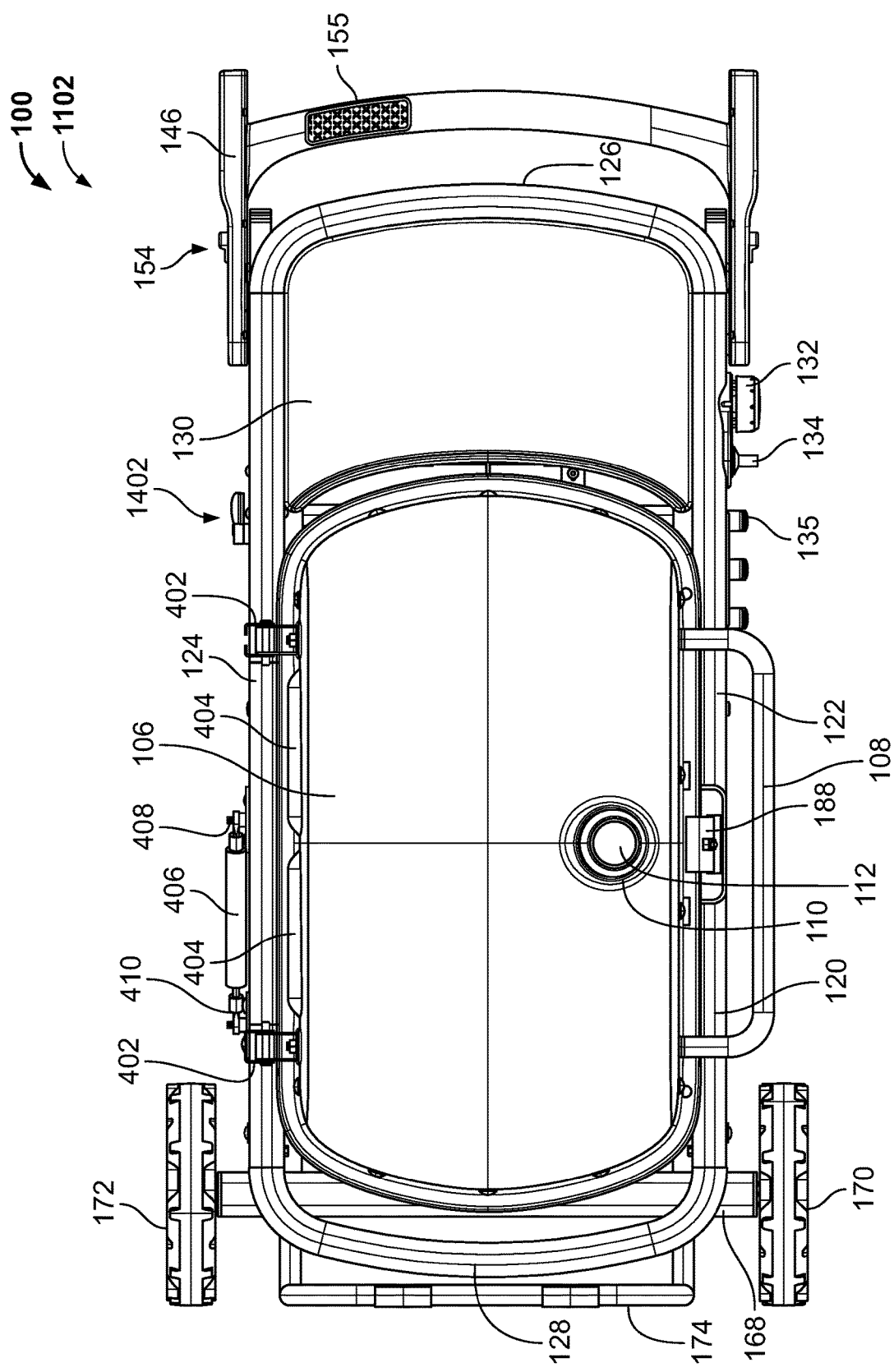
FIG. 17 is a top view of the portable grill of FIGS. 1-16, with the portable grill shown positioned in the collapsed configuration of FIGS. 11-16.
Figure 18:
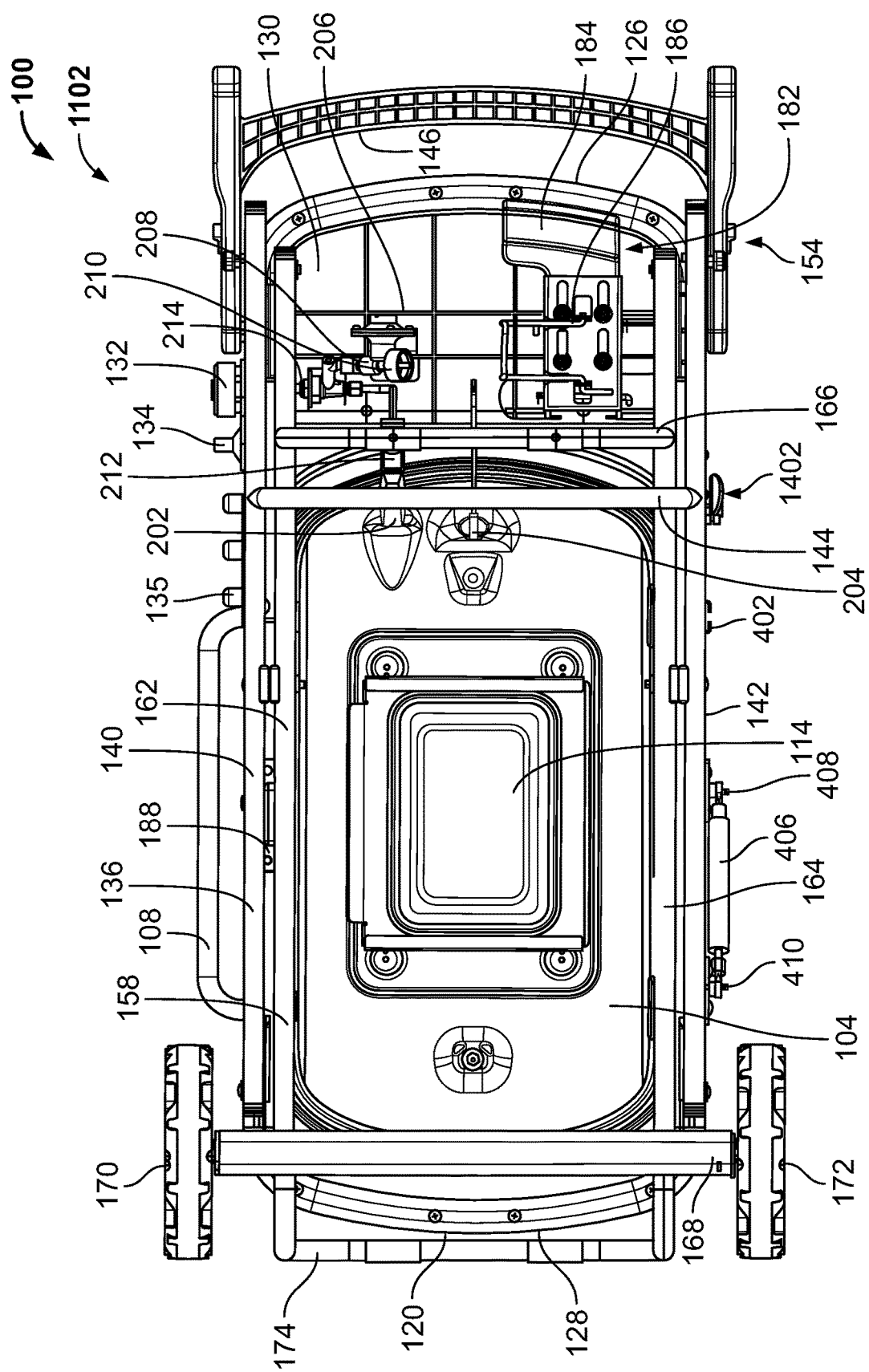
FIG. 18 is a bottom view of the portable grill of FIGS. 1-17, with the portable grill shown positioned in the collapsed configuration of FIGS. 11-17.
Figure 19:
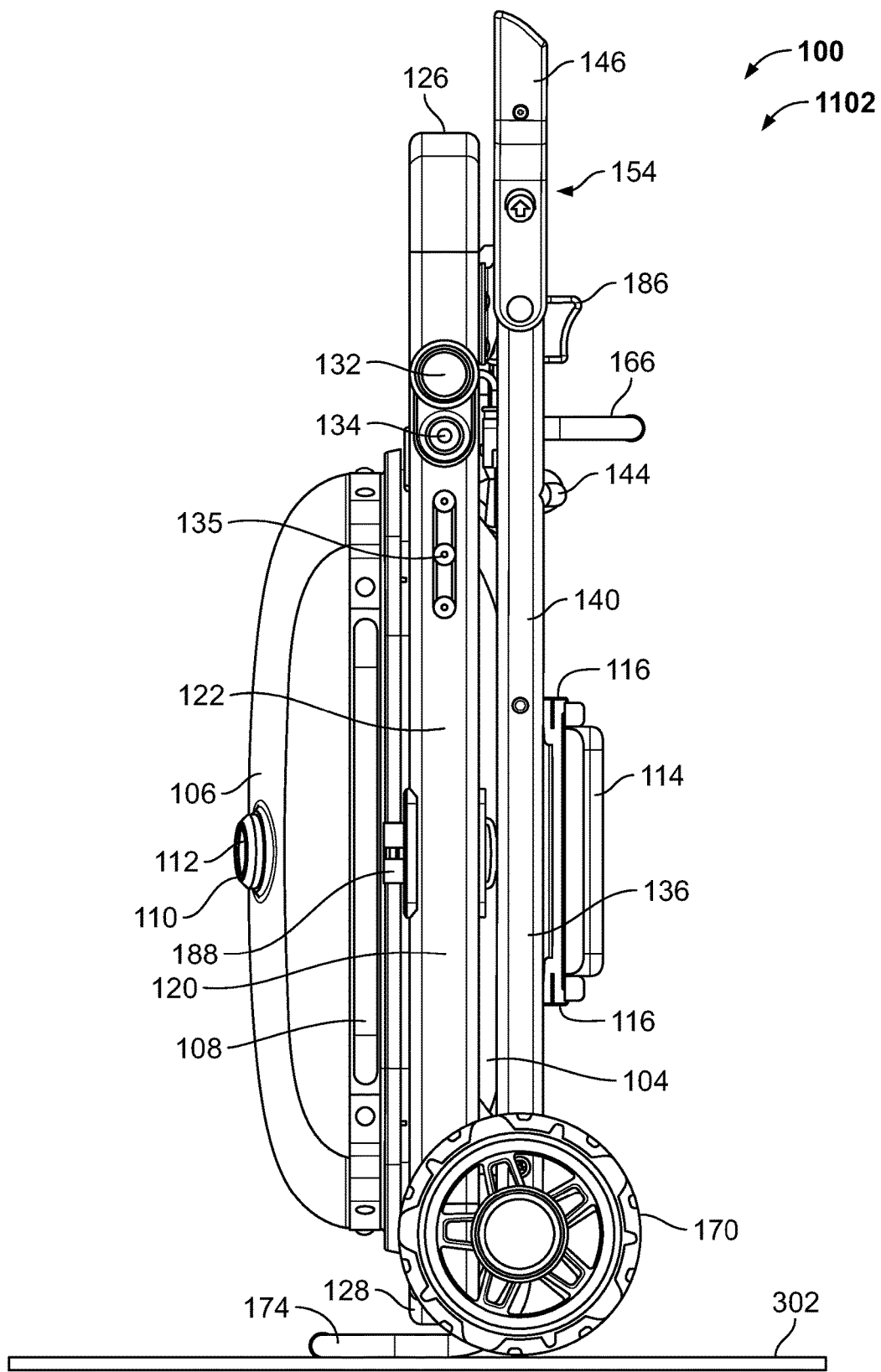
FIG. 19 is another front view of the portable grill of FIGS. 1-18, with the portable grill shown positioned in the collapsed configuration of FIGS. 11-18.
Figure 20:
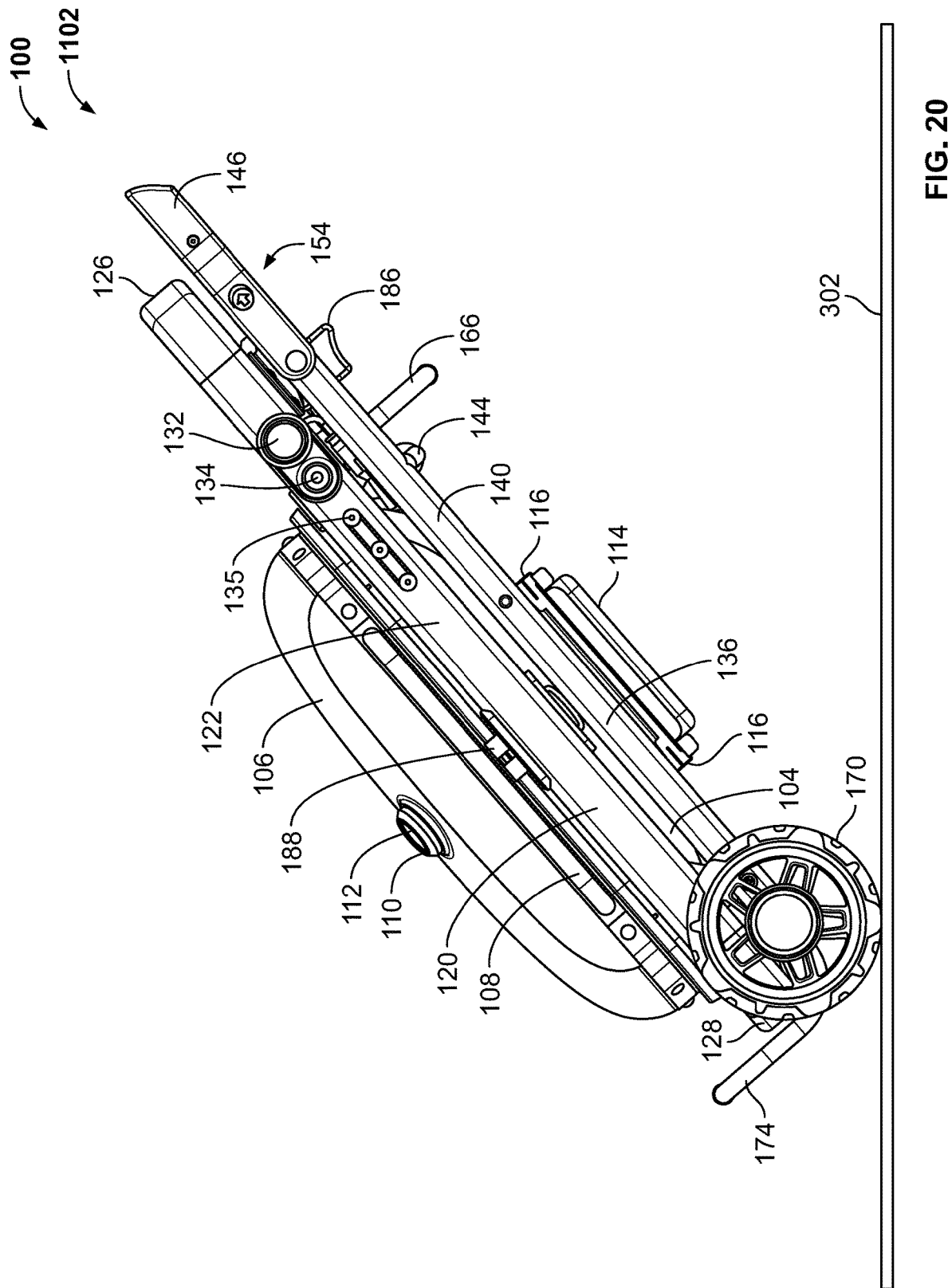
FIG. 20 is another front view of the portable grill of FIGS. 1-19, with the portable grill shown positioned in the collapsed configuration of FIGS. 11-19.

The portable grill 100 of FIGS. 1-10 can be moved (e.g., transitioned) from the erected configuration 102 shown in FIGS. 1-10 into an example collapsed configuration 1102 shown in FIGS. 11-20, and vice-versa. FIG. 11 is a first perspective view of the portable grill 100 shown positioned in the collapsed configuration 1102. FIG. 12 is a second perspective view of the portable grill 100 shown positioned in the collapsed configuration 1102. FIG. 13 is a front view of the portable grill 100 shown positioned in the collapsed configuration 1102. FIG. 14 is a rear view of the portable grill 100 shown positioned in the collapsed configuration 1102. FIG. 15 is a right side view of the portable grill 100 shown positioned in the collapsed configuration 1102. FIG. 16 is a left side view of the portable grill 100 shown positioned in the collapsed configuration 1102. FIG. 17 is a top view of the portable grill 100 shown positioned in the collapsed configuration 1102. FIG. 18 is a bottom view of the portable grill 100 shown positioned in the collapsed configuration 1102. FIG. 19 is another front view of the portable grill 100 shown positioned in the collapsed configuration 1102. FIG. 20 is another front view of the portable grill 100 shown positioned in the collapsed configuration 1102.

The portable grill 100 is configured to be positioned in the collapsed configuration 1102 shown in FIGS. 11-20 while the portable grill 100 is being transported from one location to another, and/or while the portable grill 100 is being stowed. As shown in FIGS. 13-16, 19, and 20, the portable grill 100 can be located on and/or supported by the underlying surface 302 when the portable grill 100 is positioned in the collapsed configuration 1102. In the illustrated example of FIGS. 13-16, the portable grill 100 is shown positioned in the collapsed configuration 1102 and oriented horizontally (e.g., parallel) relative to the underlying surface 302, as further described below. In the illustrated example of FIG. 19, the portable grill 100 is shown positioned in the collapsed configuration 1102 and oriented vertically (e.g., perpendicular) relative to the underlying surface 302, as further described below. In the illustrated example of FIG. 20, the portable grill 100 is shown positioned in the collapsed configuration 1102 and oriented at an angle (e.g., a forty-five degree angle) relative to the underlying surface 302, as further described below.

The portable grill 100 of FIGS. 1-20 includes an example cookbox 104 and an example lid 106. The lid 106 is movably coupled to the cookbox 104 via one or more example hinge(s) 402 that enable the lid 106 to be moved (e.g., pivoted and/or rotated) relative to the cookbox 104 between a closed position (e.g., as shown in FIGS. 1-20) and an open position. The cookbox 104 and the lid 106 collectively define an example cooking chamber 902 (e.g., as shown in FIGS. 9 and 10) of the portable grill 100 when the lid 106 is in the closed position. Placement of the lid 106 in the open position enables a user to access the cookbox 104 and/or the cooking chamber 902, as may be required to load, unload, and/or otherwise access one or more food item(s) located thereon or therein. Movement of the lid 106 between the closed position and the open position can be performed by a user of the portable grill 100 via an example handle 108 coupled to the lid 106.

In some examples, the orientation of the cookbox 104 of the portable grill 100 relative to the underlying surface 302 defines and/or constitutes the orientation of the portable grill 100. For example, as shown in FIGS. 3-6 and 13-16, the cookbox 104, and therefore the portable grill 100, is oriented horizontally (e.g., parallel) relative to the underlying surface 302. As another example, as shown in FIG. 19, the cookbox 104, and therefore the portable grill 100, is oriented vertically (e.g., perpendicular) relative to the underlying surface 302. As another example, as shown in FIG. 20, the cookbox 104, and therefore the portable grill 100, is oriented at an angle (e.g., a forty-five degree angle) relative to the underlying surface 302.

The cooking chamber 902 of the portable grill 100 is configured to cook (e.g., grill, smoke, bake, roast, broil, sear, and/or otherwise heat) one or more food item(s) located therein. Such food item(s) can be placed on one or more example cooking grate(s) 904 located within the cookbox 104 and/or within the cooking chamber 902, with the cooking grate(s) 904 being supported by one or more portion(s) (e.g., a wall surface, an edge, a lip, a flange, a bracket, etc.) of the cookbox 104. Example vents 404 formed along a rear surface of the lid 106 are configured to release heat and/or smoke from the cooking chamber 902 during the cooking process. An example temperature gauge 110 is coupled to the lid 106 such that an example sensor portion 906 of the temperature gauge 110 extends into and/or is located within the cooking chamber 902 (e.g., to sense and/or detect the temperature within the cooking chamber 902), and such that an example display portion 112 of the temperature gauge 110 is visible and/or viewable externally from the cooking chamber 902 (e.g., to facilitate presentation of the sensed and/or detected temperature of the cooking chamber 902 to a user of the portable grill 100).

Figure 21:
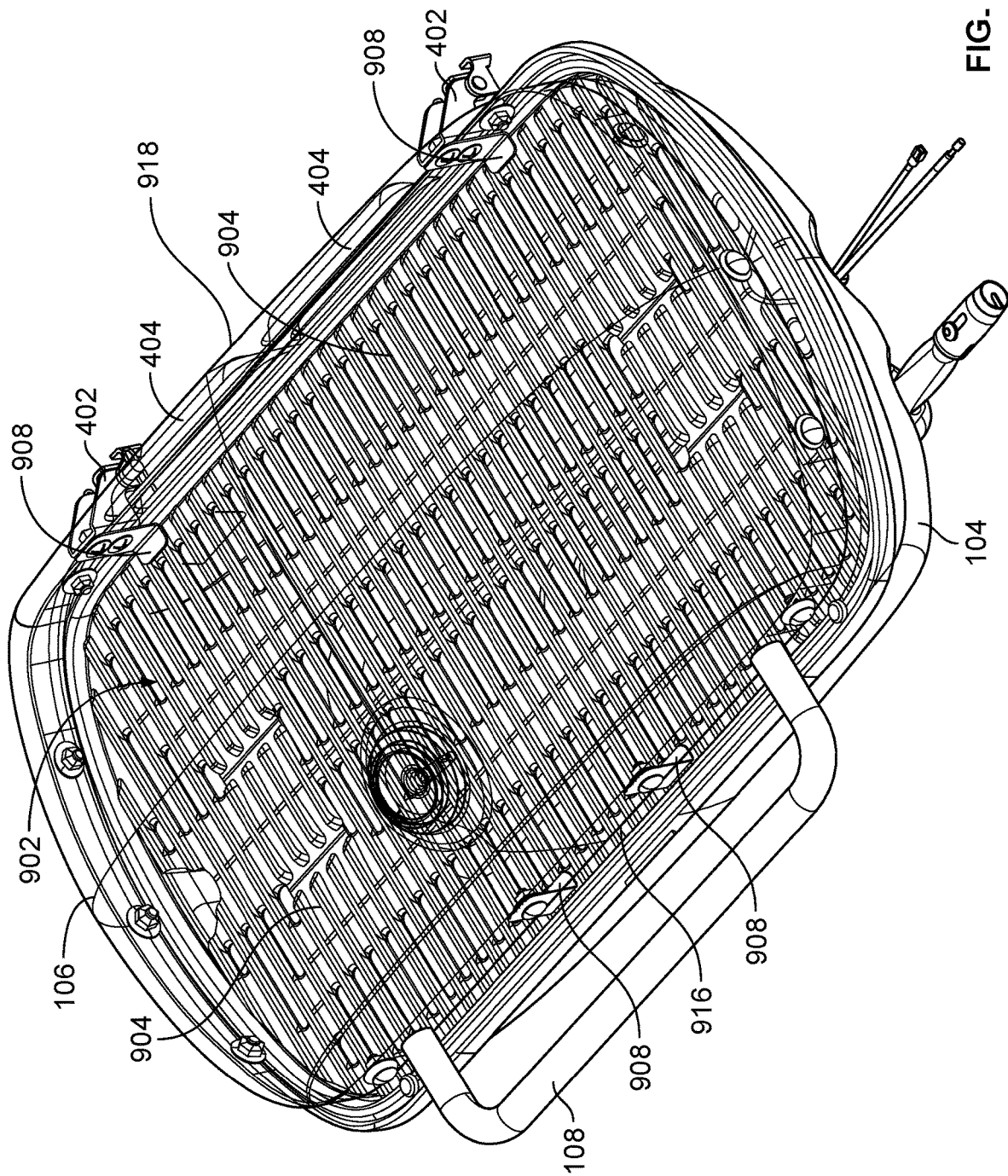
FIG. 21 is a perspective view of the cooking chamber, the cooking grate(s), and the grate retainers of the portable grill of FIGS. 1-20, with the lid that partially defines the cooking chamber shown in phantom to enhance the viewability of the cooking grate(s) and the grate retainers.

The portable grill 100 of FIG. 1-20 further includes example grate retainers 908 located within the cooking chamber 902. As shown in FIGS. 9 and 10, each grate retainer 908 extends inwardly from an example inner surface 910 of the lid 106. FIG. 21 provides an additional view of the cooking chamber 902, the cooking grate(s) 904, and the grate retainers 908 of the portable grill 100 of FIGS. 1-20, with the lid 106 that partially defines the cooking chamber 902 shown in phantom to enhance the viewability of the cooking grate(s) 904 and the grate retainers 908. Each grate retainer 908 of the portable grill 100 is coupled (e.g., via one or more fastener(s)) to the lid 106 of the portable grill 100. As shown in FIGS. 9, 10, and 21, the portable grill includes a total of four separate grate retainers 908. First and second ones of the grate retainers 908 are coupled to an example front portion 916 of the lid 106, with the first and second ones of the grate retainers 908 being spaced apart from one another along the front portion 916 of the lid 106 and extending inwardly therefrom. Third and fourth ones of the grate retainers 908 are coupled to an example rear portion 918 of the lid 106, with the third and fourth ones of the grate retainers 908 being spaced apart from one another along the rear portion 918 of the lid 106 and extending inwardly therefrom. In other examples, the portable grill 100 may include a different number (e.g., 2, 3, 5, 6, etc.) of grate retainers 908. In some examples, one or more of the grate retainers 908 can further be coupled to the handle 108 of the lid 106, or to one or more of the hinge(s) 402 that couple the lid 106 to the cookbox 104. For example, as shown in FIGS. 9, 10, and 21, the third and fourth ones of the grate retainers 908 that are coupled to the rear portion 918 of the lid 106 are also respectively coupled to first and second ones of the hinges 402 of the portable grill 100.

As further shown in FIGS. 9, 10, and 21, the cooking grate(s) 904 is/are supported in part by an example lip 920 of the cookbox 104. The cooking grate(s) 904 is/are movable relative to the lip 920 when the lid 106 is in the open position. The cooking grate(s) 904 is/are retained between the lip 920 and the grate retainers 908 when the lid 106 is in the closed position, thereby restricting movement of the cooking grate(s) 904 relative to the lip 920. The cooking grate(s) 904 is/are also supported in part by example grate support flanges 922 that are coupled to the cookbox 104. Each grate support flange 922 extends inwardly from an example inner surface 924 of the cookbox 104. The cooking grate(s) 904 is/are movable relative to the grate support flanges 922 when the lid 106 is in the open position. The cooking grate(s) 904 is/are retained between the grate support flanges 922 and the grate retainers 908 when the lid 106 is in the closed position, thereby restricting movement of the cooking grate(s) 904 relative to the grate support flanges 922.

The grate retainers 908 of the portable grill 100 are individually and/or collectively configured to restrict (e.g., prevent) movement of the cooking grate(s) 904 of the portable grill 100 relative to the lip 920 and/or the grate support flanges 922, and/or, more generally, to the cookbox 104 and/or the cooking chamber 902 of the portable grill 100. In some examples, the grate retainers 908 are advantageously configured to restrict (e.g., prevent) movement of the cooking grate(s) 904 relative to the lip 920 and/or the grate support flanges 922, and/or, more generally, to the cookbox 104 and/or the cooking chamber 902 when the portable grill 100 is positioned in the collapsed configuration 1102 and oriented either vertically (e.g., perpendicular) relative to the underlying surface 302 (e.g., as shown in FIG. 19), or at an angle (e.g., a forty-five degree angle) relative to the underlying surface 302 (e.g., as shown in FIG. 20). Thus, the grate retainers 908 advantageously eliminate any shifting and/or movement of the cooking grate(s) 904 relative to the lip 920 and/or the grate support flanges 922, and/or, more generally, to the cookbox 104 and/or the cooking chamber 902 that might otherwise occur in connection with transporting and/or stowing the portable grill 100.

The portable grill 100 of FIGS. 1-20 further includes an example burner tube 202 and an example ignitor assembly 204 respectively located at least partially within the cookbox 104 and/or at least partially within the cooking chamber 902. As shown in FIGS. 9 and 10, the portion of the burner tube 202 located within the cookbox 104 and/or within the cooking chamber 902 is positioned between the cooking grate(s) 904 and an example bottom wall 912 of the cookbox 104. The portion of the ignitor assembly 204 located within the cookbox 104 and/or within the cooking chamber 902 is similarly positioned, and is operatively coupled to the burner tube 202 such that an electrical spark produced by the ignitor assembly 204 can ignite gaseous fuel located within and/or passing through the burner tube 202.

Figure 22:
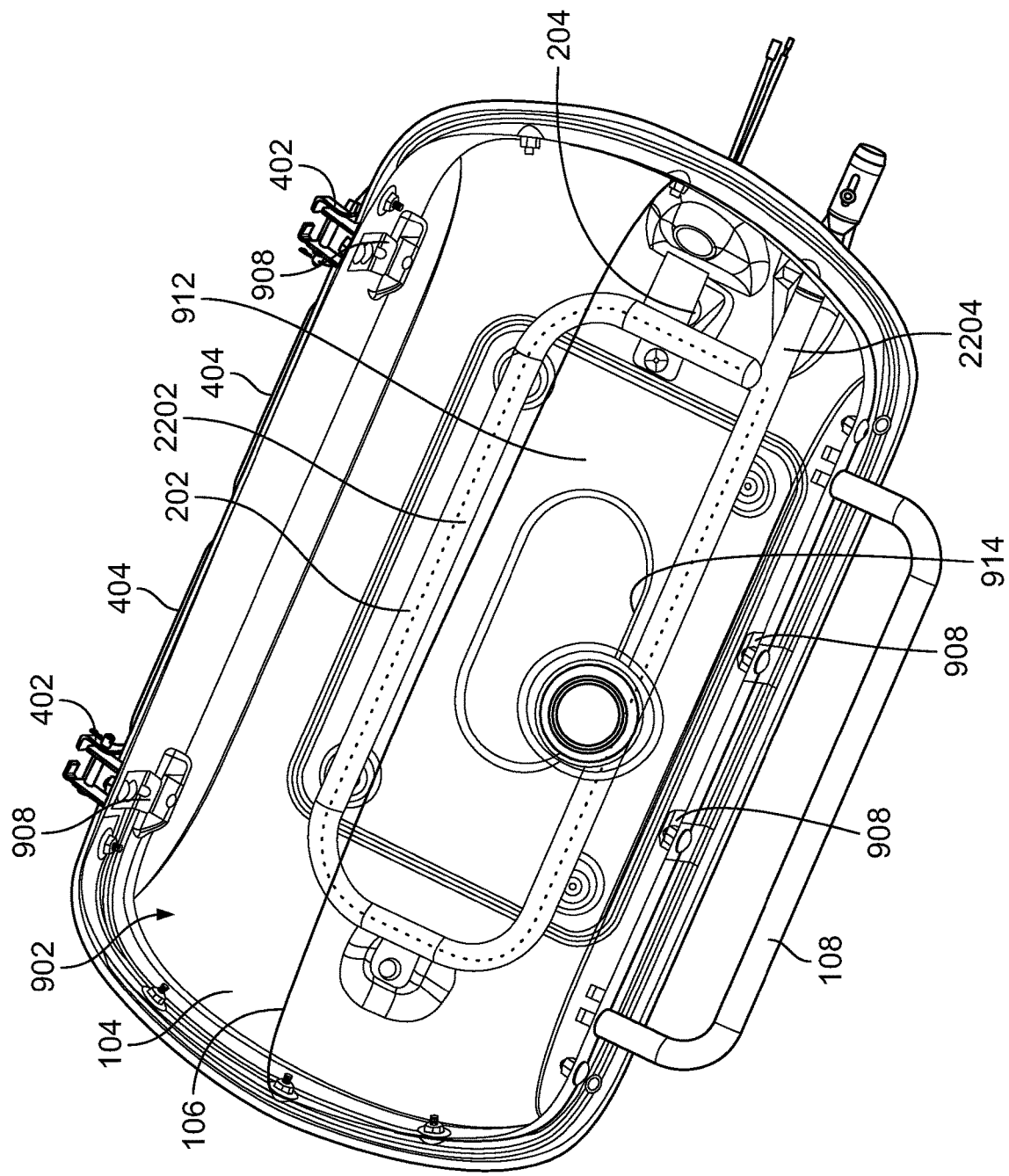
FIG. 22 is a perspective view of the cooking chamber, the burner tube, and a portion of the ignitor assembly of the portable grill of FIGS. 1-20, with the lid that partially defines the cooking chamber shown in phantom to enhance the viewability of the portion of the burner tube and the portion of the ignitor assembly.

FIG. 22 provides an additional view of the cooking chamber 902, the burner tube 202, and the above-referenced portion of the ignitor assembly 204 of the portable grill 100 of FIGS. 1-20, with the lid 106 that partially defines the cooking chamber 902 shown in phantom to enhance the viewability of the portion of the burner tube 202 and the portion of the ignitor assembly 204 that are respectively located within the cooking chamber 902. As shown in FIG. 22, the burner tube 202 has a P-shaped profile including an example head portion 2202 located within the cookbox 104 and an example neck portion 2204 that extends from the head portion 2202 to a location outside of the cookbox 104. In some examples, the burner tube 202 is supported by one or more portion(s) (e.g., a wall surface, an edge, a lip, a flange, a bracket, etc.) of the cookbox 104, and the ignitor assembly 204 is supported by one or more portion(s) (e.g., a wall surface, an edge, a lip, a flange, a bracket, etc.) of the cookbox 104 and/or of the burner tube 202.

The portable grill 100 of FIG. 1-20 further includes an example catch pan 114 coupled to the cookbox 104 via one or more example support(s) 116 extending downwardly from the cookbox 104. In the illustrated example of FIGS. 1-20, the catch pan 114 is located and/or positioned below the cookbox 104 in alignment with an example opening 914 formed in the bottom wall 912 of the cookbox 104. The opening 914 of the cookbox 104 is configured to enable waste (e.g., grease, ash, etc.) produced during the cooking process to pass from the cookbox 104 and/or the cooking chamber 902 into and/or onto the catch pan 114. In some examples, the catch pan 114 is configured to contain, carry, and/or otherwise support an example drip pan 118 that can be removably located on and/or within the catch pan 114. In such examples, waste passing from the cookbox 104 and/or the cooking chamber 902 via the opening 914 of the cookbox 104 is received directly within the drip pan 118. The received waste can subsequently be removed from the portable grill 100 by removing the drip pan 118 from the catch pan 114. In some examples, the drip pan 118 is configured as a removable metal (e.g., aluminum) liner that is intended to be periodically disposed of and replaced.

The portable grill 100 of FIGS. 1-20 further includes an example frame 120. The cookbox 104 of the portable grill 100 is circumscribed by the frame 120 and is rigidly coupled thereto such that the cookbox 104 and the frame 120 move in a unitary manner (e.g., in connection with transitioning the portable grill 100 from the erected configuration 102 into the collapsed configuration 1102). In the illustrated example of FIGS. 1-20, the cookbox 104 is asymmetrically located and/or positioned within a boundary formed by the frame 120. More specifically, the cookbox 104 is located and/or positioned closer to the left side of the frame 120 than to the right side of the frame 120. In other examples, the cookbox 104 can alternatively be asymmetrically located and/or positioned within the frame 120 such that the cookbox 104 is instead located and/or positioned closer to the right side of the frame 120 than to the left side of the frame 120. In still other examples, the cookbox 104 can alternatively be centrally located and/or positioned within the frame 120 such that the cookbox 104 is located and/or positioned in an equidistant manner relative to the right and left sides of the frame 120.

In some examples, the orientation of the frame 120 of the portable grill 100 relative to the underlying surface 302 defines and/or constitutes the orientation of the portable grill 100. For example, as shown in FIGS. 3-6 and 13-16, the frame 120, and therefore the portable grill 100, is oriented horizontally (e.g., parallel) relative to the underlying surface 302. As another example, as shown in FIG. 19, the frame 120, and therefore the portable grill 100, is oriented vertically (e.g., perpendicular) relative to the underlying surface 302. As another example, as shown in FIG. 20, the frame 120, and therefore the portable grill 100, is oriented at an angle (e.g., a forty-five degree angle) relative to the underlying surface 302.

In the illustrated example of FIGS. 1-20, the frame 120 is formed by a plurality of frame rails including an example front rail 122, an example rear rail 124, an example right side rail 126, and an example left side rail 128. The rear rail 124 is spaced apart from the front rail 122, and the left side rail 128 is spaced apart from the right side rail 126. The front rail 122 is coupled (e.g., via one or more fastener(s) and/or interlocking member(s)) to the right side rail 126 and the left side rail 128. The rear rail 124 is similarly coupled (e.g., via one or more fastener(s) and/or interlocking member(s)) to the right side rail 126 and the left side rail 128. In other examples, two or more of the above-identified rail(s) of the frame 120 can be integrally formed with one another such that the integrally-formed rails of the frame 120 are inseparable from one another.

In the illustrated example of FIGS. 1-20, one or more portion(s) of the frame 120 (e.g., one or more portion(s) of the front rail 122, the rear rail 124, the right side rail 126, and/or the left side rail 128) is/are hollow. In some examples, the hollow portion(s) of the frame 120 is/are configured to receive, contain, support, and/or carry one or more portion(s) of one or more other component(s) of the portable grill 100. For example, the hollow portion(s) of the frame 120 can receive, contain, support, and/or carry one or more portion(s) of one or more component(s) of any of a first leg unit, a second leg unit, a leg lock assembly, and/or a lid lock assembly of the portable grill 100, as further described below. In some examples, the received, contained, supported, and/or carried portion(s) of the component(s) is/are movable (e.g., translatable and/or rotatable) within the hollow portion(s) of the frame 120. In some examples, locating and/or positioning the portion(s) of the component(s) within the hollow portion(s) of the frame 120 partially or fully conceals the portion(s) of the component(s) from exposure, thereby advantageously reducing wear on, and/or reducing the possibility of mechanical damage to, the concealed portion(s) of the component(s).

The portable grill 100 of FIGS. 1-20 further includes an example table 130 rigidly coupled to the frame 120. The table 130 is configured to support and/or carry one or more item(s) including, for example, one or more food item(s), one or more food preparation item(s), one or more cooking utensil(s), and/or one or more food temperature monitoring device(s). In the illustrated example of FIGS. 1-20, the table 130 extends between the front rail 122 and the rear rail 124 of the frame 120, and further extends from the right side rail 126 of the frame 120 to and/or toward the right side of the cookbox 104, thereby substantially filling a gap that would otherwise exist between the right side rail 126 of the frame 120 and the right side of the cookbox 104 as a result of the cookbox 104 being asymmetrically located and/or positioned toward the left side rail 128 of the frame 120. In other examples described above in which the cookbox 104 is instead asymmetrically located and/or positioned toward the right side rail 126 of the frame 120, the table 130 can alternatively be located and/or positioned between the left side rail 128 of the frame 120 and the left side of the cookbox 104. In still other examples described above in which the cookbox 104 is instead centrally located and/or positioned relative to the right side rail 126 and the left side rail 128 of the frame 120, a second table (e.g., configured as a mirror image of the table 130) can be located and/or positioned between the left side rail 128 of the frame 120 and the left side of the cookbox 104.

The portable grill 100 of FIGS. 1-20 further includes an example support plate 206 rigidly coupled to the frame 120, with the support plate 206 being located and/or positioned below (e.g., along an underside of) the table 130. The support plate 206 is configured to support and/or carry one or more portion(s) of one or more component(s) of the portable grill 100. For example, the support plate 206 can support and/or carry one or more portion(s) of one or more component(s) of any of the table 130, a valve and regulator assembly, and/or a leg lock assembly of the portable grill 100, as further described below. In the illustrated example of FIGS. 1-20, the support plate 206 extends between and is rigidly coupled to the front rail 122 and the rear rail 124 of the frame 120.

Figure 23:
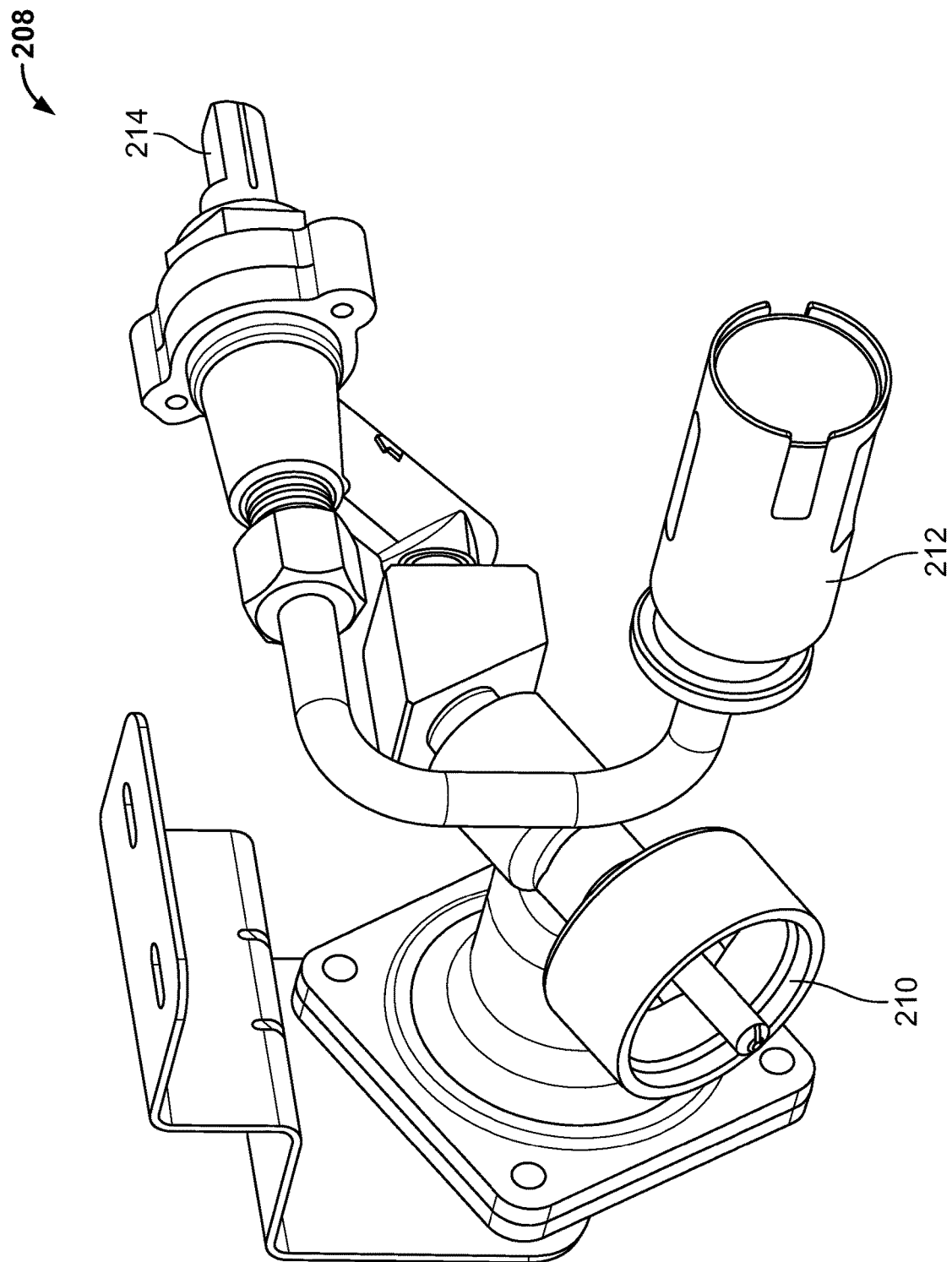
FIG. 23 is a perspective view of the valve and regulator assembly of the portable grill of FIGS. 1-20.

The portable grill 100 of FIGS. 1-20 further includes an example valve and regulator assembly 208 located and/or positioned below the support plate 206 and/or the table 130, and coupled to the support plate 206 and/or the frame 120. FIG. 23 provides an additional view of the valve and regulator assembly 208 of the portable grill 100 of FIGS. 1-20. The valve and regulator assembly 208 includes an example tank connector 210, an example burner tube connector 212, and an example valve stem 214. The tank connector 210 is configured to removably couple (e.g., via a threaded connection) a fuel tank to the valve and regulator assembly 208 and/or, more generally, to the portable grill 100. The burner tube connector 212 is configured to couple the valve and regulator assembly 208 to the burner tube 202 of the portable grill 100 such that gaseous fuel received at the valve and regulator assembly 208 from a connected fuel tank is directed into the burner tube 202. The valve stem 214 is configured to control and/or regulate the flow of gaseous fuel through the valve and regulator assembly 208 and/or into the burner tube 202. For example, movement (e.g., rotation) of the valve stem 214 in a first direction may increase the flow of gaseous fuel through the valve and regulator assembly 208 and/or into the burner tube 202, while movement (e.g., rotation) of the valve stem 214 in a second direction opposite the first direction may decrease the flow of gaseous fuel through the valve and regulator assembly 208 and/or into the burner tube 202.

An example control knob 132 is rigidly coupled to the valve stem 214 of the valve and regulator assembly such that the control knob 132 and the valve stem 214 move (e.g., rotate) in a unitary manner. The control knob 132 is configured to be moved (e.g., rotated) by a user of the portable grill 100 to control and/or regulate (e.g., via the valve stem 214 coupled to the control knob 132) the flow of gaseous fuel through the valve and regulator assembly 208 and/or into the burner tube 202. In the illustrated example of FIGS. 1-20, the valve stem 214 of the valve and regulator assembly 208 extends through an opening (e.g., a through hole) formed in the front rail 122 of the frame 120. The control knob 132 is coupled to a free end of the valve stem 214, and is located and/or positioned along the front rail 122 of the frame 120 (e.g., along a front surface of the front rail 122).

An example piezo ignitor 216 of the ignitor assembly 204 of the portable grill 100 similarly extends through an opening (e.g., a through hole) formed in the front rail 122 of the frame 120. An example ignitor button 134 of the ignitor assembly 204 is coupled to and/or supported by the piezo ignitor 216, with the ignitor button 134 being located and/or positioned along the front rail 122 of the frame 120 (e.g., along a front surface of the front rail 122) adjacent the control knob 132. Example electrical leads 218 (e.g., wires) of the ignitor assembly 204 can be routed from the piezo ignitor 216 of the ignitor assembly 204 to the above-described portion of the ignitor assembly 204 located within the cookbox 104 and/or within the cooking chamber 902 of the portable grill 100, thereby completing and/or forming an ignition circuit of the ignitor assembly 204.

The portable grill 100 of FIGS. 1-20 further includes one or more example tool hook(s) 135 rigidly coupled (e.g., via one or more fastener(s)) to the front rail 122 of the frame 120. The tool hook(s) 135 is/are configured to support and/or carry one or more item(s) including, for example, one or more food preparation item(s), one or more cooking utensil(s), one or more cleaning utensil(s), and/or one or more food temperature monitoring device(s). In other examples, one or more of the tool hook(s) 135 can alternatively be rigidly coupled to the right side rail 126, the left side rail 128, and/or the rear rail 124 of the frame 120.

Figure 24:
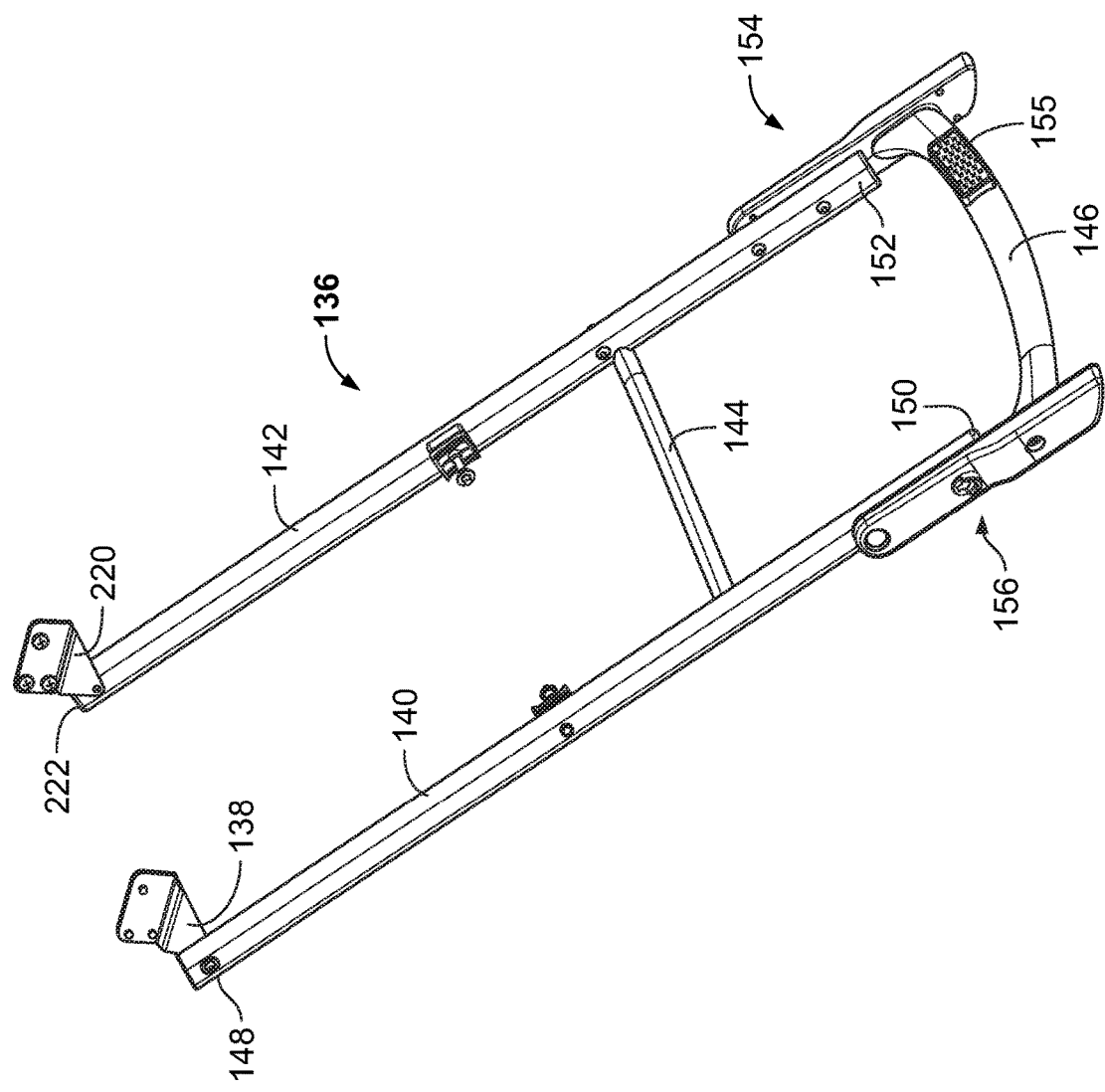
FIG. 24 is a perspective view of the first leg unit of the portable grill of FIGS. 1-20, with the first leg unit shown in isolation.
Figure 25:
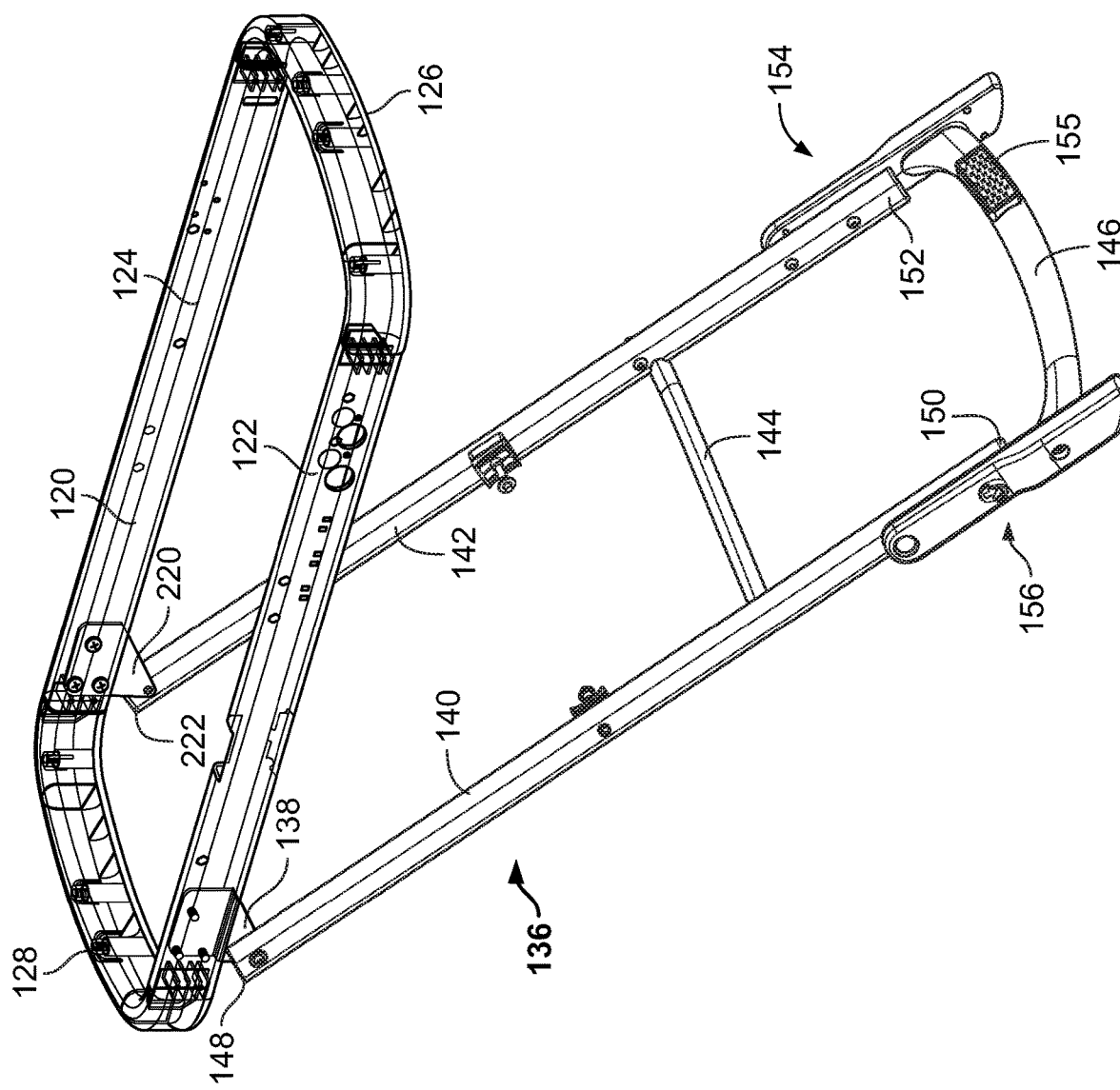
FIG. 25 is a perspective view of the first leg unit of the portable grill of FIGS. 1-20, with the first leg unit shown relative to the frame, and with the frame shown in phantom to enhance the viewability of the front flange and the rear flange of the first leg unit.

The portable grill 100 of FIGS. 1-20 further includes an example first leg unit 136 coupled to the frame 120. In the illustrated example of FIGS. 1-20, the first leg unit 136 includes an example front flange 138, an example rear flange 220, an example front leg 140, an example rear leg 142, an example crossbar 144, and an example foldable foot 146. FIG. 24 provides an additional view of the first leg unit 136 of the portable grill 100 of FIGS. 1-20, with the first leg unit 136 shown in isolation. FIG. 25 provides an additional view of the first leg unit 136 of the portable grill 100 of FIGS. 1-20, with the first leg unit 136 shown relative to the frame 120, and with the frame 120 shown in phantom to enhance the viewability of the front flange 138 and the rear flange 220 of the first leg unit 136. The front flange 138 and the rear flange 220 of the first leg unit 136 are rigidly coupled to the frame 120. More specifically, the front flange 138 of the first leg unit 136 is rigidly coupled (e.g., via one or more fastener(s)) to the front rail 122 of the frame 120, and the rear flange 220 of the first leg unit 136 is rigidly coupled (e.g., via one or more fastener(s)) to the rear rail 124 of the frame 120.

The front leg 140 of the first leg unit 136 includes an example first end 148 and an example second end 150 located opposite the first end 148. The first end 148 of the front leg 140 is pivotally coupled (e.g., via one or more fastener(s)) to the front flange 138 of the first leg unit 136 such that the front leg 140 of the first leg unit 136 is rotatable relative to the front flange 138 of the first leg unit 136, and/or relative to the frame 120. In some examples, a rotary damper is operatively coupled to and/or operatively located between the front leg 140 and the front flange 138 of the first leg unit 136 (e.g., at the location where the front leg 140 is pivotally coupled to the front flange 138). In such examples, the rotary damper is configured to restrict (e.g., mechanically dampen) the front leg 140 of the first leg unit 136 from rapidly and/or freely collapsing relative to the frame 120 under the weight of the cookbox 104 as the portable grill 100 is transitioned from the erected configuration 102 into the collapsed configuration 1102.

The rear leg 142 of the first leg unit 136 includes an example first end 222 and an example second end 152 located opposite the first end 222. The first end 222 of the rear leg 142 is pivotally coupled (e.g., via one or more fastener(s)) to the rear flange 220 of the first leg unit 136 such that the rear leg 142 of the first leg unit 136 is rotatable relative to the rear flange 220 of the first leg unit 136, and/or relative to the frame 120. In some examples, a rotary damper is operatively coupled to and/or operatively located between the rear leg 142 and the rear flange 220 of the first leg unit 136 (e.g., at the location where the rear leg 142 is pivotally coupled to the rear flange 220). In such examples, the rotary damper is configured to restrict (e.g., mechanically dampen) the rear leg 142 of the first leg unit 136 from rapidly and/or freely collapsing relative to the frame 120 under the weight of the cookbox 104 as the portable grill 100 is transitioned from the erected configuration 102 into the collapsed configuration 1102.

The crossbar 144 of the first leg unit 136 extends between and is rigidly coupled to the front and rear legs 140, 142 of the first leg unit 136 such that movement (e.g., rotation) of the front leg 140 of the first leg unit 136 occurs in a unitary manner relative to movement (e.g., rotation) of the rear leg 142 of the first leg unit 136, and vice-versa. In the illustrated example of FIGS. 1-20, the crossbar 144 of the first leg unit 136 is rigidly coupled to the front leg 140 of the first leg unit 136 at a location between the first end 148 and the second end 150 of the front leg 140, and is further rigidly coupled to the rear leg 142 of the first leg unit 136 at a location between the first end 222 and the second end 152 of the rear leg 142. In some examples, the crossbar 144 of the first leg unit 136 is rigidly coupled to the front and rear legs 140, 142 of the first leg unit 136 via one or more fastener(s). In other examples, the crossbar 144 of the first leg unit 136 can alternatively be integrally formed with the front and rear legs 140, 142 of the first leg unit 136 such that the crossbar 144 is inseparable from the front and rear legs 140, 142.

Figure 26:
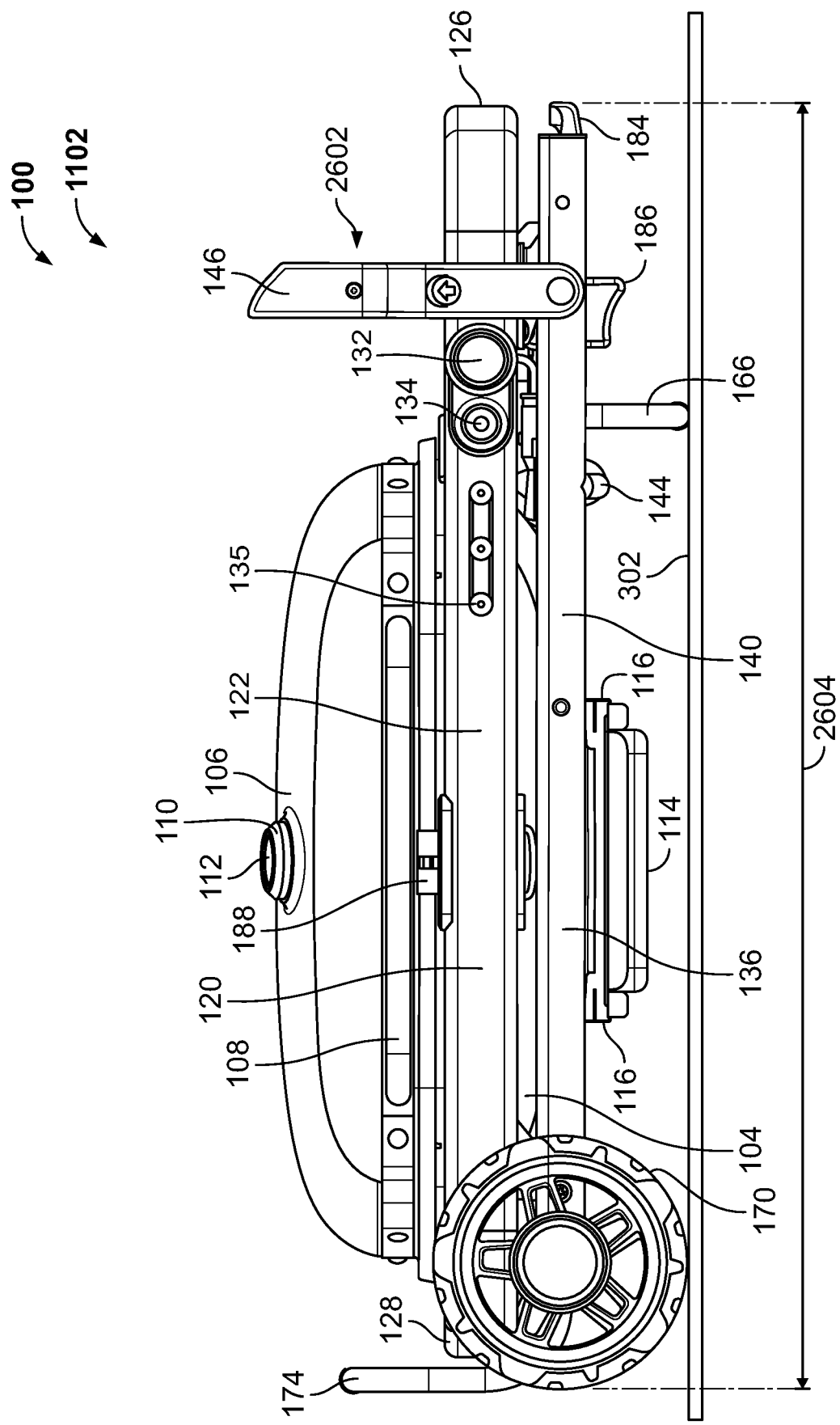
FIG. 26 illustrates the foldable foot of the portable grill of FIGS. 1-20 positioned in an example folded configuration.

The foldable foot 146 of the first leg unit 136 is pivotally coupled (e.g., via one or more fastener(s)) to the second end 150 of the front leg 140 of the first leg unit 136 and to the second end 152 of the rear leg 142 of the first leg unit 136 such that the foldable foot 146 is rotatable relative to the front and rear legs 140, 142 (e.g., between un unfolded configuration and a folded configuration). FIGS. 1-20 illustrate the foldable foot 146 positioned in an example unfolded configuration 154. When the foldable foot 146 is positioned in the unfolded configuration 154, the foldable foot 146 is generally aligned with (e.g., extending in a same direction as) the front and rear legs 140, 142 of the first leg unit 136. FIG. 26 illustrates the foldable foot 146 positioned in an example folded configuration 2602. In some examples, the portable grill 100 has an example first width 1302 when the foldable foot 146 is positioned in the unfolded configuration 154 and the portable grill 100 is positioned in the collapsed configuration 1102 (e.g., as shown in FIG. 13), and further has an example second width 2604 less than the first width 1302 when the foldable foot 146 is positioned in the folded configuration 2602 and the portable grill 100 is positioned in the collapsed configuration 1102 (e.g., as shown in FIG. 26). Accordingly, movement of the foldable foot 146 from the unfolded configuration 154 into the folded configuration 2602 can advantageously reduce the width of the portable grill 100, which can be advantageous when a user wishes to transport the portable grill 100 in a confined space (e.g., e.g., a trunk, a flatbed, or a cargo area of a vehicle).

The foldable foot 146 is configured to engage and/or contact the underlying surface 302 in connection with supporting the portable grill 100 when the foldable foot 146 is positioned in the unfolded configuration 154, and the portable grill 100 is positioned in the erected configuration 102 and oriented horizontally (e.g., parallel) to the underlying surface 302 (e.g., as shown in FIGS. 3-6). The foldable foot 146 is further configured to provide and/or function as a handle by which the portable grill 100 can be pushed and/or pulled when the foldable foot 146 is positioned in the unfolded configuration 154, and the portable grill 100 is positioned in the collapsed configuration 1102 and oriented either vertically (e.g., perpendicular) relative to the underlying surface 302 (e.g., as shown in FIG. 19) or at an angle (e.g., a forty-five degree angle) relative the underlying surface 302 (e.g., as shown in FIG. 20). The foldable foot 146 is further configured to provide and/or function as a handle by which the portable grill 100 can be picked up and/or carried when the foldable foot 146 is positioned in the folded configuration 2602, and the portable grill 100 is positioned in the collapsed configuration 1102 and oriented horizontally (e.g., parallel) to the underlying surface 302 (e.g., as shown in FIG. 26). The multi-configured nature of the foldable foot 146 of the first leg unit 136 advantageously eliminates any need for separate and/or multiple structures to facilitate the above-described supporting, pushing, and/or pulling, and picking up and/or carrying functions of the foldable foot 146.

In some examples, it may be advantageous for a user of the portable grill 100 to step and/or stand on a portion of the foldable foot 146 in connection with the user transitioning the portable grill 100 from the collapsed configuration 1102 into the erected configuration 102, and vice-versa. The foldable foot 146 advantageously includes an example foot placement indicator 155 configured to identify a specific location on and/or along the foldable foot 146 at which the user of the portable grill 100 is to step and/or stand to mechanically enhance the transitioning of the portable grill 100 from the collapsed configuration 1102 into the erected configuration 102, and vice-versa.

In some examples, the foldable foot 146 includes an example foot lock assembly 156 configured to selectively lock the position of the foldable foot 146 relative to the position of the front and rear legs 140, 142 of the first leg unit 136. In some examples, the foot lock assembly 156 locks the foldable foot 146 relative to the front and rear legs 140, 142 when the foldable foot is positioned in the unfolded configuration 154 described above. In response to actuation of the foot lock assembly 156 by a user of the portable grill 100 when the foldable foot 146 is positioned in the unfolded configuration 154, the foldable foot 146 can be released from the unfolded configuration 154 and subsequently pivoted and/or rotated from the unfolded configuration 154 into the folded configuration 2602 described above.

Figure 27:
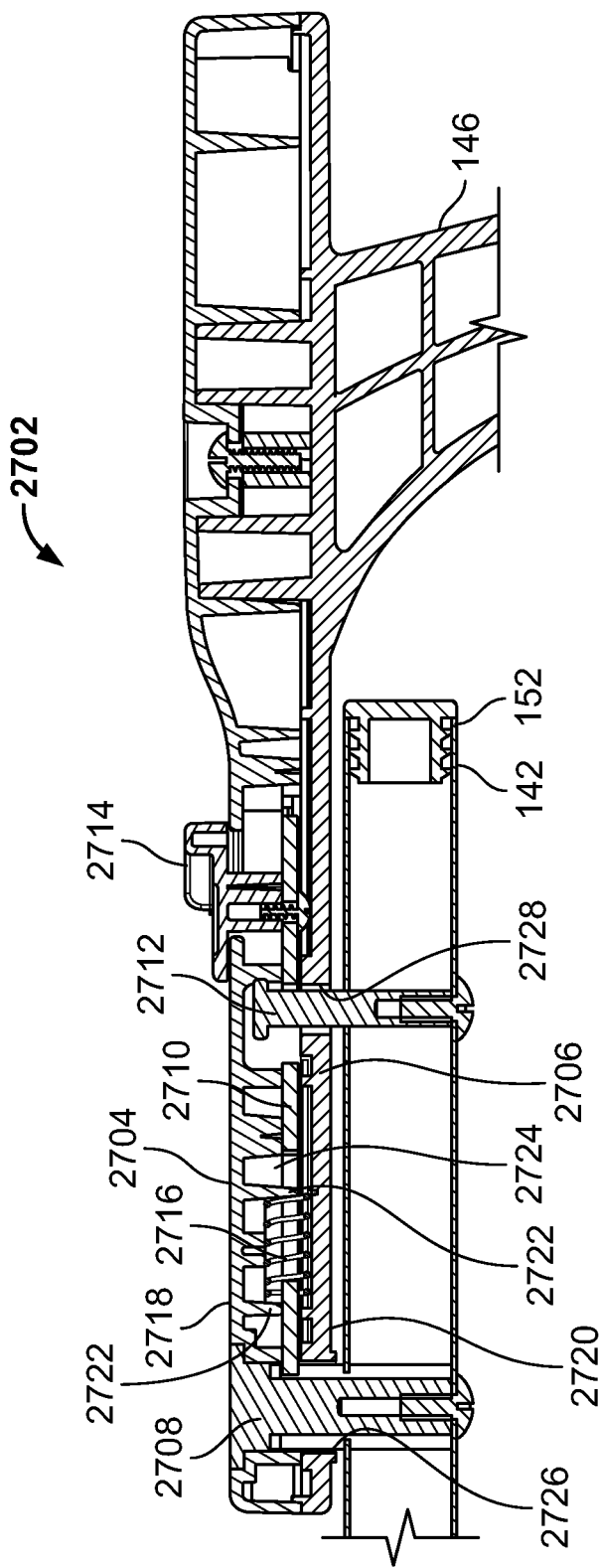
FIG. 27 is a first cross-sectional view of the foot lock assembly of the foldable foot of the portable grill of FIGS. 1-20, with the foot lock assembly positioned in an example locked configuration.
Figure 28:
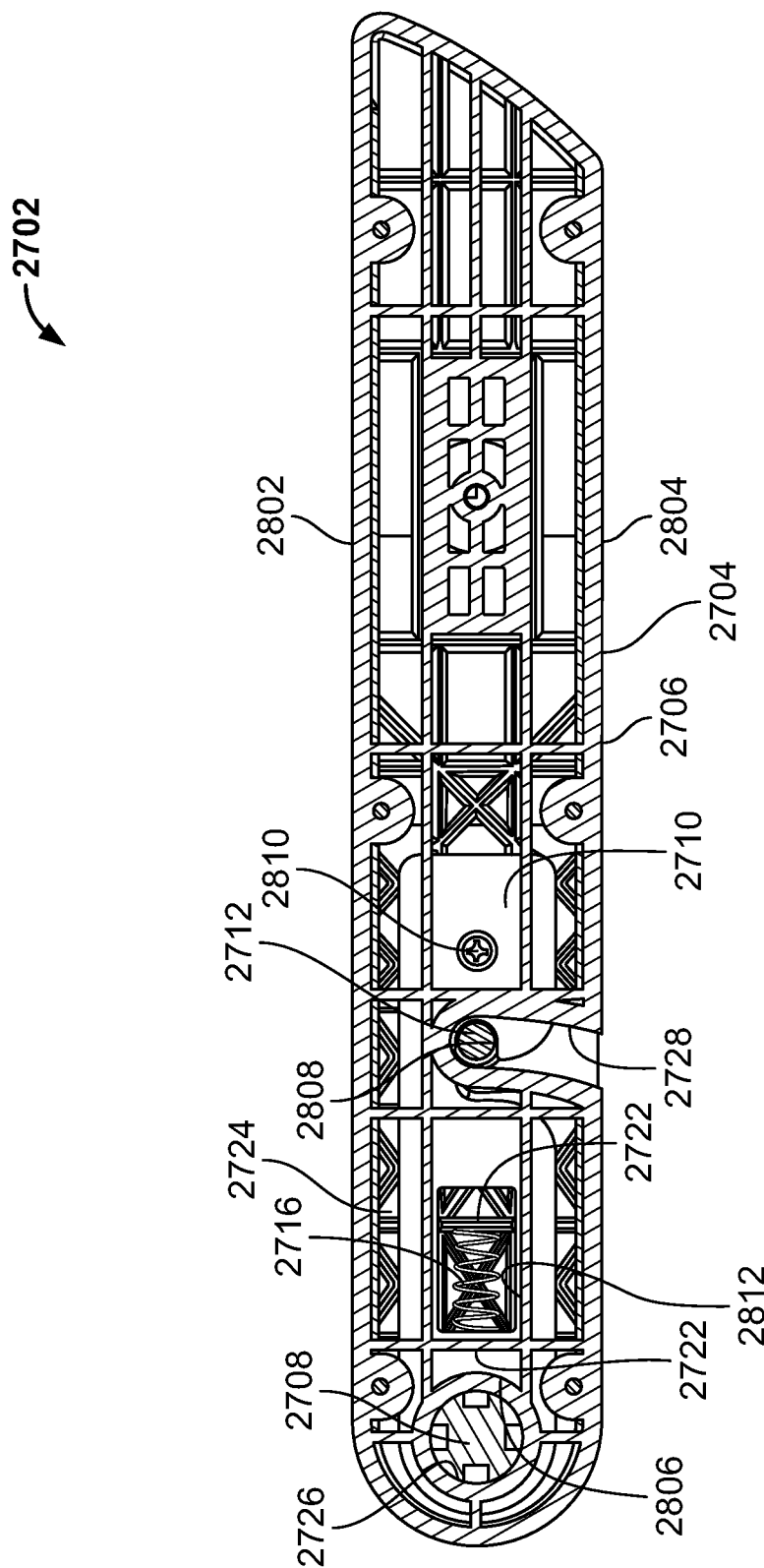
FIG. 28 is a second cross-sectional view of the foot lock assembly of the foldable foot of the portable grill of FIGS. 1-20, with the foot lock assembly positioned in the locked configuration of FIG. 27.
Figure 29:
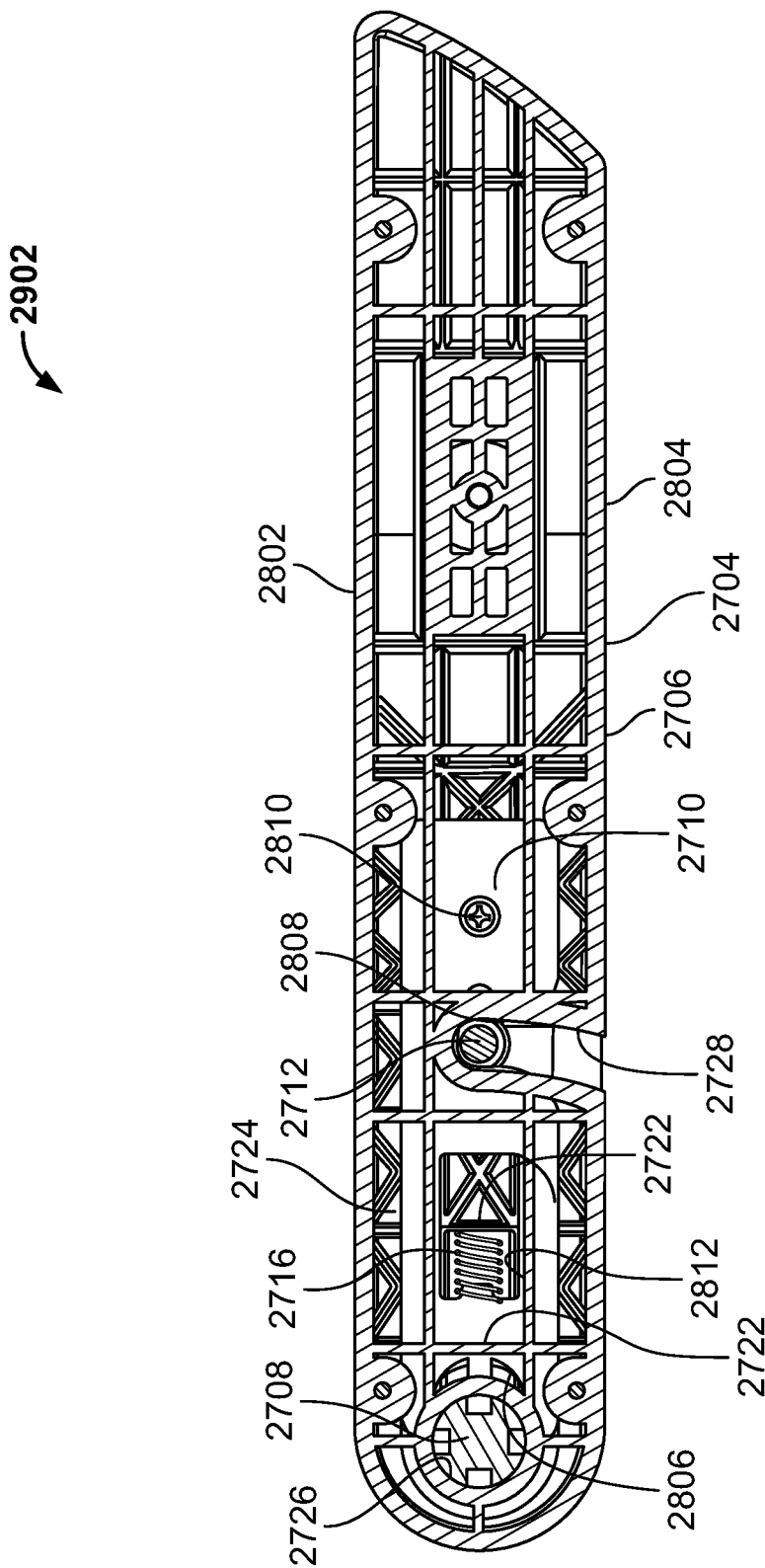
FIG. 29 is a third cross-sectional view of the foot lock assembly of the foldable foot of the portable grill of FIGS. 1-20, with the foot lock assembly positioned in an example unlocked configuration.

FIGS. 27-29 further illustrate the foot lock assembly 156 of the foldable foot 146 of FIGS. 1-20. FIG. 27 is a first cross-sectional view of the foot lock assembly 156 of the foldable foot 146, with the foot lock assembly 156 positioned in an example locked configuration 2702. FIG. 28 is a second cross-sectional view of the foot lock assembly 156 of the foldable foot 146, with the foot lock assembly 156 positioned in the locked configuration 2702. FIG. 29 is a third cross-sectional view of the foot lock assembly 156 of the foldable foot 146, with the foot lock assembly 156 positioned in an example unlocked configuration 2902. As shown in FIGS. 27-29, the foot lock assembly 156 is located and/or positioned within an example housing 2704 that forms an example arm 2706 of the foldable foot 146, with the arm 2706 being pivotally coupled to the rear leg 142 of the first leg unit 136 of the portable grill 100 via an example connecting pin 2708. A second foot lock assembly (e.g., configured as a mirror image of the foot lock assembly 156 shown in FIGS. 27-29) of the foldable foot 146 can be located and/or positioned within another housing that forms another arm of the foldable foot 146, with the arm being pivotally coupled to the front leg 140 of the first leg unit 136 of the portable grill 100 via another connecting pin.

In the illustrated example of FIGS. 27-29, the foot lock assembly 156 includes the housing 2704, and further includes an example lockbar 2710, an example locking pin 2712, an example release lever 2714, and an example compression spring 2716. The housing 2704 of the foot lock assembly 156 includes an example outer wall 2718, an example inner wall 2720, example ribs 2722, an example upper wall 2802, an example lower wall 2804, an example cavity 2724, an example first opening 2726, and an example second opening 2728. The ribs 2722 extend inwardly from the outer wall 2718 and the inner wall 2720 of the housing 2704. The cavity 2724 of the housing 2704 is defined by the interior surfaces of the outer wall 2718, the inner wall 2720, the upper wall 2802, the lower wall 2804, and the ribs 2722 of the housing 2704. The first opening 2726 of the housing 2704 extends through the outer wall 2718 and the inner wall 2720 of the housing 2704, and is configured to receive the connecting pin 2708 by which the arm 2706 of the foldable foot 146 is pivotally coupled to the rear leg 142 of the first leg unit 136 of the portable grill 100. The second opening 2728 of the housing 2704 extends through the inner wall 2720 and the lower wall 2804 of the housing 2704, and is configured to receive the locking pin 2712 of the foot lock assembly 156, with the locking pin 2712 being rigidly coupled (e.g., via one or more fastener(s)) to the rear leg 142 of the first leg unit 136 of the portable grill 100.

The lockbar 2710 of the foot lock assembly 156 is located and/or positioned within the cavity 2724 of the housing 2704 and is supported by the ribs 2722 thereof. In the illustrated example of FIGS. 27-29, the lockbar 2710 includes an example first notch 2806, an example second notch 2808, an example opening 2810, and an example slot 2812. The first notch 2806 of the lockbar 2710 is configured to receive the connecting pin 2708. The second notch 2808 of the lockbar 2710 is configured to receive the locking pin 2712. The opening 2810 of the lockbar 2710 is configured to receive a fastener by which the release lever 2714 is rigidly coupled to the lockbar 2710 such that movement (e.g., sliding) of the release lever 2714 causes a corresponding movement (e.g., sliding) of the lockbar 2710, and vice-versa. The slot 2812 of the lockbar 2710 is configured to receive the compression spring 2716.

The compression spring 2716 of the foot lock assembly 156 is located and/or positioned between the slot 2812 of the lockbar 2710 and one of the ribs 2722 of the housing 2704, thereby biasing the lockbar 2710 into a first position associated with the locked configuration 2702 of the foot lock assembly 156 (e.g., as shown in FIGS. 27 and 28). When the foot lock assembly 156 is positioned in the locked configuration 2702 shown in FIGS. 27 and 28, the locking pin 2712 is located and/or positioned within the second notch 2808 of the lockbar 2710, and is accordingly locked within the housing 2704 via the lockbar 2710, thereby preventing the arm 2706 and/or, more generally, the foldable foot 146 from pivoting, rotating, and/or folding relative to the rear leg 142 of the first leg unit 136 of the portable grill 100. The lockbar 2710 is configured to be moved (e.g., slid) within the housing 2704 from the first position associated with the locked configuration 2702 of the foot lock assembly 156 (e.g., as shown in FIGS. 27 and 28) into a second position associated with the unlocked configuration 2902 of the foot lock assembly 156 (e.g., as shown in FIG. 29) in response to a user of the portable grill 100 pushing and/or pulling the release lever 2714 of the foot lock assembly 156 in a direction away from the connecting pin 2708, and/or in a direction opposite that of the biasing force produced by the compression spring 2716. When the foot lock assembly 156 is positioned in the unlocked configuration 2902 shown in FIG. 29, the locking pin 2712 is free from the second notch 2808 of the lockbar 2710, and is accordingly no longer locked within the housing 2704 via the lockbar 2710, thereby enabling the arm 2706 and/or, more generally, the foldable foot 146 to be pivoted, rotated, and/or folded relative to the rear leg 142 of the first leg unit 136 of the portable grill 100.

The portable grill 100 of FIGS. 1-20 further includes an example gas spring 406 having an example first end 408 coupled to the rear rail 124 of the frame 120, and an example second end 410 located opposite to the first end 408 of the gas spring 406 and coupled to the rear leg 142 of the first leg unit 136. In other examples, the first end 408 of the gas spring 406 can alternatively be coupled to the front rail 122 of the frame 120, and the second end 410 of the gas spring 406 can alternatively be coupled to the front leg 140 of the first leg unit 136. In still other examples, the first end 408 of the gas spring 406 can alternatively be coupled to the rear rail 124 of the frame 120, and the second end 410 of the gas spring 406 can alternatively be coupled to the rear leg 164 of the second leg unit 158. In still other examples, the first end 408 of the gas spring 406 can alternatively be coupled to the front rail 122 of the frame 120, and the second end 410 of the gas spring 406 can alternatively be coupled to the front leg 162 of the second leg unit 158. The gas spring 406 is configured to restrict (e.g., prevent) the front leg 140 and/or the rear leg 142 of the first leg unit 136, and/or the front leg 162 and/or the rear leg 164 of the second leg unit 158 from rapidly and/or freely collapsing under the weight of the cookbox 104 of the portable grill 100 following actuation of a handle of a leg lock assembly of the portable grill 100, as further described below. Thus, the gas spring 406 advantageously provides a mechanically-damped transition of the portable grill 100 from the erected configuration 102 into the collapsed configuration 1102.

Figure 30:
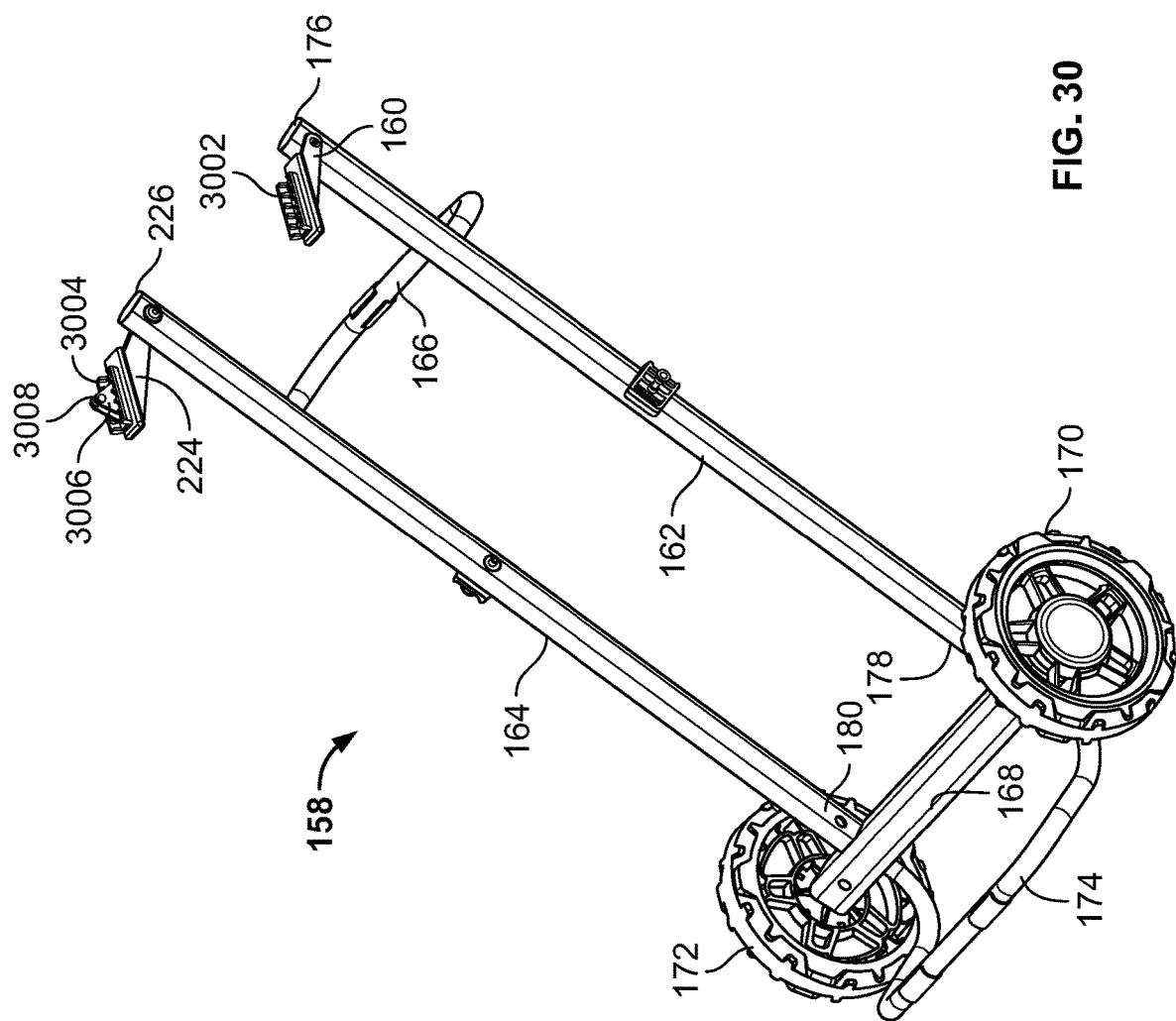
FIG. 30 is a perspective view of the second leg unit of the portable grill of FIGS. 1-20, with the second leg unit shown in isolation.
Figure 31:
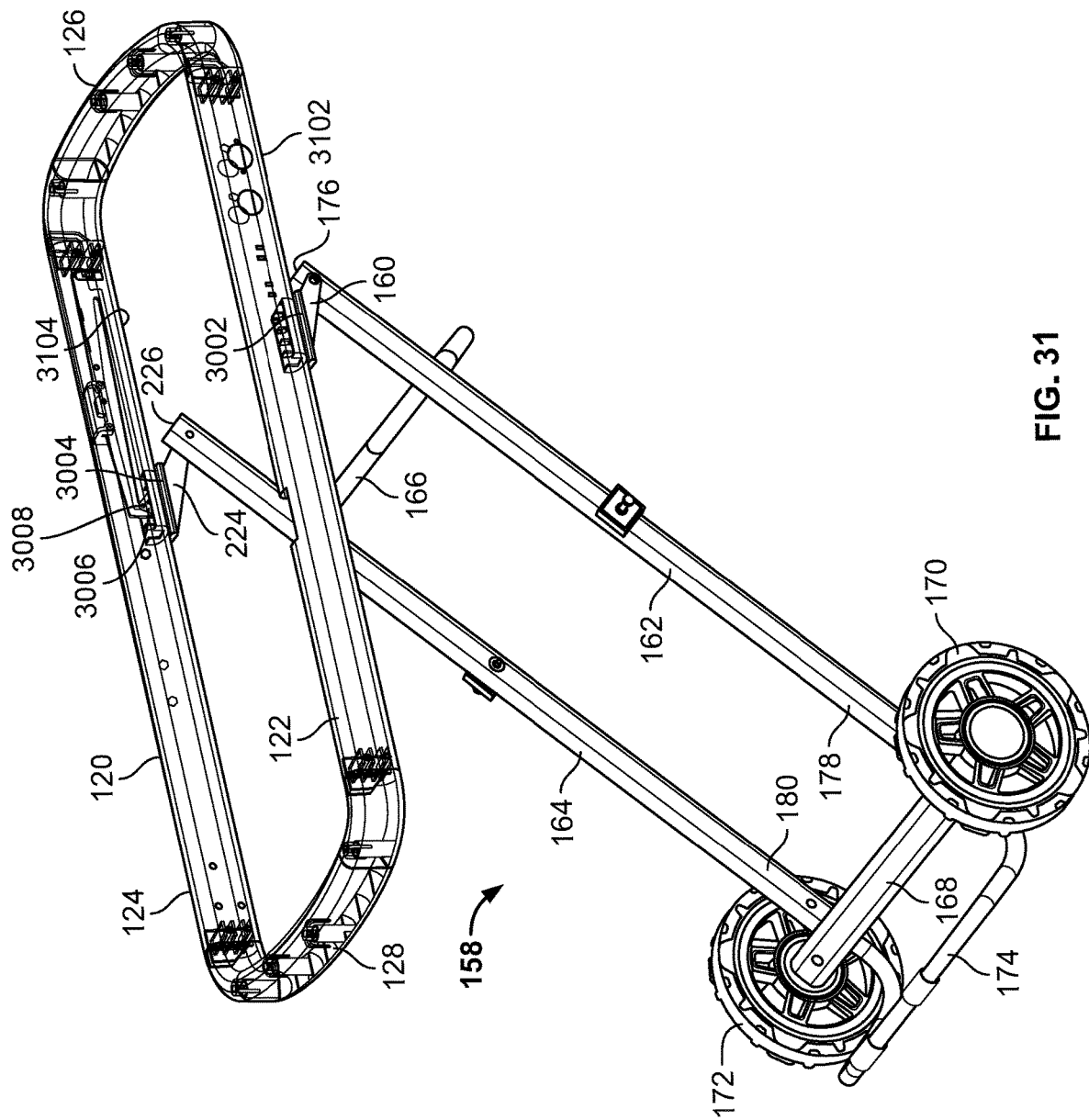
FIG. 31 is a perspective view of the second leg unit of the portable grill of FIGS. 1-20, with the second leg unit shown relative to the frame, and with the frame shown in phantom to enhance the viewability of the front flange and the rear flange of the second leg unit.

The portable grill 100 of FIGS. 1-20 further includes an example second leg unit 158 coupled to the frame 120. In the illustrated example of FIGS. 1-20, the second leg unit 158 includes an example front flange 160, an example rear flange 224, an example front leg 162, an example rear leg 164, an example first support bar 166, an example wheel support frame 168, an example first wheel 170, an example second wheel 172, and an example second support bar 174. FIG. 30 provides an additional view of the second leg unit 158 of the portable grill 100 of FIGS. 1-20, with the second leg unit 158 shown in isolation. FIG. 31 provides an additional view of the second leg unit 158 of the portable grill 100 of FIGS. 1-20, with the second leg unit 158 shown relative to the frame 120, and with the frame 120 shown in phantom to enhance the viewability of the front flange 160 and the rear flange 224 of the second leg unit 158. The front flange 160 and the rear flange 224 of the second leg unit 158 are slidably coupled to the frame 120. More specifically, the front flange 160 of the second leg unit 158 is slidably coupled to the front rail 122 of the frame 120 via an example front slider 3002, and the rear flange 224 of the second leg unit 158 is slidably coupled to the rear rail 124 of the frame 120 via an example rear slider 3004.

The front slider 3002 is located within the front rail 122 of the frame 120 and is rigidly coupled (e.g., via one or more fastener(s) extending through an example slot 3102 formed along the bottom of the front rail 122 of the frame 120) to the front flange 160 of the second leg unit 158. The rear slider 3004 is located within the rear rail 124 of the frame 120 and is rigidly coupled (e.g., via one or more fastener(s) extending through an example slot 3104 formed along the bottom of the rear rail 124 of the frame 120) to the rear flange 224 of the second leg unit 158. The rear slider 3004 is additionally rigidly coupled (e.g., via one or more fastener(s)) to an example locking pin carrier 3006 that supports and/or carries an example locking pin 3008. The rear flange 224, the rear slider 3004, the locking pin carrier 3006, and the locking pin 3008 are slidable in a unitary manner within and/or relative to the rear rail 124 of the frame 120, as further described below. The front flange 160 and the rear flange 224 of the second leg unit 158 are respectively configured to slide and/or translate along the frame 120 (e.g., along the front and rear rails 122, 124 of the frame 120) in connection with the portable grill 100 being transitioned from the erected configuration 102 into the collapsed configuration 1102, and vice-versa.

The front leg 162 of the second leg unit 158 includes an example first end 176 and an example second end 178 located opposite the first end 176. The first end 176 of the front leg 162 is pivotally coupled (e.g., via one or more fastener(s)) to the front flange 160 of the second leg unit 158 such that the front leg 162 of the second leg unit 158 is rotatable relative to the front flange 160 of the second leg unit 158, and/or relative to the frame 120. In some examples, a rotary damper is operatively coupled to and/or operatively located between the front leg 162 and the front flange 160 of the second leg unit 158 (e.g., at the location where the front leg 162 is pivotally coupled to the front flange 160). In such examples, the rotary damper is configured to restrict (e.g., mechanically dampen) the front leg 162 of the second leg unit 158 from rapidly and/or freely collapsing relative to the frame 120 under the weight of the cookbox 104 as the portable grill 100 is transitioned from the erected configuration 102 into the collapsed configuration 1102.

The rear leg 164 of the second leg unit 158 includes an example first end 226 and an example second end 180 located opposite the first end 226. The first end 226 of the rear leg 164 is pivotally coupled (e.g., via one or more fastener(s)) to the rear flange 224 of the second leg unit 158 such that the rear leg 164 of the second leg unit 158 is rotatable relative to the rear flange 224 of the second leg unit 158, and/or relative to the frame 120. In some examples, a rotary damper is operatively coupled to and/or operatively located between the rear leg 164 and the rear flange 224 of the second leg unit 158 (e.g., at the location where the rear leg 164 is pivotally coupled to the rear flange 224). In such examples, the rotary damper is configured to restrict (e.g., mechanically dampen) the rear leg 164 of the second leg unit 158 from rapidly and/or freely collapsing relative to the frame 120 under the weight of the cookbox 104 as the portable grill 100 is transitioned from the erected configuration 102 into the collapsed configuration 1102.

The first support bar 166 of the second leg unit 158 extends between and is rigidly coupled to the front and rear legs 162, 164 of the second leg unit 158 such that movement (e.g., rotation and/or translation) of the front leg 162 of the second leg unit 158 occurs in a unitary manner relative to movement (e.g., rotation and/or translation) of the rear leg 164 of the second leg unit 158, and vice-versa. In the illustrated example of FIGS. 1-20, the first support bar 166 of the second leg unit 158 is rigidly coupled to the front leg 162 of the second leg unit 158 at a location between the first end 176 and the second end 178 of the front leg 162, and is further rigidly coupled to the rear leg 164 of the second leg unit 158 at a location between the first end 226 and the second end 180 of the rear leg 164. In some examples, the first support bar 166 of the second leg unit 158 is rigidly coupled to the front and rear legs 162, 164 of the second leg unit 158 via one or more fastener(s). In other examples, the first support bar 166 of the second leg unit 158 can alternatively be integrally formed with the front and rear legs 162, 164 of the second leg unit 158 such that the first support bar 166 is inseparable from the front and rear legs 162, 164.

In the illustrated example of FIGS. 1-20, the first support bar 166 of the second leg unit 158 extends at an angle (e.g., orthogonally) away from the front and rear legs 162, 164 of the second leg unit 158. The first support bar 166 of the second leg unit 158 is configured to maintain the cookbox 104 and/or one or more other component(s) (e.g., the catch pan 114, the valve and regulator assembly 208, a leg lock assembly, a tank blocker, etc.) of the portable grill 100 at a separated distance above and/or apart from the underlying surface 302 when the portable grill 100 is positioned in the collapsed configuration 1102 and oriented horizontally (e.g., parallel) relative to the underlying surface 302 (e.g., as shown in FIGS. 13-16), thereby advantageously reducing wear on, and/or reducing the possibility of mechanical damage to, the cookbox 104 and/or the other component(s) of the portable grill 100. The first support bar 166 of the second leg unit 158 is further configured to provide and/or function as a structure by which the portable grill 100 can be hung (e.g., from a hanging mechanism, such as one or more hook(s)) when the portable grill 100 is positioned in the collapsed configuration 1102 and oriented vertically (e.g., perpendicular) relative to the underlying surface 302 (e.g., as shown in FIG. 19). The dually-configured nature of the first support bar 166 of the second leg unit 158 advantageously eliminates any need for separate and/or multiple structures to facilitate the above-described supporting and hanging functions of the first support bar 166.

Figure 32:
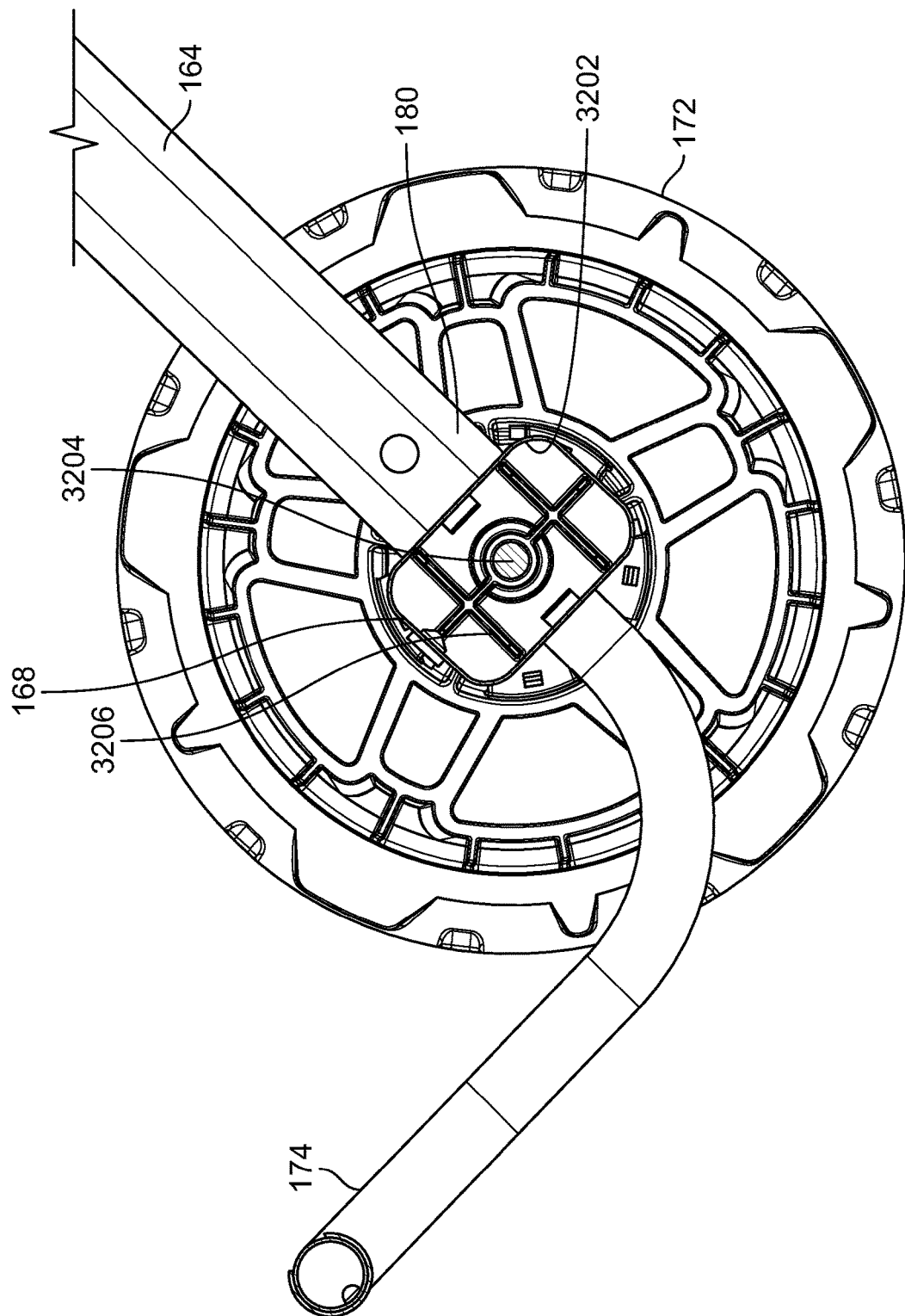
FIG. 32 is a first cross-sectional view of the wheel support frame of the second leg unit of the portable grill of FIGS. 1-20.
Figure 33:
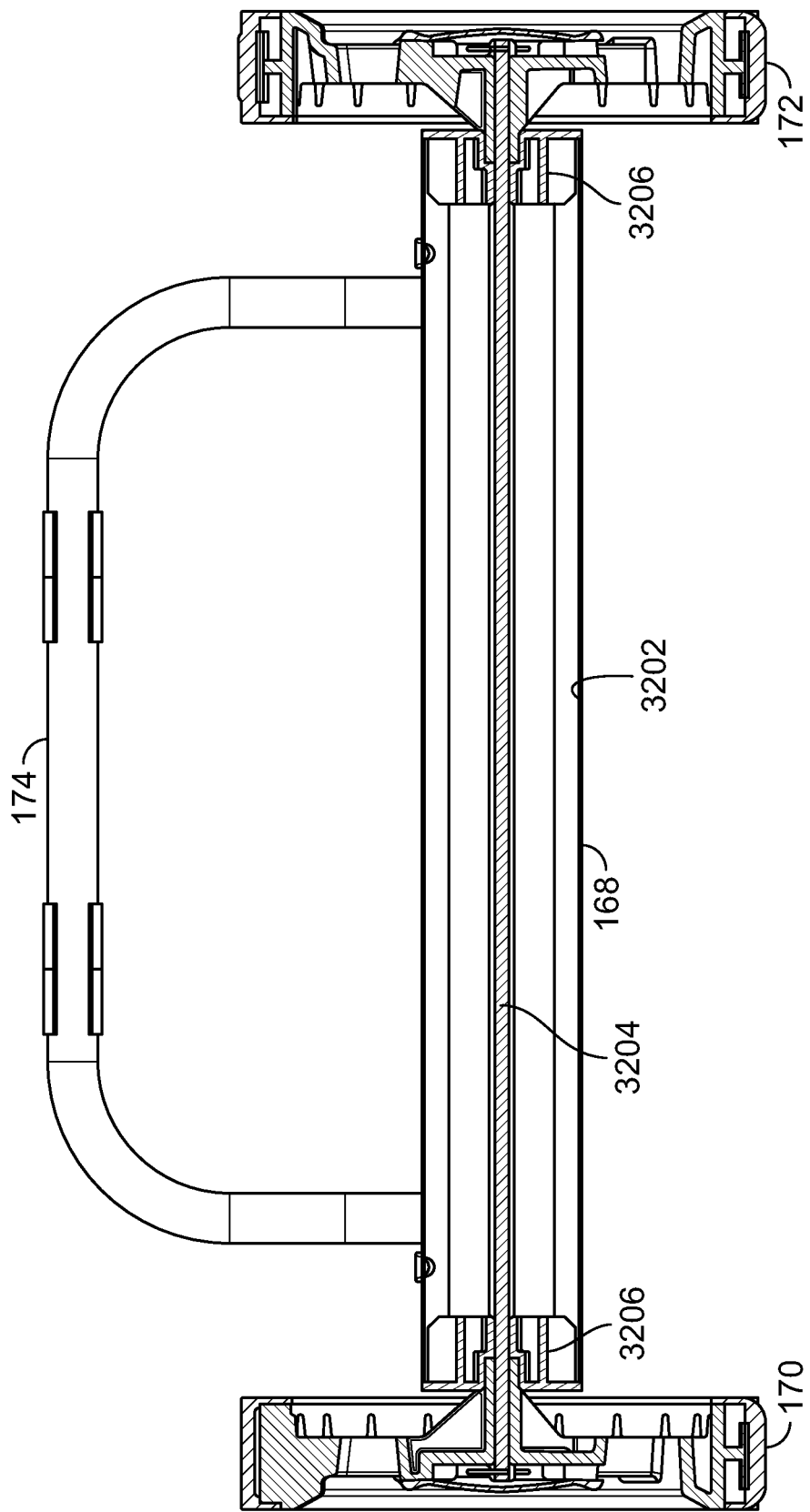
FIG. 33 is a second cross-sectional view of the wheel support frame of the second leg unit of the portable grill of FIGS. 1-20.

The wheel support frame 168 of the second leg unit 158 extends between and is rigidly coupled to the front and rear legs 162, 164 of the second leg unit 158 such that movement (e.g., rotation and/or translation) of the front leg 162 of the second leg unit 158 occurs in a unitary manner relative to movement (e.g., rotation and/or translation) of the rear leg 164 of the second leg unit 158, and vice-versa. In the illustrated example of FIGS. 1-20, the wheel support frame 168 of the second leg unit 158 is rigidly coupled to the second end 178 of the front leg 162 of the second leg unit 158, and is further rigidly coupled to the second end 180 of the rear leg 164 of the second leg unit 158. FIG. 32 provides a first cross-sectional view of the wheel support frame 168 of the second leg unit 158. FIG. 33 provides a second cross-sectional view of the wheel support frame 168 of the second leg unit 158. As shown in FIGS. 32 and 33, the wheel support frame 168 includes an example opening 3202 (e.g., a through hole) configured to receive an example wheel axis 3204 such that the wheel axis 3204 extends through the opening 3202 and through the wheel support frame 168. As further shown in FIGS. 32 and 33, the wheel support frame 168 includes one or more example support(s) 3206 located internally relative to an outer surface of the wheel support frame 168, with the support(s) 3206 being configured to receive the wheel axis 3204 and to accordingly stabilize, support, and/or increase the rigidity of the wheel axis 3204.

The first and second wheels 170, 172 of the second leg unit 158 are respectively coupled to the wheel axis 3204 (e.g., at opposite ends of the wheel axis 3204), and are rotatable relative to the wheel support frame 168 of the second leg unit 158. The first and second wheels 170, 172 are respectively configured to enable the portable grill 100 to be moved (e.g., pushed or pulled) along the underlying surface 302 when the first and second wheels 170, 172 are in contact with the underlying surface 302. In some examples, the first and second wheels 170, 172 are rigidly coupled to the wheel axis 3204, and the wheel axis 3204 is rotatable relative to the wheel support frame 168. In other examples, the wheel axis 3204 can alternatively be rigidly coupled to the wheel support frame 168, and the first and second wheels 170, 172 can be rotatable relative to the wheel axis 3204.

The second support bar 174 of the second leg unit 158 extends from and is rigidly coupled to the wheel support frame 168 of the second leg unit 158 such that movement of the second support bar 174 occurs in a unitary manner relative to movement of the wheel support frame 168. In some examples, the second support bar 174 of the second leg unit 158 is rigidly coupled to the wheel support frame 168 of the second leg unit 158 via one or more fastener(s). In other examples, the second support bar 174 of the second leg unit 158 can alternatively be integrally formed with the wheel support frame 168 such that the second support bar 174 is inseparable from the wheel support frame 168. In still other examples, the ends of the second support bar 174 of the second leg unit 158 can extend through the wheel support frame 168, and can respectively be coupled to (e.g., via one or more fastener(s)) the front and rear legs 162, 164 of the second leg unit 158 (e.g., at the second end 178 of the front leg 162 and the second end 180 of the rear leg 164).

In the illustrated example of FIGS. 1-20, the second support bar 174 of the second leg unit 158 extends at an angle (e.g., orthogonally) away from the front and rear legs 162, 164 of the second leg unit 158. The second support bar 174 of the second leg unit 158 is configured to engage and/or contact the underlying surface 302 when the portable grill 100 is positioned in the collapsed configuration 1102 and oriented vertically (e.g., perpendicular) relative to the underlying surface 302 (e.g., as shown in FIG. 19), thereby advantageously providing and/or functioning as a mechanical support to maintain the portable grill 100 in a vertical orientation relative to the underlying surface 302. The second support bar 174 of the second leg unit 158 is further configured to provide and/or function as a handle by which the portable grill 100 can be picked up and/or carried when the portable grill 100 is positioned in the collapsed configuration 1102 and oriented horizontally (e.g., parallel) relative to the underlying surface 302 (e.g., as shown in FIGS. 13-16). The dually-configured nature of the second support bar 174 of the second leg unit 158 advantageously eliminates any need for separate and/or multiple structures to facilitate the above-described supporting and picking up and/or carrying functions of the second support bar 174.

In the illustrated example of FIGS. 1-20, the first and second leg units 136, 158 described above are pivotally coupled to one another. For example, the front leg 140 of the first leg unit 136 is pivotally coupled (e.g., via one or more fastener(s)) to the front leg 162 of the second leg unit 158 at a location between (e.g., approximately midway between) the first end 148 and the second end 150 of the front leg 140 of the first leg unit 136, and further between (e.g., approximately midway between) the first end 176 and the second end 178 of the front leg 162 of the second leg unit 158. In some examples, a rotary damper is operatively coupled to and/or operatively located between the front leg 140 of the first leg unit 136 and the front leg 162 of the second leg unit 158 (e.g., at the location where the front leg 140 of the first leg unit 136 is pivotally coupled to the front leg 162 of the second leg unit 158). In such examples, the rotary damper is configured to restrict (e.g., mechanically dampen) the front leg 140 of the first leg unit 136 and/or the front leg 162 of the second leg unit 158 from rapidly and/or freely collapsing relative to the frame 120 under the weight of the cookbox 104 as the portable grill 100 is transitioned from the erected configuration 102 into the collapsed configuration 1102.

Similarly, the rear leg 142 of the first leg unit 136 is pivotally coupled (e.g., via one or more fastener(s)) to the rear leg 164 of the second leg unit 158 at a location between (e.g., approximately midway between) the first end 222 and the second end 152 of the rear leg 142 of the first leg unit 136, and further between (e.g., approximately midway between) the first end 226 and the second end 180 of the rear leg 164 of the second leg unit 158. In some examples, a rotary damper is operatively coupled to and/or operatively located between the rear leg 142 of the first leg unit 136 and the rear leg 164 of the second leg unit 158 (e.g., at the location where the rear leg 142 of the first leg unit 136 is pivotally coupled to the rear leg 164 of the second leg unit 158). In such examples, the rotary damper is configured to restrict (e.g., mechanically dampen) the rear leg 142 of the first leg unit 136 and/or the rear leg 164 of the second leg unit 158 from rapidly and/or freely collapsing relative to the frame 120 under the weight of the cookbox 104 as the portable grill 100 is transitioned from the erected configuration 102 into the collapsed configuration 1102.

The first and second leg units 136, 158 of the portable grill 100 collectively provide a collapsible and/or foldable base configured to support the cookbox 104 and/or the frame 120 of the portable grill 100, and further configured to enable the portable grill to be transitioned from the erected configuration 102 shown in FIGS. 1-10 into the collapsed configuration 1102 shown in FIGS. 11-20, and vice-versa. When the portable grill 100 is positioned in the erected configuration 102 shown in FIGS. 1-10, the front and rear legs 140, 142 of the first leg unit 136 are oriented at an angle (e.g., a ninety degree angle) relative to the front and rear legs 162, 164 of the second leg unit 158. The arrangement of the front and rear legs 140, 142 of the first leg unit 136 and the front and rear legs 162, 164 of the second leg unit 158 associated with the erected configuration 102 of the portable grill 100 causes the frame 120 of the portable grill 100 to be positioned at an example first height 304 above the underlying surface 302 (e.g., as shown in FIG. 3). When the portable grill 100 is positioned in the collapsed configuration 1102 shown in FIGS. 11-20, the front and rear legs 140, 142 of the first leg unit 136 are generally parallel relative to the front and rear legs 162, 164 of the second leg unit 158. The arrangement of the front and rear legs 140, 142 of the first leg unit 136 and the front and rear legs 162, 164 of the second leg unit 158 associated with the collapsed configuration 1102 of the portable grill 100 causes the frame 120 of the portable grill 100 to be positioned at an example second height 1304 above the underlying surface 302 (e.g., as shown in FIG. 13), with the second height 1304 being considerably less than the first height 304.

The portable grill 100 of FIGS. 1-20 further includes an example leg lock assembly 182 configured to lock the position of the front and rear legs 162, 164 of the second leg unit 158 of the portable grill 100 relative to the frame 120 of the portable grill 100, which in turn also locks the position of the front and rear legs 140, 142 of the first leg unit 136 of the portable grill 100 relative to the frame 120 of the portable grill 100. The leg lock assembly 182 is configured to lock the position of the front and rear legs 162, 164 of the second leg unit 158 relative to the frame 120 when the portable grill 100 is positioned in the erected configuration 102 shown in FIGS. 1-10 (e.g., while the portable grill 100 is being used to cook).

In some examples, one or more portion(s) of one or more component(s) of the leg lock assembly 182 is/are located and/or positioned within one or more rail(s) (e.g., the front rail 122, the rear rail 124, the right side rail 126, and/or the left side rail 128) of the frame 120 of the portable grill 100 such that said portion(s) of said component(s) of the leg lock assembly 182 is/are partially or fully concealed from exposure, thereby advantageously reducing wear on, and/or reducing the possibility of mechanical damage to, the concealed portion(s) of the component(s) of the leg lock assembly 182. In some examples, one or more portion(s) of one or more component(s) of the leg lock assembly 182 is/are located and/or positioned below (e.g., along an underside of) the table 130 of the portable grill 100 such that said portion(s) of said component(s) of the leg lock assembly 182 is/are partially or fully concealed from exposure, thereby advantageously reducing wear on, and/or reducing the possibility of mechanical damage to, the concealed portion(s) of the component(s) of the leg lock assembly 182.

The leg lock assembly 182 of the portable grill 100 includes an example handle 184 configured to unlock and/or release the locked position(s) of the front and rear legs 162, 164 of the second leg unit 158 relative to the frame 120 of the portable grill 100 in response to actuation (e.g., rotation and/or translation) of the handle 184 by a user of the portable grill 100. The handle 184 is actuatable to unlock and/or release the locked position(s) of the front and rear legs 162, 164 of the second leg unit 158 relative to the frame 120 when the portable grill 100 is positioned in the erected configuration 102 shown in FIGS. 1-10. Actuation of the handle 184 facilitates transitioning the portable grill 100 from the erected configuration 102 into the collapsed configuration 1102. In some examples, the handle 184 of the leg lock assembly 182 is configured to be actuated using only one hand of the user of the portable grill 100, thereby advantageously leaving the other hand of the user free to assist with tasks aside from actuating the handle 184.

Figure 34:
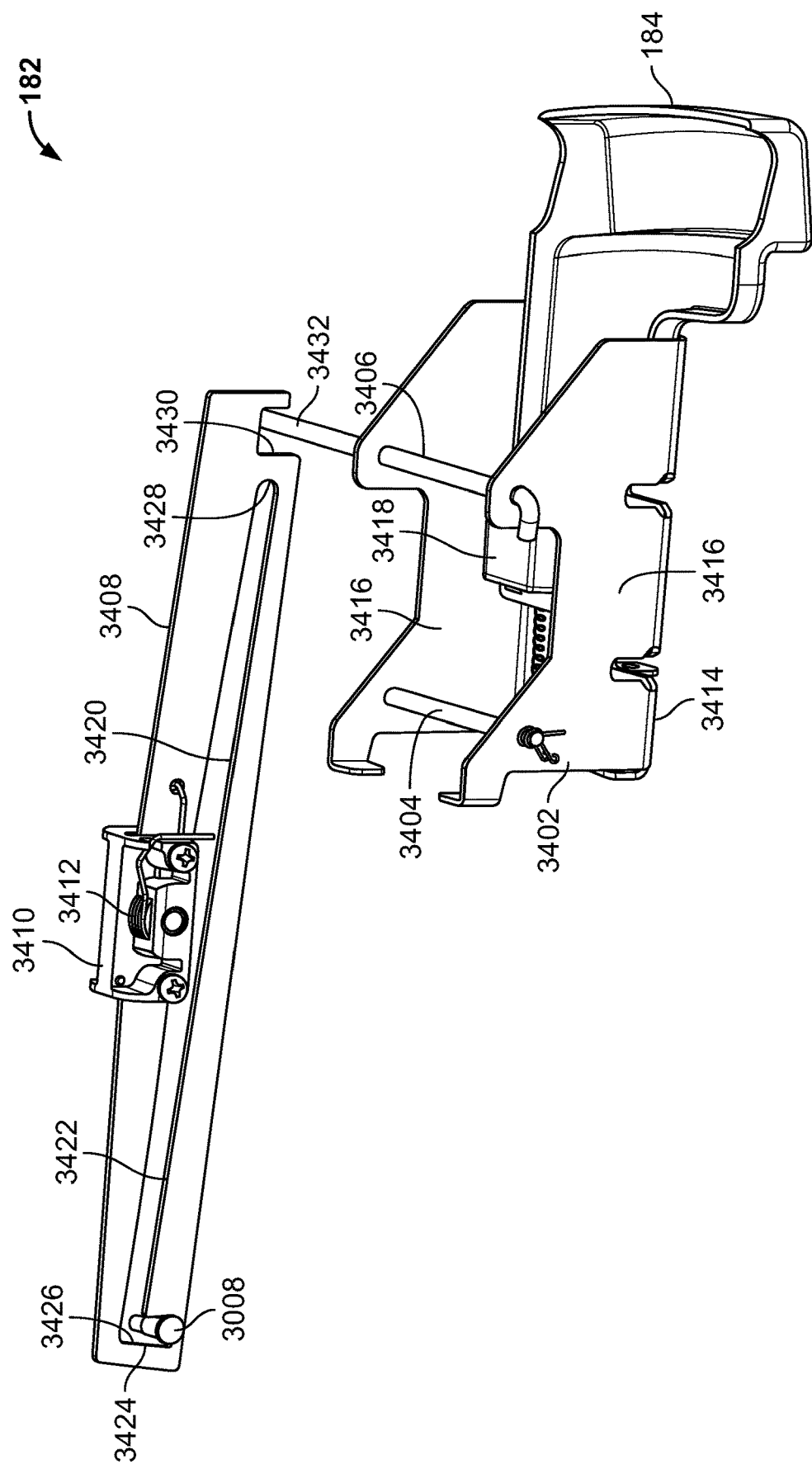
FIG. 34 is a perspective view of the leg lock assembly of the portable grill of FIGS. 1-20, with the leg lock assembly shown in isolation.
Figure 35:
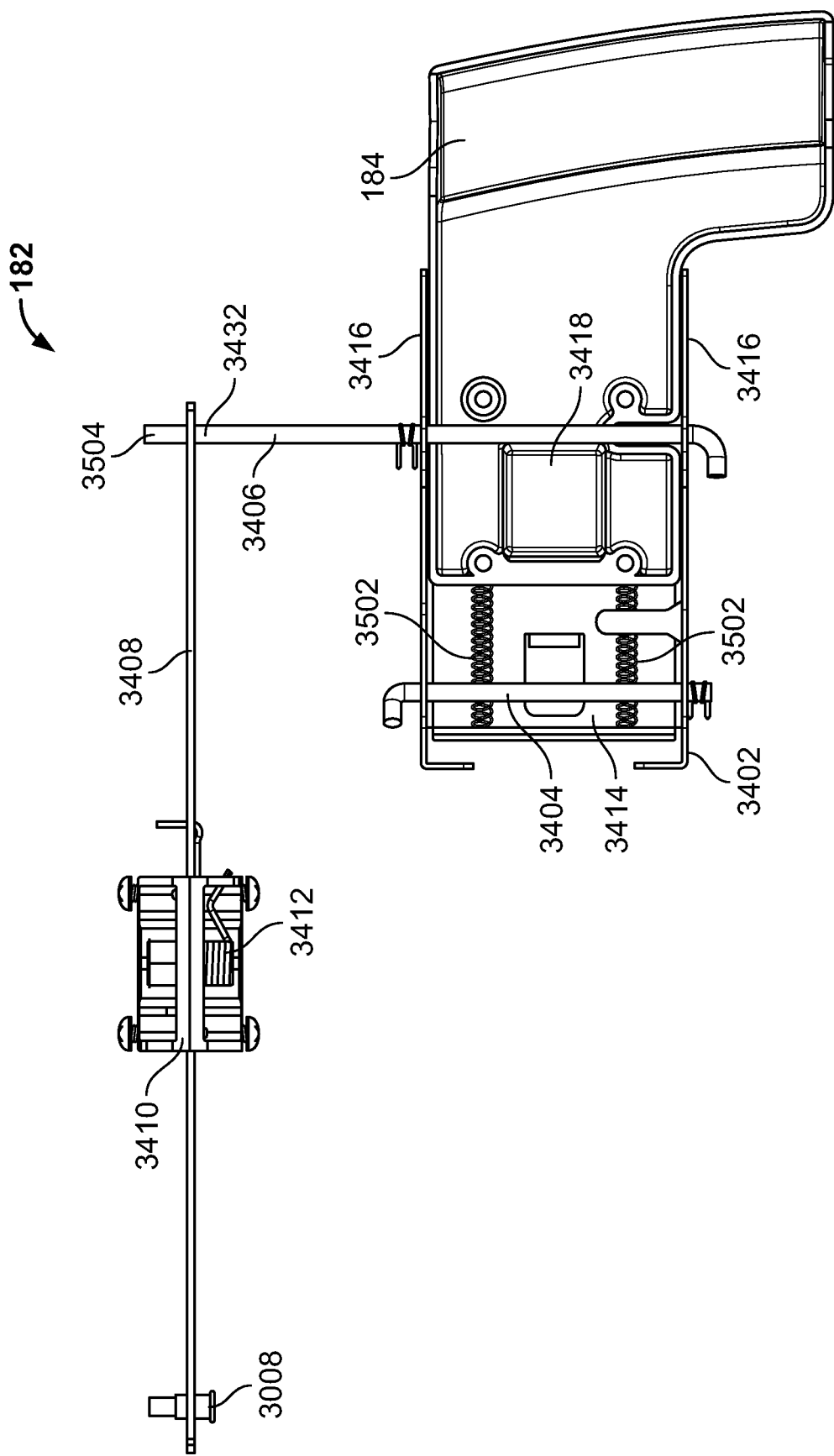
FIG. 35 is a top view of the leg lock assembly of the portable grill of FIGS. 1-20, with the leg lock assembly shown in isolation.
Figure 36:
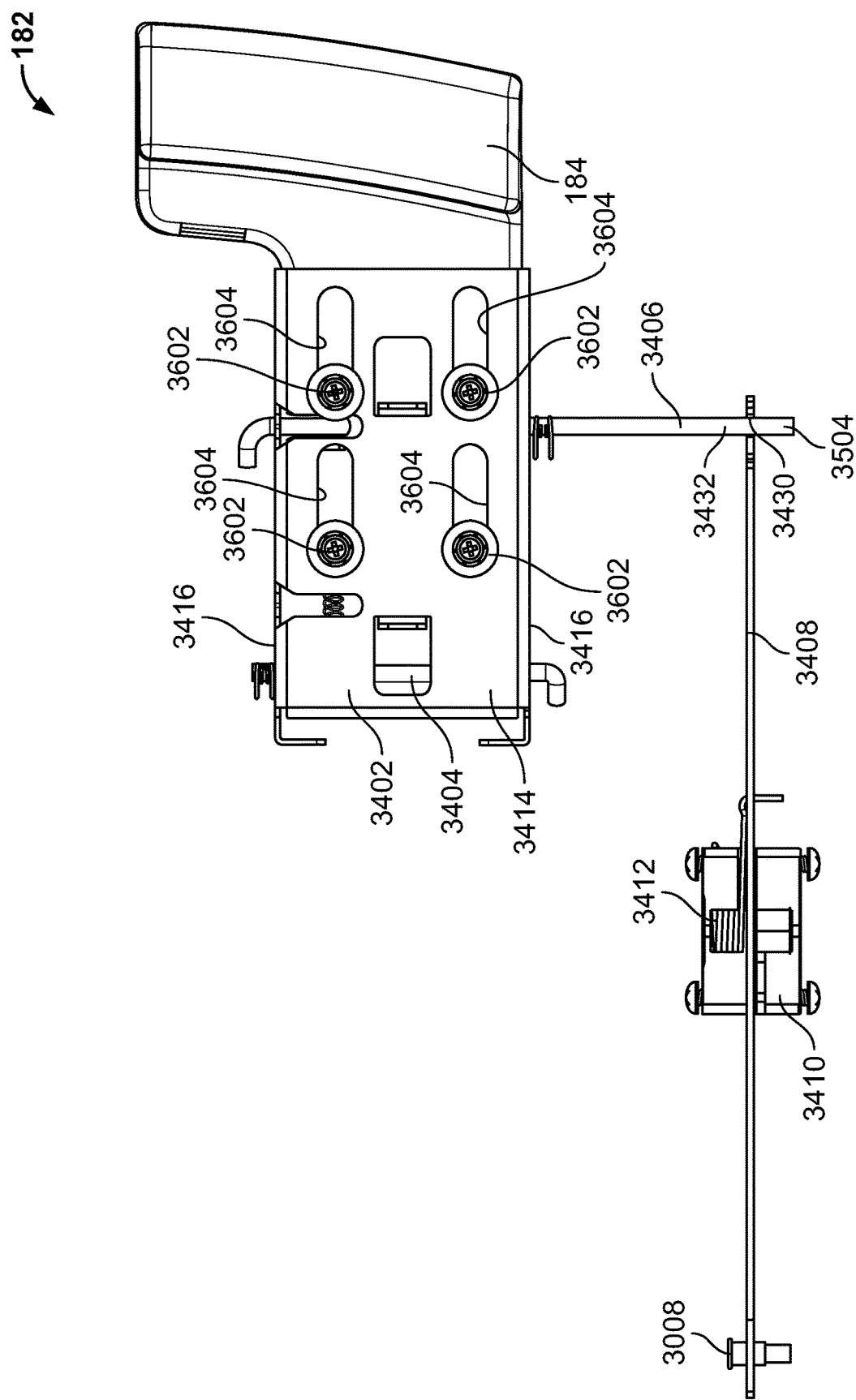
FIG. 36 is a bottom view of the leg lock assembly of the portable grill of FIGS. 1-20, with the leg lock assembly shown in isolation.
Figure 37:
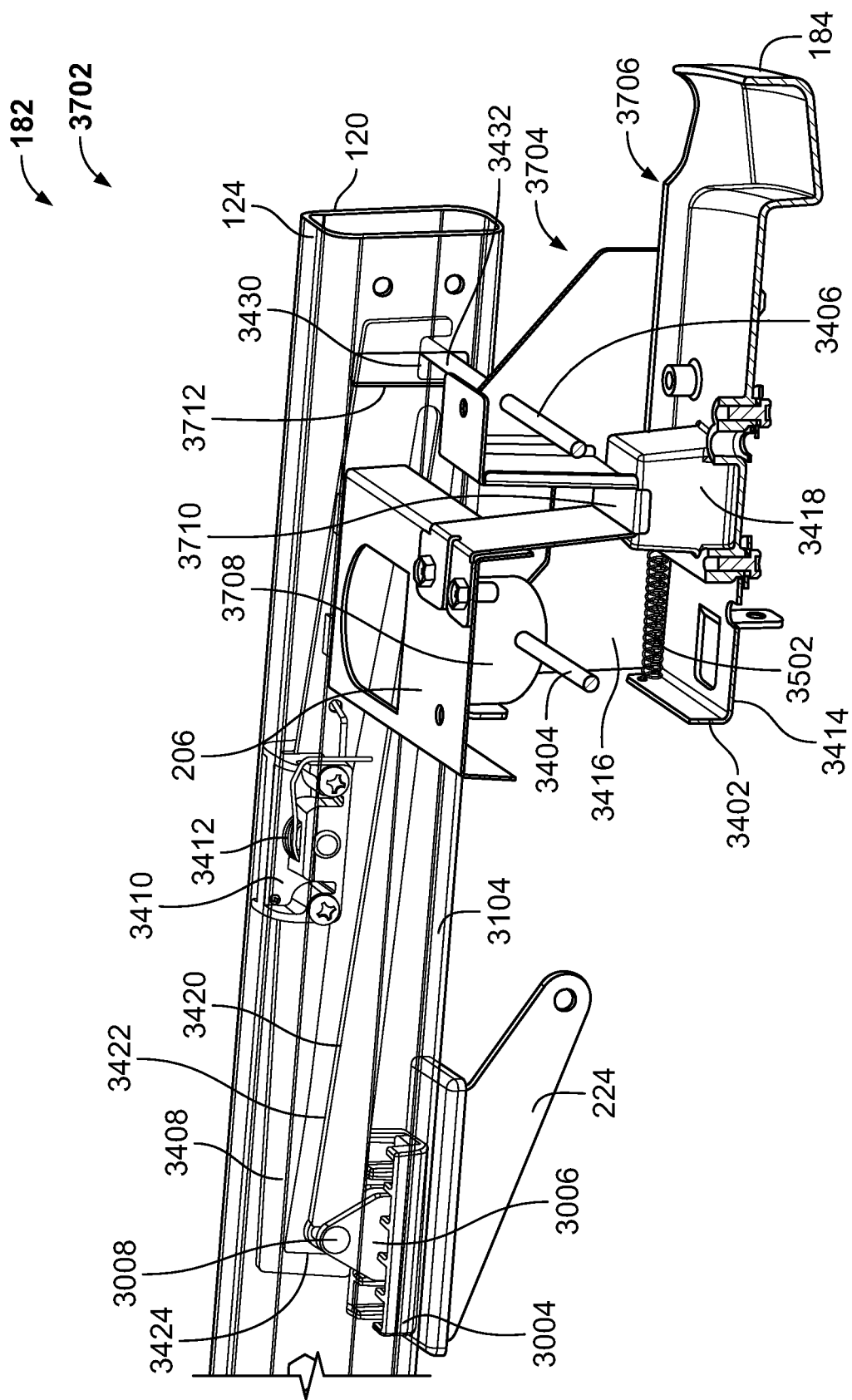
FIG. 37 is a partial cutaway perspective view of the leg lock assembly of the portable grill of FIGS. 1-20, with the leg lock assembly shown positioned in an example locked configuration.
Figure 38:
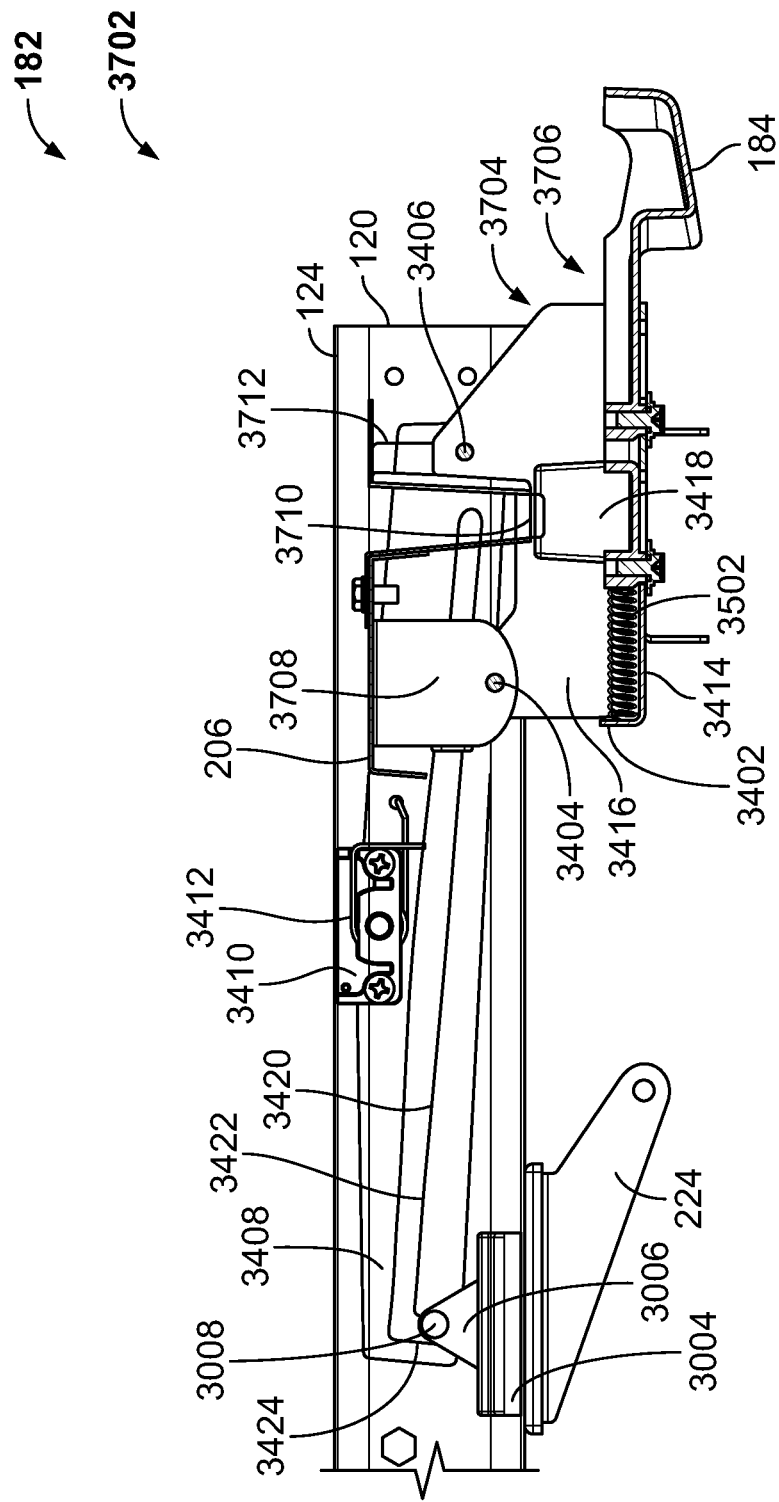
FIG. 38 is a partial cutaway front view of the leg lock assembly of the portable grill of FIGS. 1-20, with the leg lock assembly shown positioned in the locked configuration of FIG. 37.
Figure 39:
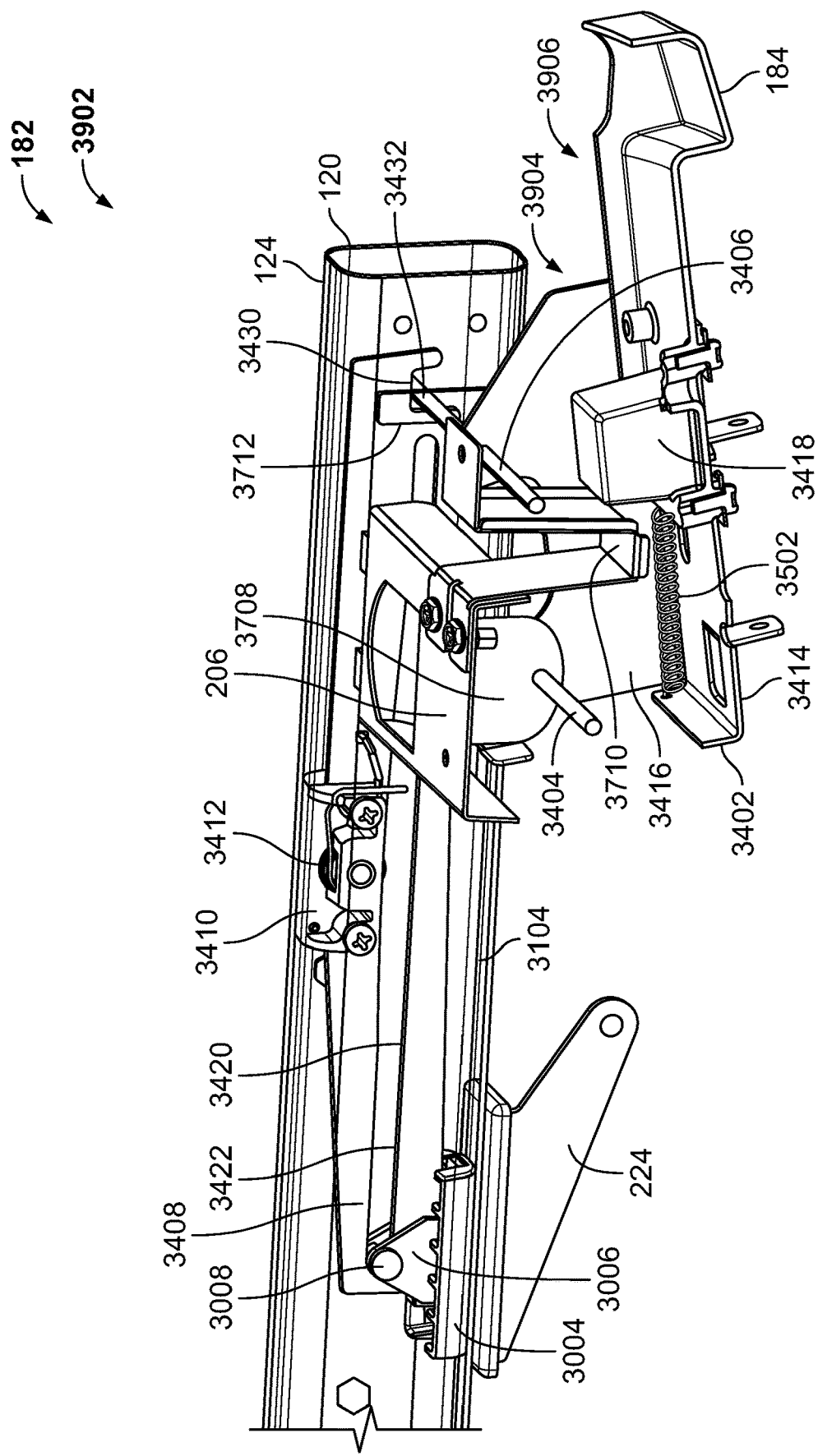
FIG. 39 is a partial cutaway perspective view of the leg lock assembly of the portable grill of FIGS. 1-20, with the leg lock assembly shown positioned in an example first unlocked configuration.
Figure 40:
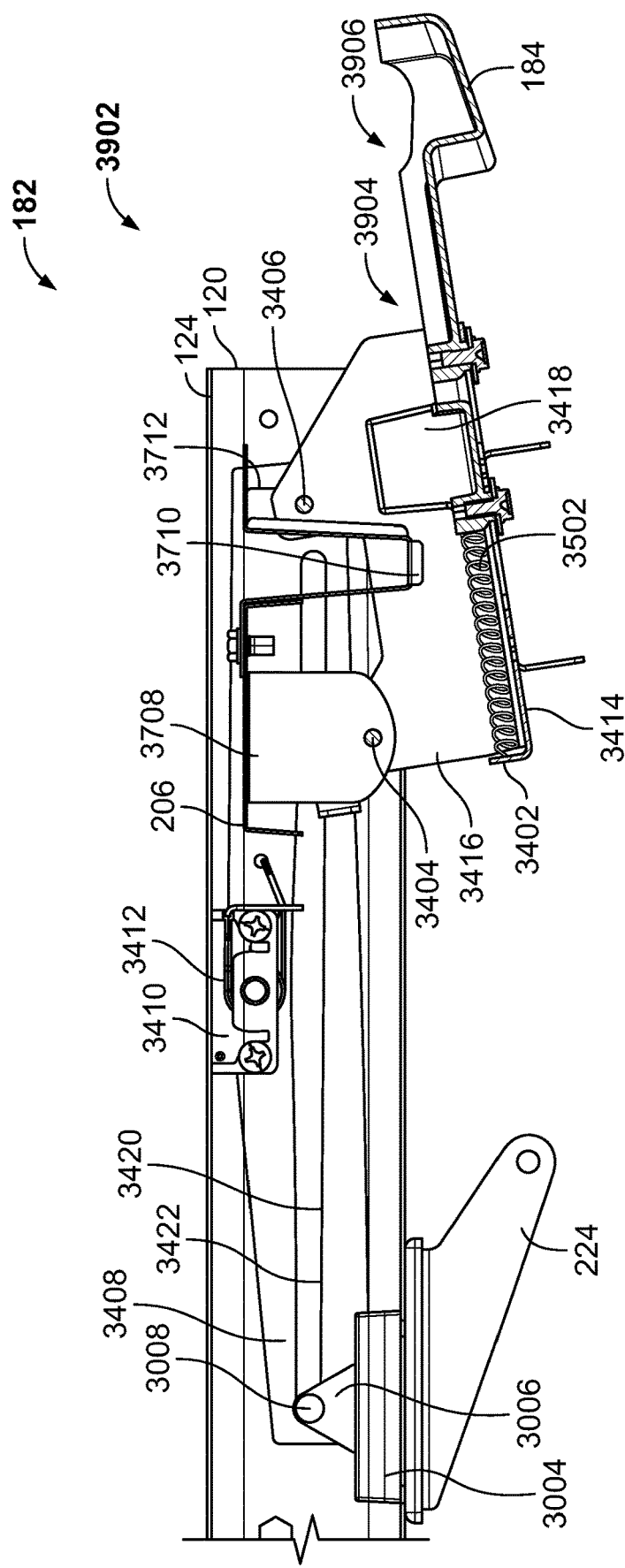
FIG. 40 is a partial cutaway front view of the leg lock assembly of the portable grill of FIGS. 1-20, with the leg lock assembly shown positioned in the first unlocked configuration of FIG. 39.
Figure 41:
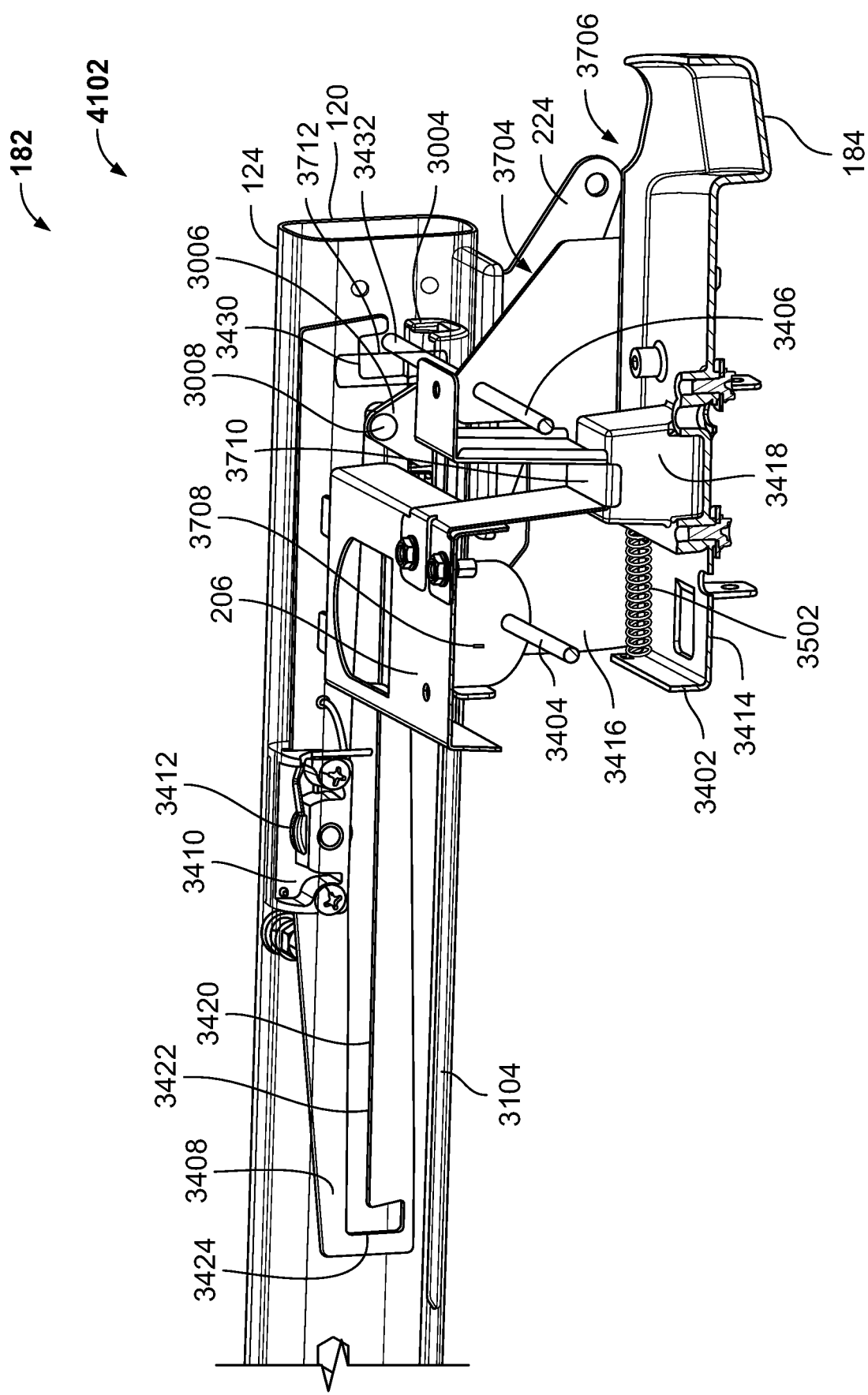
FIG. 41 is a partial cutaway perspective view of the leg lock assembly of the portable grill of FIGS. 1-20, with the leg lock assembly shown positioned in an example second unlocked configuration.
Figure 42:
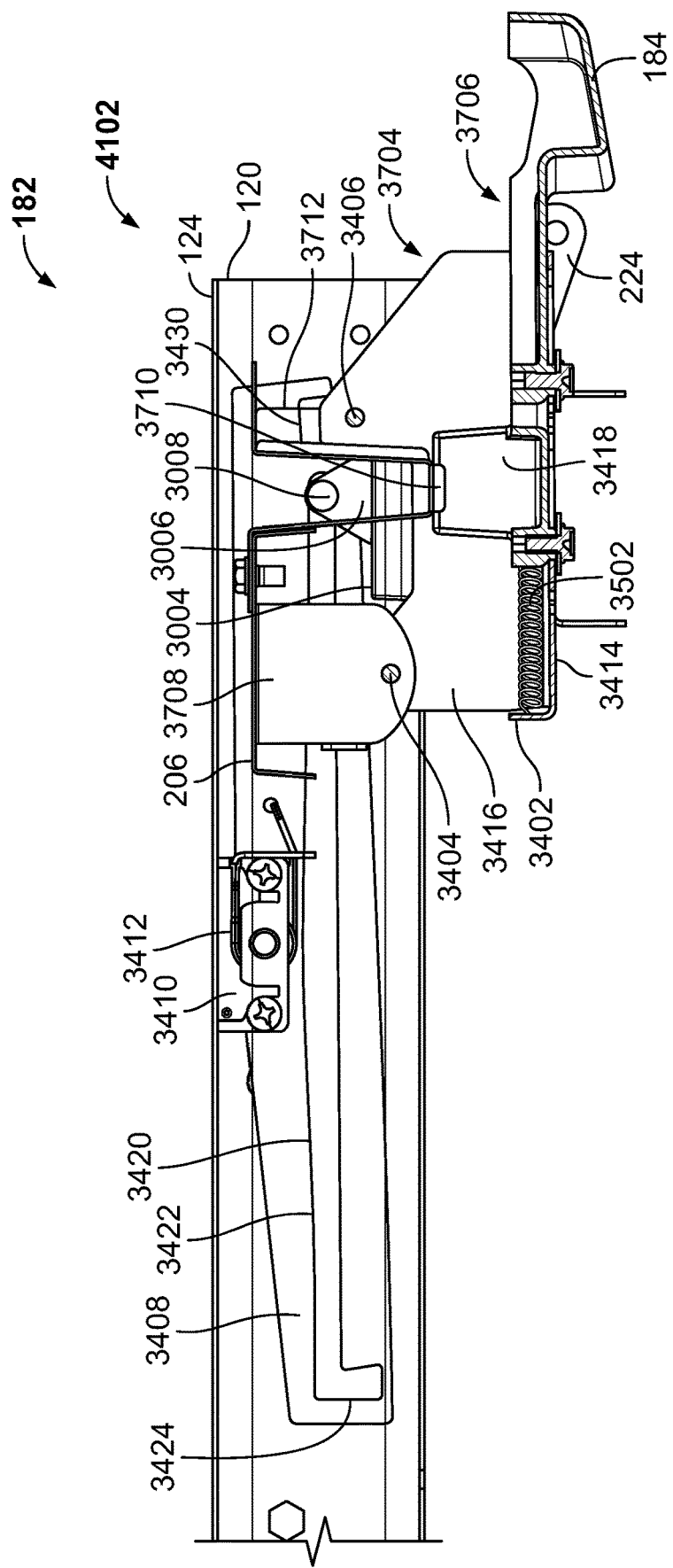
FIG. 42 is a partial cutaway front view of the leg lock assembly of the portable grill of FIGS. 1-20, with the leg lock assembly shown positioned in the second unlocked configuration of FIG. 41.

FIGS. 34-42 further illustrate the leg lock assembly 182 of the portable grill 100 of FIGS. 1-20. FIG. 34 is a perspective view of the leg lock assembly 182 of the portable grill 100 of FIGS. 1-20, with the leg lock assembly 182 shown in isolation. FIG. 35 is a top view of the leg lock assembly 182 of the portable grill 100 of FIGS. 1-20, with the leg lock assembly 182 shown in isolation. FIG. 36 is a bottom view of the leg lock assembly 182 of the portable grill 100 of FIGS. 1-20, with the leg lock assembly 182 shown in isolation. FIG. 37 is a partial cutaway perspective view of the leg lock assembly 182 of the portable grill 100 of FIGS. 1-20, with the leg lock assembly 182 shown positioned in an example locked configuration 3702, as may occur when the portable grill 100 is positioned in the erected configuration 102 shown in FIGS. 1-10. FIG. 38 is a partial cutaway front view of the leg lock assembly 182 of the portable grill 100 of FIGS. 1-20, with the leg lock assembly shown positioned in the locked configuration 3702 of FIG. 37. FIG. 39 is a partial cutaway perspective view of the leg lock assembly 182 of the portable grill 100 of FIGS. 1-20, with the leg lock assembly 182 shown positioned in an example first unlocked configuration 3902, as may occur in connection with initiating the transition of the portable grill 100 from the erected configuration 102 shown in FIGS. 1-10 into the collapsed configuration 1102 shown in FIGS. 11-20. FIG. 40 is a partial cutaway front view of the leg lock assembly 182 of the portable grill 100 of FIGS. 1-20, with the leg lock assembly 182 shown positioned in the first unlocked configuration 3902 of FIG. 39. FIG. 41 is a partial cutaway perspective view of the leg lock assembly 182 of the portable grill 100 of FIGS. 1-20, with the leg lock assembly 182 shown positioned in an example second unlocked configuration 4102, as may occur in connection with completing the transition of the portable grill 100 from the erected configuration 102 shown in FIGS. 1-10 into the collapsed configuration 1102 shown in FIGS. 11-20. FIG. 42 is a partial cutaway front view of the leg lock assembly 182 of the portable grill 100 of FIGS. 1-20, with the leg lock assembly 182 shown positioned in the second unlocked configuration 4102 of FIG. 41.

As shown in FIGS. 34-42, the leg lock assembly 182 of the portable grill 100 includes the handle 184 described above, and further includes an example lever 3402, an example support rod 3404, an example link 3406, an example lockbar 3408, an example spring carrier 3410, an example torsion spring 3412, and one or more example tension spring(s) 3502. The lever 3402 of the leg lock assembly 182 includes an example base 3414, and further includes example flanges 3416 extending away from the base 3414 at an angle (e.g., a ninety degree angle) relative thereto. The flanges 3416 of the lever 3402 are configured to be pivotally coupled to the support plate 206 of the portable grill 100 via the support rod 3404 such that the lever 3402 can be rotated relative to the support plate 206 between an example lowered position 3704 (e.g., as shown in FIGS. 37 and 38) and an example raised position 3904 (e.g., as shown in FIGS. 39 and 40). In this regard, the support rod 3404 extends through a first pair of openings (e.g., through holes) formed in the flanges 3416 of the lever 3402, and similarly extends through a pair of openings (e.g., through holes) formed in example flanges 3708 of the support plate 206 of the portable grill 100. The support rod 3404 accordingly enables the lever 3402 to rotate relative to the support plate 206 about an axis of rotation defined by the support rod 3404. The flanges 3416 of the lever 3402 are further configured to be operatively coupled to the lockbar 3408 of the leg lock assembly 182 via the link 3406 of the leg lock assembly 182 such that the movement of the lever 3402 from the lowered position 3704 into the raised position 3904 is transferred to the lockbar 3408, as further described below. In this regard, the link 3406 extends through a second pair of openings (e.g., through holes) formed in the flanges 3416 of the lever 3402, with a free end of the link being operatively coupled to the lockbar 3408, as further described below.

The handle 184 of the leg lock assembly 182 is slidably coupled to the base 3414 of the lever 3402 via one or more example fastener(s) 3602 extending through one or more example slot(s) 3604 formed in the base 3414, thereby enabling the handle 184 to slide relative to the base 3414 between an example retracted position 3706 (e.g., as shown in FIGS. 37 and 38) and an example extended position 3906 (e.g., as shown in FIGS. 39 and 40). The tension spring(s) 3502 of the leg lock assembly 182 is/are coupled at a first end to the handle 184 of the leg lock assembly 182, and is/are further coupled at a second end opposite the first end to the lever 3402 of the leg lock assembly 182, thereby biasing the handle 184 into the retracted position 3706. The handle 184 is configured to move (e.g., slide) from the retracted position 3706 into the extended position 3906 in response to a user of the portable grill 100 gripping the handle 184 and pulling the handle 184 in a direction opposite that of the biasing force(s) produced by the tension spring(s) 3502. The handle 184 is further configured to move (e.g., rotate) the lever 3402 of the leg lock assembly 182 from the lowered position 3704 into the raised position 3904 in response to a user of the portable grill 100 gripping the handle 184 and pulling the handle 184 in an upward direction, as further described below.

The handle 184 of the leg lock assembly 182 includes an example handle lift blocker 3418 configured to selectively engage an example handle lift stop 3710 that is rigidly coupled (e.g., via one or more fastener(s)) to the support plate 206 of the portable grill 100. If a user of the portable grill 100 attempts to move the lever 3402 from the lowered position 3704 (e.g., as shown in FIGS. 37 and 38) into the raised position 3904 (e.g., as shown in FIGS. 39 and 40) while the handle 184 is in the retracted position 3706 (e.g., as shown in FIGS. 37 and 38), the handle lift blocker 3418 of the handle 184 contacts and/or interferes with the handle lift stop 3710 to prevent such movement of the lever 3402. Conversely, if a user of the portable grill 100 attempts to move the lever 3402 from the lowered position 3704 (e.g., as shown in FIGS. 37 and 38) into the raised position 3904 (e.g., as shown in FIGS. 39 and 40) while the handle 184 is in the extended position 3906 (e.g., as shown in FIGS. 39 and 40), the handle lift blocker 3418 of the handle 184 does not contact and/or interfere with the handle lift stop 3710, and such movement of the lever 3402 is enabled. Thus, the lever 3402 of the leg lock assembly 182 can only be moved from the lowered position 3704 (e.g., as shown in FIGS. 37 and 38) into the raised position 3904 (e.g., as shown in FIGS. 39 and 40) while the handle 184 is in the extended position 3906 (e.g., as shown in FIGS. 39 and 40).

The lockbar 3408 of the leg lock assembly 182 is located and/or positioned within the rear rail 124 of the frame 120 of the portable grill 100, and is movable (e.g., pivotable) relative thereto. In this regard, the lockbar 3408 of the leg lock assembly 182 is pivotally coupled to the spring carrier 3410 of the leg lock assembly 182 such that the lockbar 3408 is pivotable relative to the spring carrier 3410 within the rear rail 124 of the frame 120. The spring carrier 3410 of the leg lock assembly 182 is also located and/or positioned within the rear rail 124 of the frame 120 of the portable grill 100, and is rigidly coupled (e.g., via one or more fastener(s)) thereto. The spring carrier 3410 carries and or supports the torsion spring 3412 of the leg lock assembly 182, which is also located and/or positioned within the rear rail 124 of the frame 120. The torsion spring 3412 is operatively coupled to the spring carrier 3410 and to the lockbar 3408, with the torsion spring 3412 being configured to bias the lockbar 3408 into a position associated with the locked configuration 3702 of the leg lock assembly 182, as shown in FIGS. 37 and 38. The lockbar 3408 includes an example slot 3420, with the slot 3420 having an example linear portion 3422 and an example notch 3424 extending at an angle from the linear portion 3422. The linear portion 3422 of the slot 3420 includes an example first end 3426 and an example second end 3428 located opposite the first end 3426. The notch 3424 of the slot 3420 is located proximate the first end 3426 of the linear portion 3422 of the slot 3420 and extends downwardly therefrom.

When the leg lock assembly 182 is positioned in the locked configuration 3702 shown in FIGS. 37 and 38, the linear portion 3422 of the slot 3420 of the lockbar 3408 is oriented at an upward angle (e.g., such that the first end 3426 of the linear portion 3422 is raised above the second end 3428 of the linear portion 3422). The torsion spring 3412 biases the lockbar 3408 into a position consistent with the upwardly-angled orientation of the linear portion 3422 of the slot 3420, as shown in FIGS. 37 and 38. When the leg lock assembly 182 is positioned in either the first unlocked configuration 3902 shown in FIGS. 39 and 40 or the second unlocked configuration 4102 shown in FIGS. 41 and 42, the linear portion 3422 of the slot 3420 of the lockbar 3408 is oriented horizontally (e.g., such that the first end 3426 of the linear portion 3422 is at approximately the same vertical position as the second end 3428 of the linear portion 3422). The bias provided on the lockbar 3408 by the torsion spring 3412 must be overcome in order for the lockbar 3408 to be moved from a position consistent with the upwardly-angled orientation of the linear portion 3422 of the slot 3420 (e.g., as shown in FIGS. 37 and 38) into a position consistent with the horizontally-angled orientation of the linear portion 3422 of the slot 3420 (e.g., as shown in FIGS. 39 and 40).

The slot 3420 (e.g., both the linear portion 3422 and the notch 3424) is configured to receive, carry, and/or support the above-described locking pin 3008, which in turn is carried and/or supported by the locking pin carrier 3006, with the locking pin carrier 3006 being rigidly coupled to the rear slider 3004, and with the rear slider 3004 being rigidly coupled to the rear flange 224 of the second leg unit 158. When the leg lock assembly 182 is positioned in the locked configuration 3702 shown in FIGS. 37 and 38 (e.g., as may occur when the portable grill 100 is positioned in the erected configuration 102 shown in FIGS. 1-10), the locking pin 3008 is located and/or positioned within the notch 3424 of the slot 3420, thereby preventing the locking pin 3008, the locking pin carrier 3006, the rear slider 3004, and the rear flange 224 of the second leg unit 158 from moving (e.g., sliding) relative to the rear rail 124 of the frame 120. Locking the position of the rear flange 224 relative to the rear rail 124 of the frame 120 in connection with the locked configuration 3702 of the leg lock assembly 182 more broadly locks the position of the second leg unit 158 of the portable grill 100 relative to the frame 120 while the portable grill 100 is positioned in the erected configuration 102 shown in FIGS. 1-10.

When the leg lock assembly 182 is positioned in either the first unlocked configuration 3902 shown in FIGS. 39 and 40 (e.g., as may occur in connection with initiating the transition of the portable grill 100 from the erected configuration 102 shown in FIGS. 1-10 into the collapsed configuration 1102 shown in FIGS. 11-20) or the second unlocked configuration 4102 shown in FIGS. 41 and 42 (as may occur in connection with completing the transition of the portable grill 100 from the erected configuration 102 shown in FIGS. 1-10 into the collapsed configuration 1102 shown in FIGS. 11-20), the locking pin 3008 is located and/or positioned within the linear portion 3422 of the slot 3420, thereby enabling the locking pin 3008, the locking pin carrier 3006, the rear slider 3004, and the rear flange 224 of the second leg unit 158 to move (e.g., slide) relative to the rear rail 124 of the frame 120. Enabling movement of the position of the rear flange 224 relative to the rear rail 124 of the frame 120 in connection with the first unlocked configuration 3902 and/or the second unlocked configuration 4102 of the leg lock assembly 182 more broadly enables movement of the position of the second leg unit 158 of the portable grill 100 relative to the frame 120 in connection with transitioning the portable grill 100 from the erected configuration 102 shown in FIGS. 1-10 into the collapsed configuration 1102 shown in FIGS. 1-20, and vice-versa.

The link 3406 of the leg lock assembly 182 operatively couples the lockbar 3408 to the lever 3402 and/or to the handle 184 such that movement (e.g., rotation) of the lever 3402 and/or movement (e.g., rotation) of the handle 184 is transferred from the lever 3402 and/or the handle 184 to the link 3406, and from the link 3406 to the lockbar 3408. In the illustrated example of FIGS. 34-42, the lockbar 3408 includes an example notch 3430 located proximate the second end 3428 of the linear portion 3422 of the slot 3420 of the lockbar 3408. The link 3406 extends from the flanges 3416 of the lever 3402 through an example slot 3712 formed in the rear rail 124 of the frame 120 such that an example portion 3432 of the link 3406 proximate an example free end 3504 of the link 3406 is located and/or positioned within the notch 3430 of the lever 3402. The portion 3432 of the link 3406 is movable (e.g., upwardly movable) within the notch 3430 of the lockbar 3408 in response to the lever 3402 of the leg lock assembly 182 being moved (e.g., raised via the handle 184 of the leg lock assembly 182) from the lowered position 3704 shown in FIGS. 37 and 38 into the raised position 3904 shown in FIGS. 39 and 40 while the handle 184 is positioned in the extended position 3906 shown in FIGS. 39 and 40.

Moving the link 3406 upward within the notch 3430 of the lockbar 3408 generates an upward force on the lockbar 3408 that overcomes the biasing force produced by the torsion spring 3412, thereby enabling the lockbar 3408 to be moved from a position consistent with the upwardly-angled orientation of the linear portion 3422 of the slot 3420 (e.g., as shown in FIGS. 37 and 38) into a position consistent with the horizontally-angled orientation of the linear portion 3422 of the slot 3420 (e.g., as shown in FIGS. 39 and 40). As discussed above, such movement of the lockbar 3408 positions the locking pin 3008 within the linear portion 3422 of the slot 3420 of the lockbar 3408, thereby enabling the locking pin 3008, the locking pin carrier 3006, the rear slider 3004, and the rear flange 224 of the second leg unit 158 to move (e.g., slide) relative to the rear rail 124 of the frame 120. Enabling movement of the position of the rear flange 224 relative to the rear rail 124 of the frame 120 in connection with the first unlocked configuration 3902 and/or the second unlocked configuration 4102 of the leg lock assembly 182 more broadly enables movement of the position of the second leg unit 158 of the portable grill 100 relative to the frame 120 in connection with transitioning the portable grill 100 from the erected configuration 102 shown in FIGS. 1-10 into the collapsed configuration 1102 shown in FIGS. 1-20, and vice-versa. Accordingly, a user of the portable grill 100 can transition the leg lock assembly 182 from the locked configuration 3702 shown in FIGS. 37 and 38 into the first unlocked configuration 3902 shown in FIGS. 39 and 40 (e.g., to unlock and/or release the second leg unit 158 of the portable grill 100 in connection with transitioning the portable grill 100 from the erected configuration 102 into the collapsed configuration 1102) by moving the handle 184 from the retracted position 3706 into the extended position 3906, and by then moving the lever 3402 (e.g., via the handle 184) from the lowered position 3704 into the raised position 3904.

The portable grill 100 of FIGS. 1-20 further includes an example tank blocker 186 configured to restrict (e.g., prevent) the portable grill 100 from being transitioned from the erected configuration 102 shown in FIGS. 1-10 into the collapsed configuration 1102 shown in FIGS. 11-20 when a fuel tank that is removably couplable to the portable grill 100 (e.g., via a threaded connection formed between the fuel tank and the tank connector 210 of the valve and regulator assembly 208) remains coupled to the portable grill 100. In some examples, the tank blocker 186 is operatively coupled to the above-described leg lock assembly 182 and to an attached fuel tank of the portable grill 100 such that movement of the tank blocker 186 from a blocked configuration (e.g., which prevents actuation of the handle 184 of the leg lock assembly 182 from the retracted position 3706 into the extended position 3906) into an unblocked configuration (e.g., which enables actuation of the handle 184 of the leg lock assembly 182 from the retracted position 3706 into the extended position 3906) occurs automatically in response to the attached fuel tank becoming uncoupled and/or detached from the portable grill 100. Thus, the tank blocker 186 advantageously provides a mechanically-automated failsafe against the possibility of a user of the portable grill 100 failing to uncouple and/or remove the fuel tank from the portable grill 100 prior to initiating the transition of the portable grill 100 from the erected configuration 102 into the collapsed configuration 1102.

The tank blocker 186 is further configured (e.g., dually configured) to restrict (e.g., prevent) a fuel tank that is removably couplable to the portable grill 100 (e.g., via a threaded connection formed between the fuel tank and the tank connector 210 of the valve and regulator assembly 208) from becoming coupled to the portable grill 100 while the portable grill 100 is in the process of being transitioned from the erected configuration 102 shown in FIGS. 1-10 into the collapsed configuration 1102 shown in FIGS. 11-20. In some examples, the tank blocker 186 is operatively coupled to the above-described leg lock assembly 182 such that movement of the tank blocker 186 from an unblocked configuration (e.g., which enables a fuel tank to be coupled to the portable grill 100) into a blocked configuration (e.g., which prevents a fuel tank from being coupled to the portable grill 100) occurs automatically in response to actuation of the handle 184 of the leg lock assembly 182 in connection with transitioning the portable grill 100 from the erected configuration 102 into the collapsed configuration 1102. Thus, the tank blocker 186 also advantageously provides a mechanically-automated failsafe against the possibility of a user of the portable grill 100 coupling and/or attaching the fuel tank to the portable grill 100 while the portable grill 100 is in the process of transitioning from the erected configuration 102 into the collapsed configuration 1102, and/or while the handle 184 of the leg lock assembly 182 is actuated into the extended position 3906.

Figure 43:
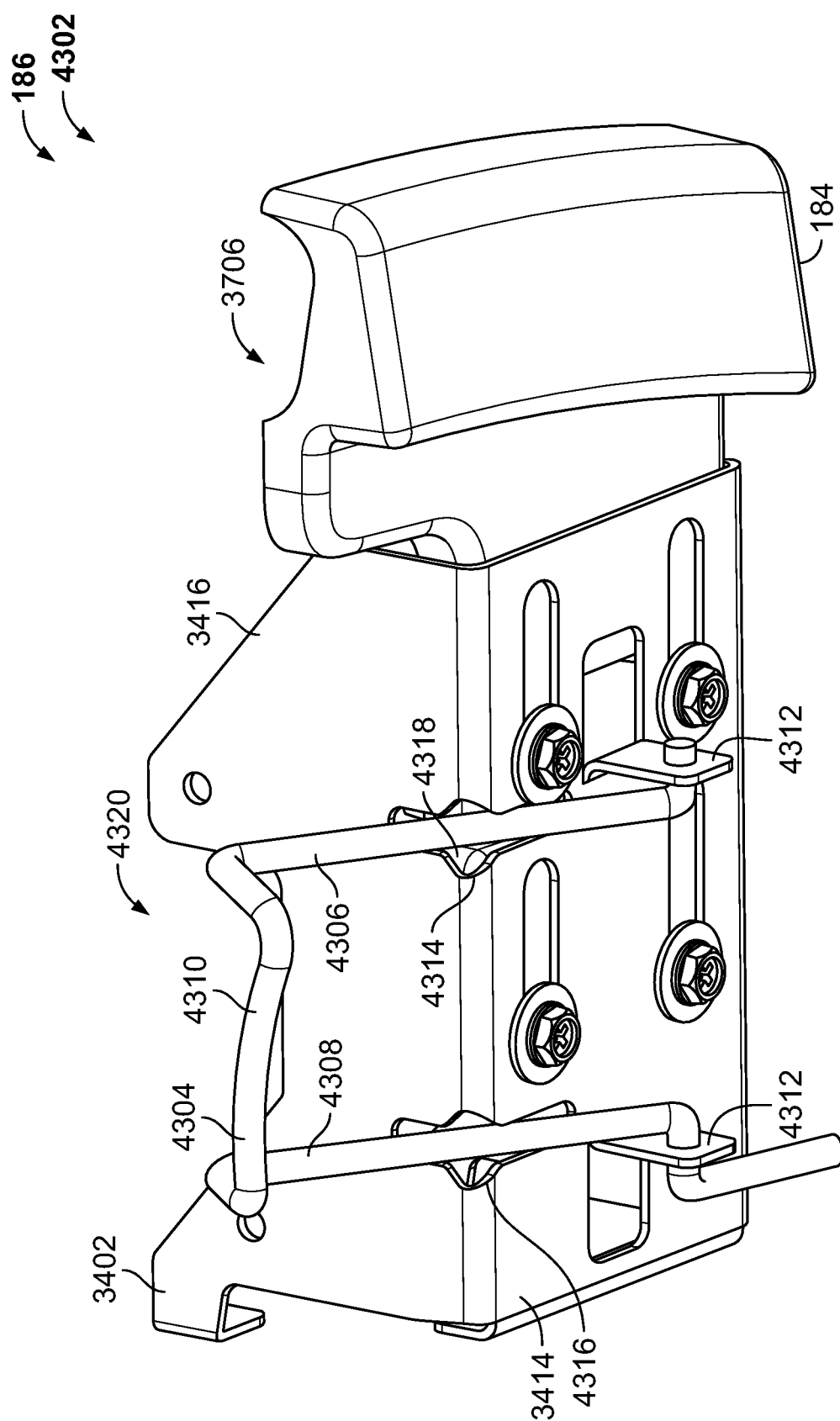
FIG. 43 is a perspective view of the tank blocker of the portable grill of FIGS. 1-20, with the tank blocker shown positioned in an example first blocked configuration.
Figure 44:
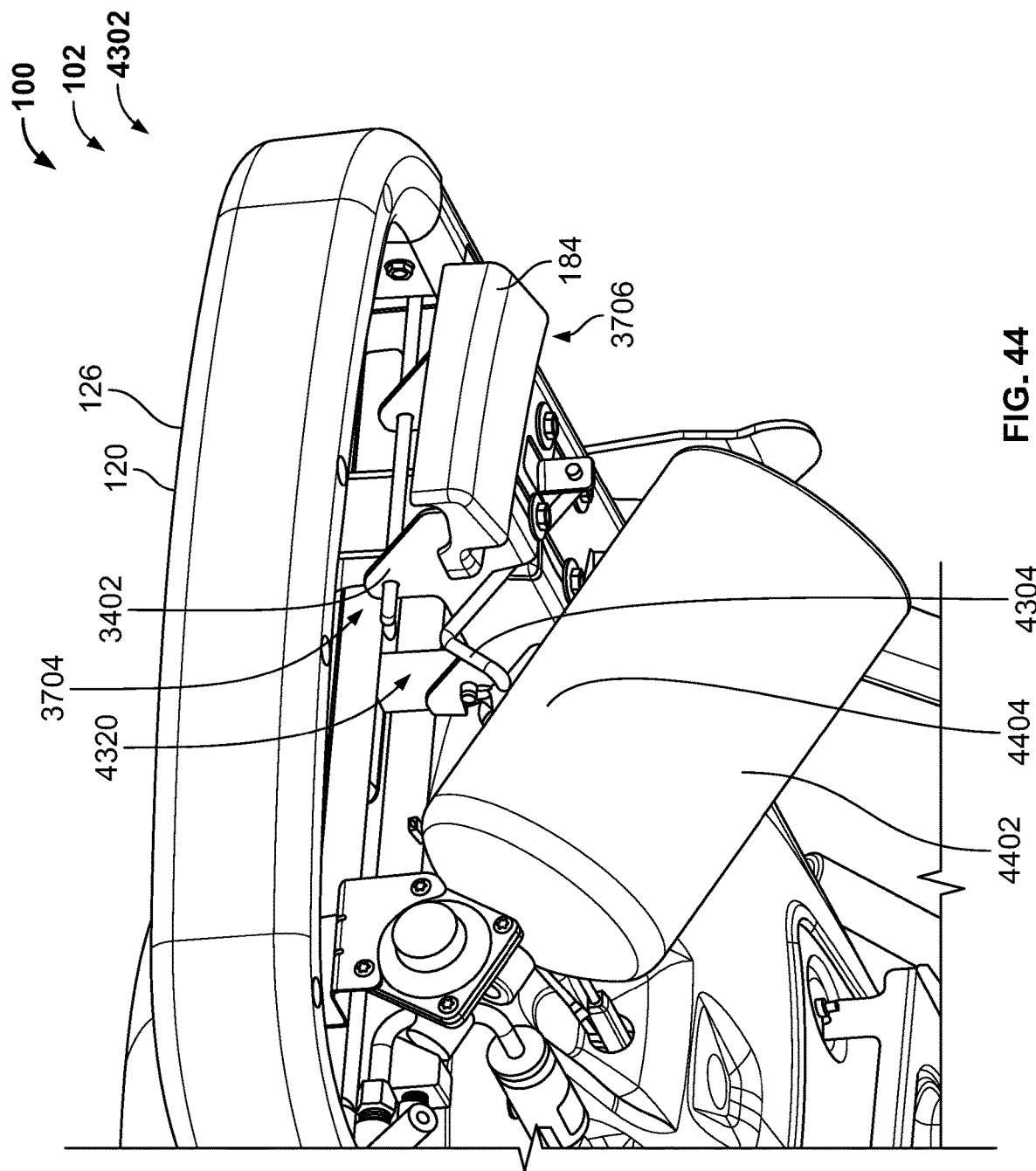
FIG. 44 is a perspective view of the portable grill of FIGS. 1-20, with the tank blocker shown positioned in the first blocked configuration of FIG. 43.
Figure 45:
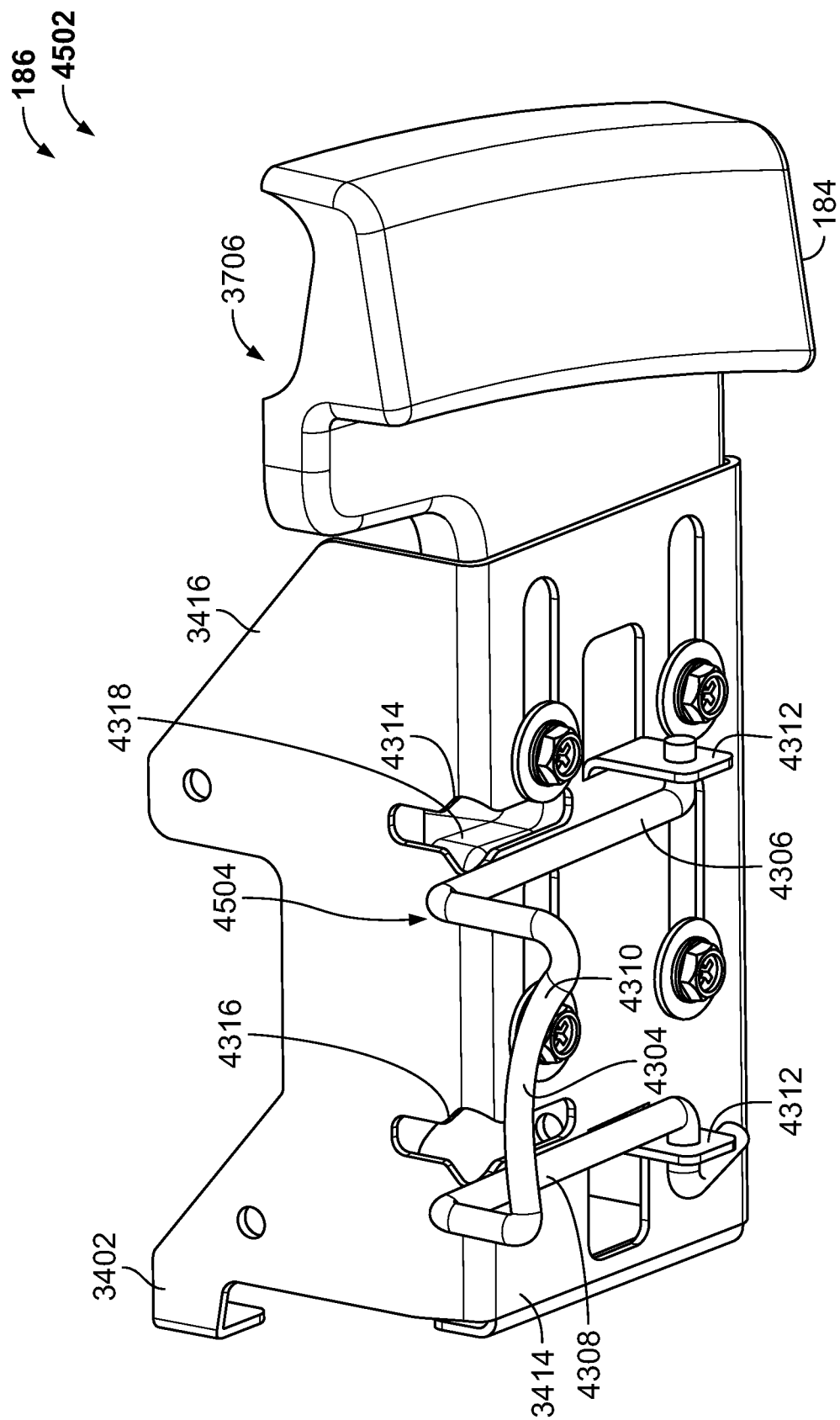
FIG. 45 is a perspective view of the tank blocker of the portable grill of FIGS. 1-20, with the tank blocker shown positioned in an example unblocked configuration.
Figure 46:
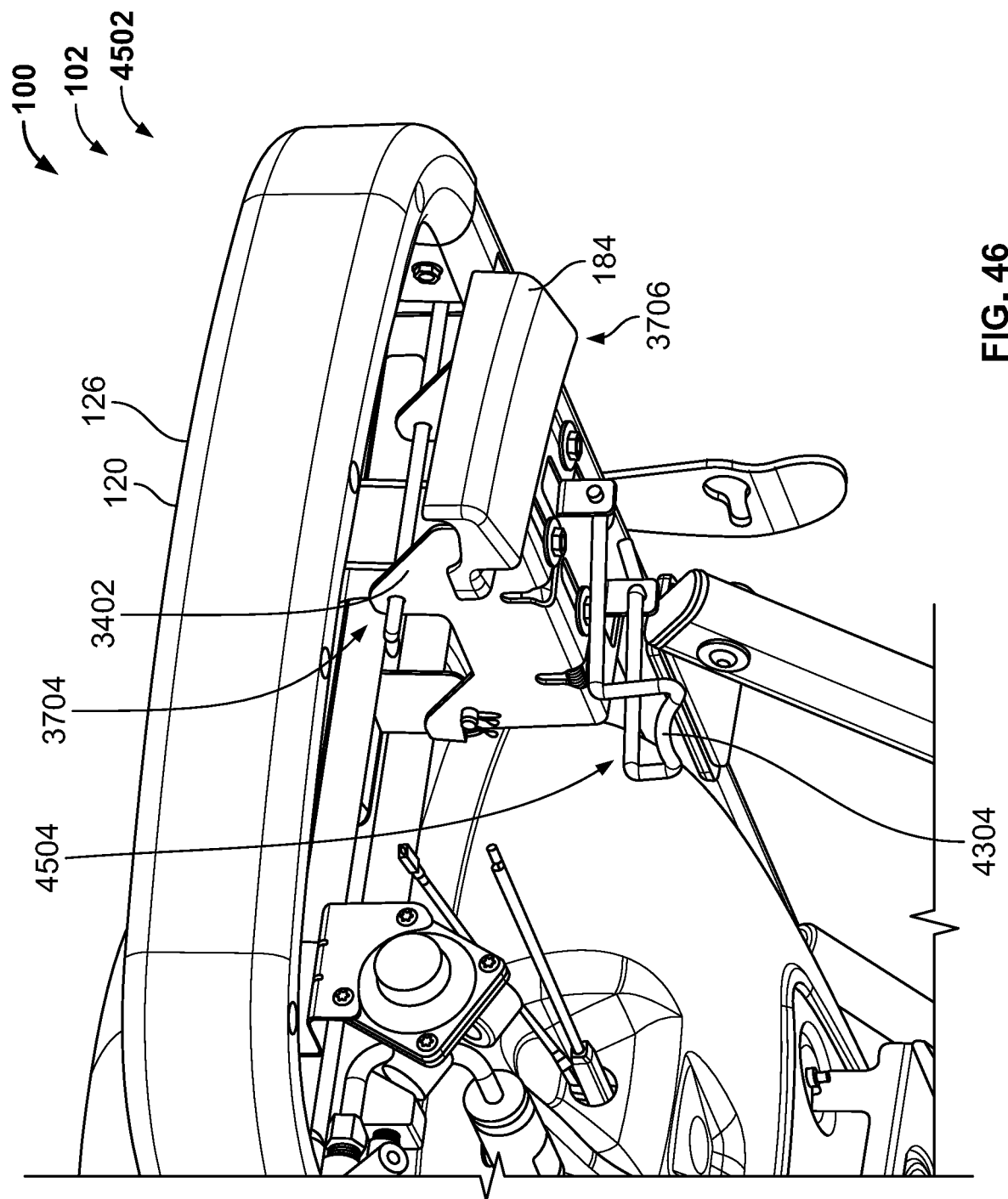
FIG. 46 is a perspective view of the portable grill of FIGS. 1-20, with tank blocker shown positioned in the unblocked configuration of FIG. 45.
Figure 47:
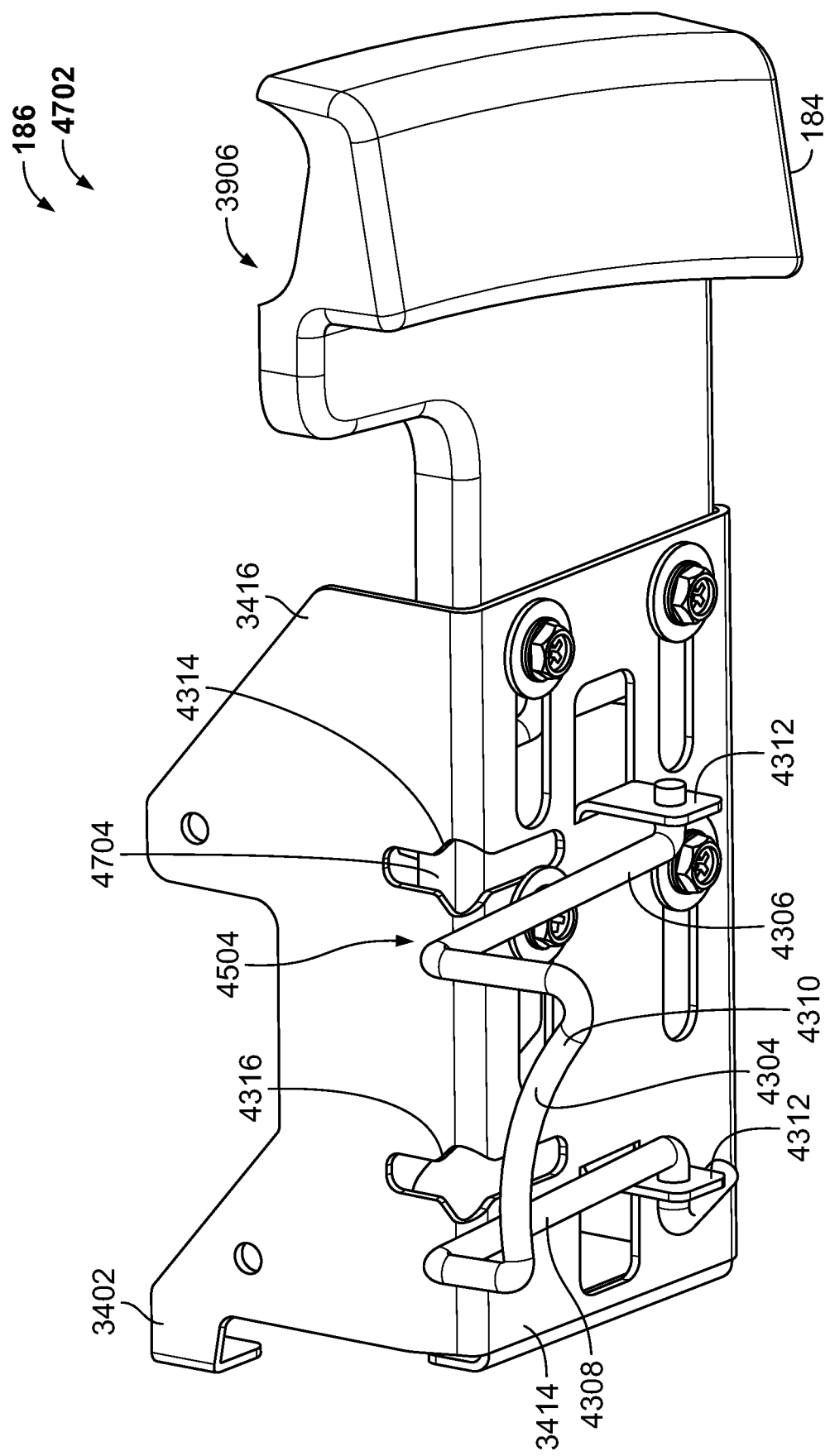
FIG. 47 is a perspective view of the tank blocker of the portable grill of FIGS. 1-20, with the tank blocker shown positioned in an example second blocked configuration.
Figure 48:
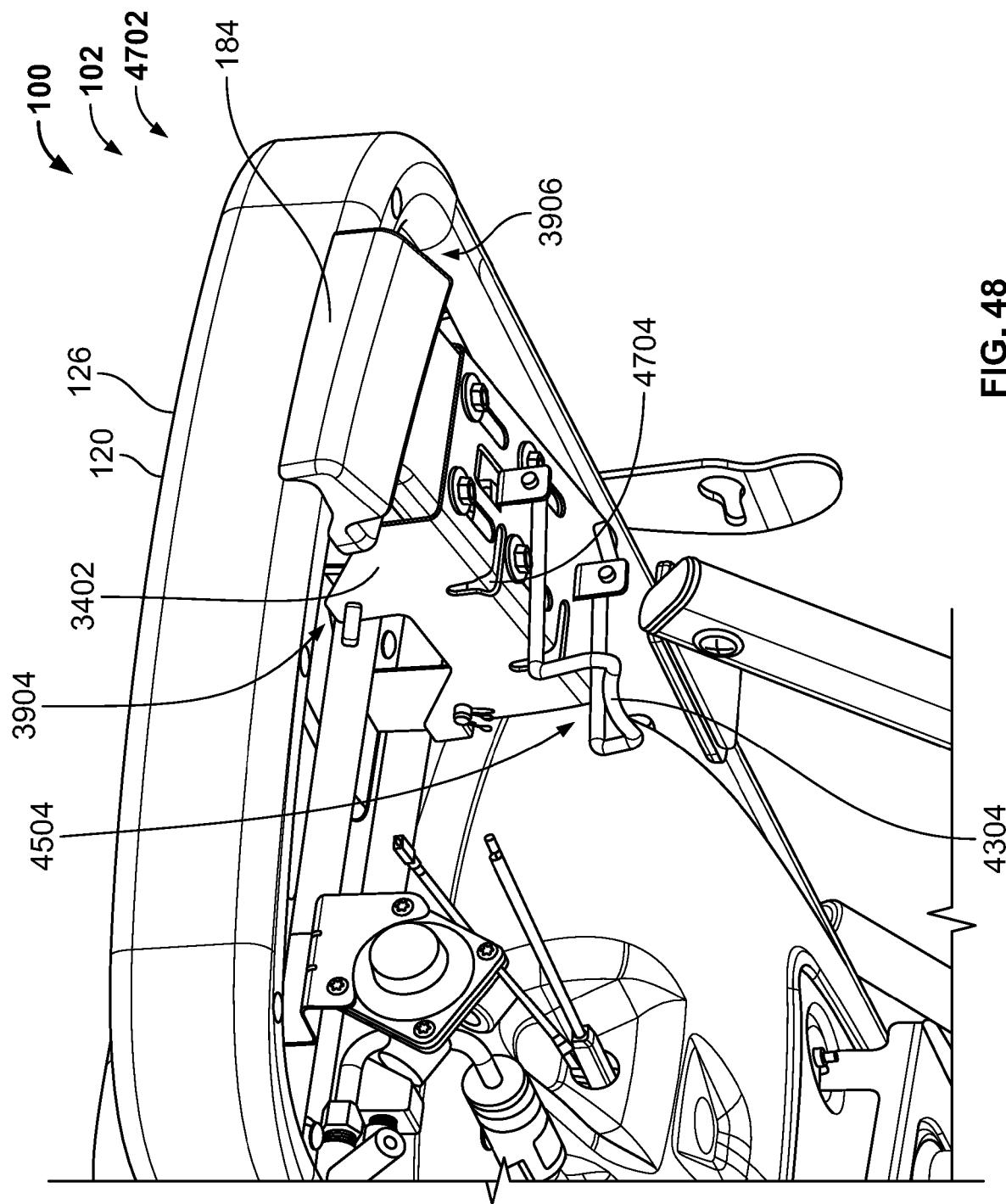
FIG. 48 is a perspective view of the portable grill of FIGS. 1-20, with the tank blocker shown positioned in the second blocked configuration of FIG. 47.

FIGS. 43-48 further illustrate the tank blocker 186 of the portable grill 100 of FIGS. 1-20. FIG. 43 is a perspective view of the tank blocker 186 of the portable grill 100 of FIGS. 1-20, with the tank blocker 186 shown positioned in an example first blocked configuration 4302. FIG. 44 is a perspective view of the portable grill 100 of FIGS. 1-20, with the tank blocker 186 shown positioned in the first blocked configuration 4302 of FIG. 43. FIG. 45 is a perspective view of the tank blocker 186 of the portable grill 100 of FIGS. 1-20, with the tank blocker 186 shown positioned in an example unblocked configuration 4502. FIG. 46 is a perspective view of the portable grill 100 of FIGS. 1-20, with tank blocker 186 shown positioned in the unblocked configuration 4502 of FIG. 45. FIG. 47 is a perspective view of the tank blocker 186 of the portable grill 100 of FIGS. 1-20, with the tank blocker 186 shown positioned in an example second blocked configuration 4702. FIG. 48 is a perspective view of the portable grill 100 of FIGS. 1-20, with the tank blocker 186 shown positioned in the second blocked configuration 4702 of FIG. 47.

As shown in FIGS. 43-48, the tank blocker 186 of the portable grill 100 includes the lever 3402 and the handle 184 of the leg lock assembly 182, and further includes an example wire form 4304 having an example first arm 4306, and example second arm 4308, and an example central portion 4310 extending between the first arm 4306 and the second arm 4308. The first arm 4306 and the second arm 4308 of the wire form 4304 are pivotally coupled to the lever 3402 via example flanges that extend downwardly from the base 3414 of the lever 3402. The central portion 4310 of the wire form 4304 has a contoured and/or curved profile configured to complement (e.g., match) a contoured and/or curved profile of an example fuel tank 4402 that is removably couplable to the portable grill 100. The lever 3402 includes an example first notch 4314 and an example second notch 4316. The handle 184 includes an example notch 4318 configured to selectively align with the first notch 4314 of the lever 3402. The first notch 4314 of the lever 3402 and the notch 4318 of the of the handle 184 are respectively configured to receive the first arm 4306 of the wire form 4304. The second notch 4316 of the lever 3402 is configured to receive the second arm 4308 of the wire form 4304.

The wire form 4304 of the tank blocker 186 is movable (e.g., pivotable) between an example raised position 4320

(e.g., as shown in FIGS. 43 and 44) and an example lowered position 4504 (e.g., as shown in FIGS. 45-48). When the wire form 4304 of the tank blocker 186 is located and/or positioned in the raised position 4320, a portion of the first arm 4306 of the wire form 4304 is located and/or positioned within the first notch 4314 of the lever 3402 and the notch 4318 of the handle 184, and a portion of the second arm 4308 of the wire form 4304 is located and/or positioned within the second notch 4316 of the lever 3402, as generally shown in FIGS. 43 and 44. As shown in FIG. 44, the wire form 4304 of the tank blocker 186 can be moved into and/or maintained in the raised position 4320 in response to the fuel tank 4402 being coupled and/or attached to the portable grill 100 (e.g., via a threaded connection formed between the fuel tank 4402 and the tank connector 210 of the valve and regulator assembly 208). In this regard, the act of manually coupling and/or attaching the fuel tank 4402 to the portable grill 100 causes an example surface 4404 (e.g., a sidewall) of the fuel tank 4402 to contact the central portion 4310 of the wire form 4304 in a manner that pivots the wire form 4304 in an upward direction toward and/or into the raised position 4320.

When the wire form 4304 of the tank blocker 186 is located and/or positioned in the lowered position 4504, the first arm 4306 of the wire form 4304 is located and/or positioned outside of the first notch 4314 of the lever 3402 and the notch 4318 of the handle 184, and the second arm 4308 of the wire form 4304 is located and/or positioned outside of the second notch 4316 of the lever 3402, as generally shown in FIGS. 45-48. As shown in FIG. 46, the wire form 4304 of the tank blocker 186 can be moved into and/or maintained in the lowered position 4504 in response to the fuel tank 4402 being uncoupled and/or detached from the portable grill 100 (e.g., via a threaded connection formed between the fuel tank 4402 and the tank connector 210 of the valve and regulator assembly 208). In this regard, the act of manually uncoupling and/or detaching the fuel tank 4402 from the portable grill 100 causes the surface 4404 (e.g., the sidewall) of the fuel tank 4402 to be removed from contact with the central portion 4310 of the wire form 4304 in a manner that enables and/or causes the wire form 4304 to then pivot (e.g., under the application of gravity) in an downward direction toward and/or into the lowered position 4504.

The first blocked configuration 4302 of the tank blocker 186 (e.g., as shown in FIGS. 43 and 44) occurs when the portable grill is in the erected configuration 102, the leg lock assembly 182 is in the locked configuration 3702, the lever is in the lowered position 3704, the handle is retracted position 3706, the wire form 4304 is in the raised position 4320, and the fuel tank 4402 is coupled and/or attached to the portable grill 100. The portable grill 100 of FIGS. 1-20 cannot be transitioned from the erected configuration 102 shown in FIGS. 1-10 into the collapsed configuration 1102 shown in FIGS. 11-20 while the tank blocker 186 of the portable grill 100 is in the first blocked configuration 4302. In this regard, commonly locating a portion of the first arm 4306 of the wire form 4304 of the tank blocker 186 within the first notch 4314 of the lever 3402 and the notch 4318 of the handle 184 (e.g., as occurs while the tank blocker 186 is in the first blocked configuration 4302) prevents and/or blocks the handle 184 from sliding relative to the lever 3402, and accordingly prevents and/or blocks the handle 184 from moving away from the retracted position 3706 toward and/or into the extended position 3906. Preventing and/or blocking the movement of the handle 184 from the retracted position 3706 toward and/or into the extended position 3906 in turn prevents and/or blocks the ability of the portable grill 100 to be transitioned from the erected configuration 102 into the collapsed configuration 1102.

The unblocked configuration 4502 of the tank blocker 186 (e.g., as shown in FIGS. 45 and 46) occurs when the portable grill is in the erected configuration 102, the leg lock assembly 182 is in the locked configuration 3702, the lever is in the lowered position 3704, the handle is retracted position 3706, the wire form 4304 is in the lowered position 4504, and the fuel tank 4402 is uncoupled and/or detached from the portable grill 100. The act of transitioning the portable grill 100 of FIGS. 1-20 from the erected configuration 102 shown in FIGS. 1-10 into the collapsed configuration 1102 shown in FIGS. 11-20 can be initiated while the tank blocker 186 of the portable grill 100 is in the unblocked configuration 4502. In this regard, removing the first arm 4306 of the wire form 4304 of the tank blocker 186 from the first notch 4314 of the lever 3402 and the notch 4318 of the handle 184 (e.g., as occurs while the tank blocker 186 is in the unblocked configuration 4502) enables the handle 184 to slide relative to the lever 3402, and accordingly enables the handle 184 to move away from the retracted position 3706 toward and/or into the extended position 3906. Enabling the movement of the handle 184 from the retracted position 3706 toward and/or into the extended position 3906 in turn enables the act of transitioning the portable grill 100 from the erected configuration 102 into the collapsed configuration 1102 to be initiated.

The second blocked configuration 4702 of the tank blocker 186 (e.g., as shown in FIGS. 47 and 48) occurs when the portable grill is transitioning from the erected configuration 102 into the collapsed configuration 1102, the leg lock assembly 182 is in the first unlocked configuration 3902, the lever is in the lowered position 3704 or the raised position 3904, the handle is extended position 3906, the wire form 4304 is in the lowered position 4504, and the fuel tank 4402 is uncoupled and/or detached from the portable grill 100. The fuel tank 4402 cannot be coupled and/or attached to the portable grill 100 (e.g., via the threaded connection formed between the fuel tank 4402 and the tank connector 210 of the valve and regulator assembly 208) while the tank blocker 186 of the portable grill 100 is in the second blocked configuration 4702. In this regard, positioning the handle 184 in the extended position 3906 (e.g., as occurs while the tank blocker 186 is in the second blocked configuration 4702) moves the notch 4318 of the handle 184 out of alignment with the first notch 4314 of the lever 3402, and instead causes an example surface 4704 of the handle 184 to extend across the first notch 4314 of the lever 3402. The extension of the surface 4704 of the handle 184 across the first notch 4314 of the lever 3402 prevents and/or blocks the first arm 4306 of the wire form 4304 of the tank blocker 186 from being moved into and/or within the first notch 4314 of the lever 3402, and accordingly prevents the wire form 4304 of the tank blocker 186 from being moved into the raised position 4320. Preventing and/or blocking the wire form 4304 from being moved into the raised position 4320 in turn prevents and/or blocks the ability of the fuel tank 4402 to become coupled and/or attached to the portable grill 100.

Figure 57:
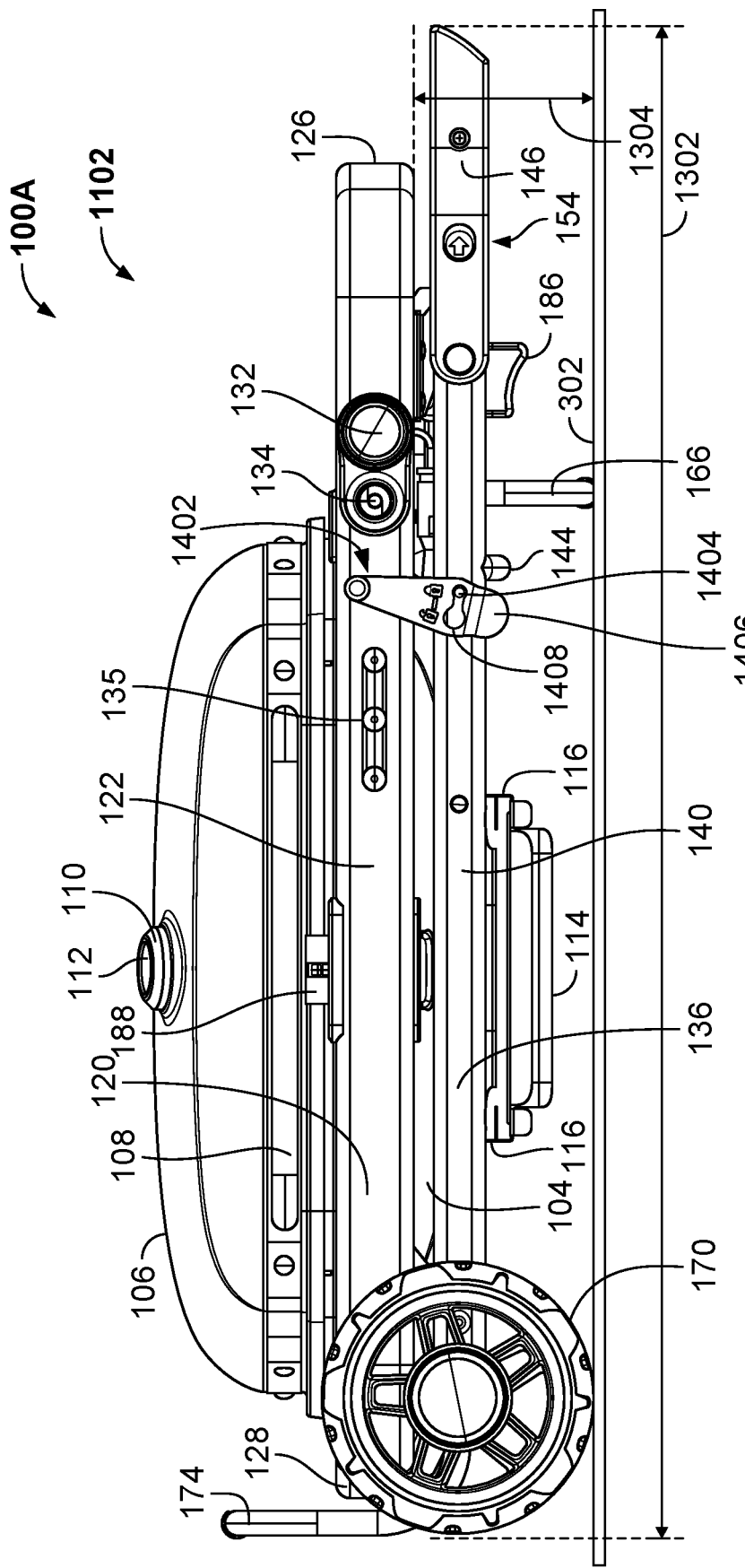
FIG. 57 is a front view of an alternate implementation of the portable grill of FIGS. 1-20, with the alternate portable grill shown positioned in the collapsed configuration of FIGS. 11-20.

The portable grill 100 of FIGS. 1-20 further includes an example leg latch assembly 1402 configured to selectively latch one or more leg(s) and/or one or more leg unit(s) (e.g., the front leg 140 and/or the rear leg 142 of the first leg unit 136, and/or the front leg 162 and/or the rear leg 164 of the second leg unit 158) of the portable grill 100 in a fixed position relative to the frame 120 of the portable grill when the portable grill 100 is positioned in the collapsed configuration 1102. In the illustrated example of FIGS. 1-20, the leg latch assembly 1402 includes an example post 1404 rigidly coupled (e.g., via one or more fastener(s)) to the rear leg 142 of the first leg unit 136, and an example swing plate 1406 pivotally coupled (e.g., via one or more fastener(s)) to the rear rail 124 of the frame 120. In other examples, the post 1404 of the leg latch assembly 1402 can alternatively be rigidly coupled (e.g., via one or more fastener(s)) to the rear leg 164 of the second leg unit 158. In still other examples, the post 1404 of the leg latch assembly 1402 can alternatively be rigidly coupled (e.g., via one or more fastener(s)) to the front leg 140 of the first leg unit 136 or to the front leg 162 of the second leg unit 158, and the swing plate 1406 of the leg latch assembly 1402 can be pivotally coupled (e.g., via one or more fastener(s)) to the front rail 122 of the frame 120. For example, FIG. 57 illustrates an alternate implementation of the portable grill 100 of FIGS. 1-20 (e.g., identified in FIG. 57 as alternate portable grill 100A), with the alternate portable grill 100A shown positioned in the collapsed configuration 1102 of FIGS. 11-20. The alternate portable grill 100A of FIG. 57 is substantially identical to the portable grill 100 of FIGS. 1-20, differing only in that the post 1404 of the leg latch assembly 1402 is rigidly coupled to the front leg 140 (as opposed to the rear leg 142) of the first leg unit 136, and the swing plate 1406 of the leg latch assembly 1402 is pivotally coupled to the front rail 122 (as opposed to the rear rail 124) of the frame 120.

Figure 49:
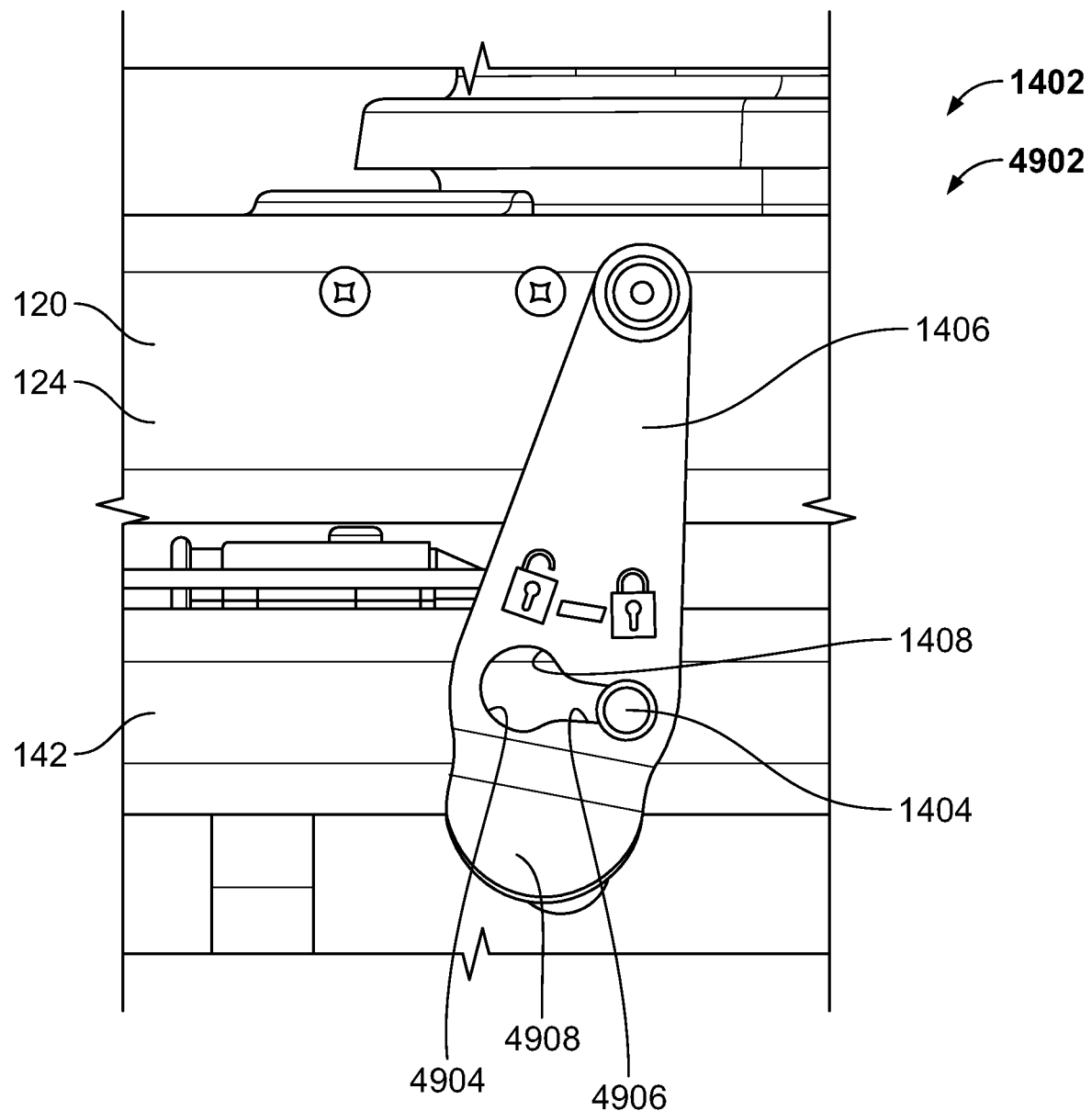
FIG. 49 is a rear sectional view of the leg latch assembly of the portable grill of FIGS. 1-20, with the leg latch assembly shown positioned in an example latched configuration.
Figure 50:
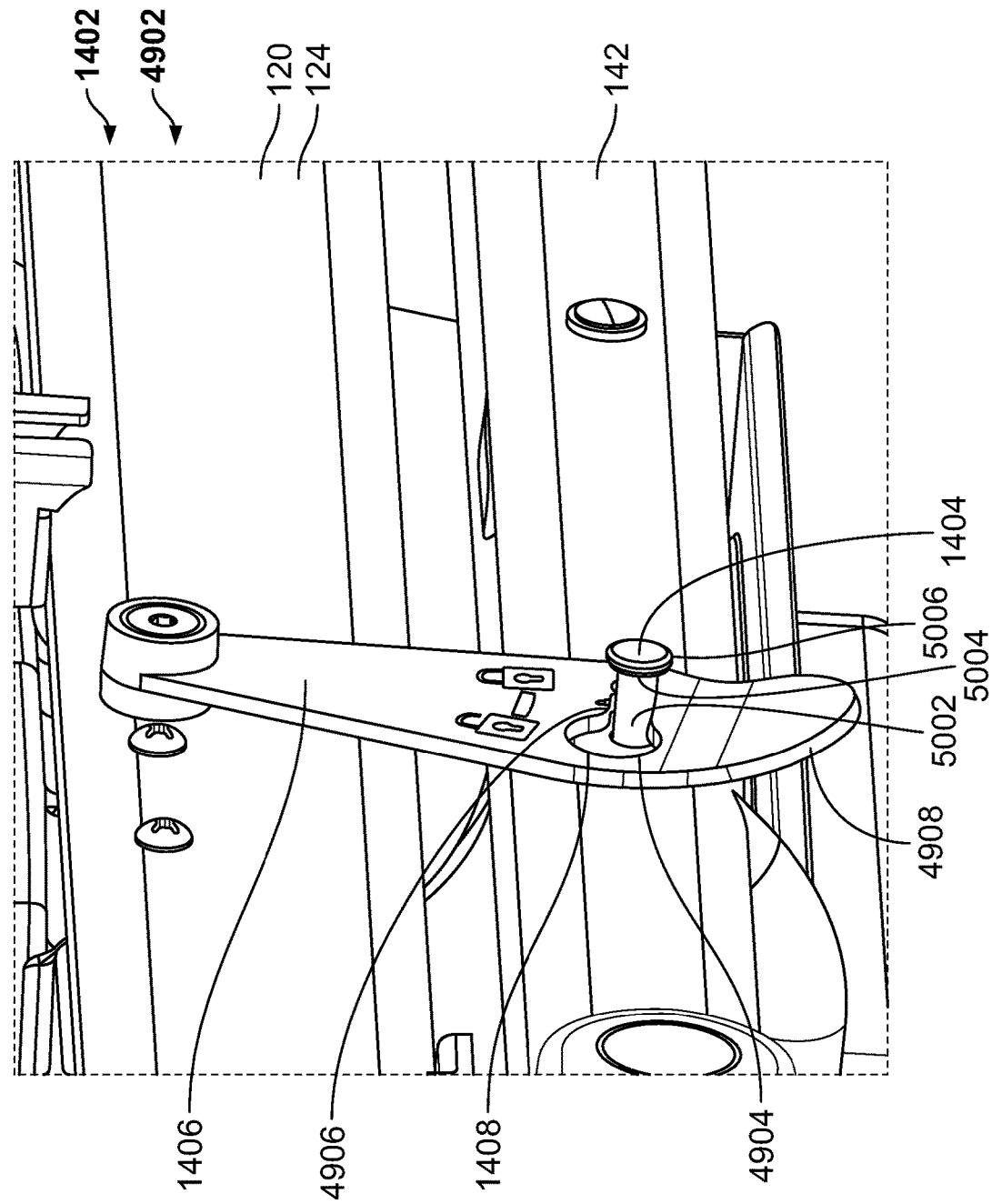
FIG. 50 is a perspective sectional view of the leg latch assembly of the portable grill of FIGS. 1-20, with the leg latch assembly shown positioned in the latched configuration of FIG. 49.
Figure 51:
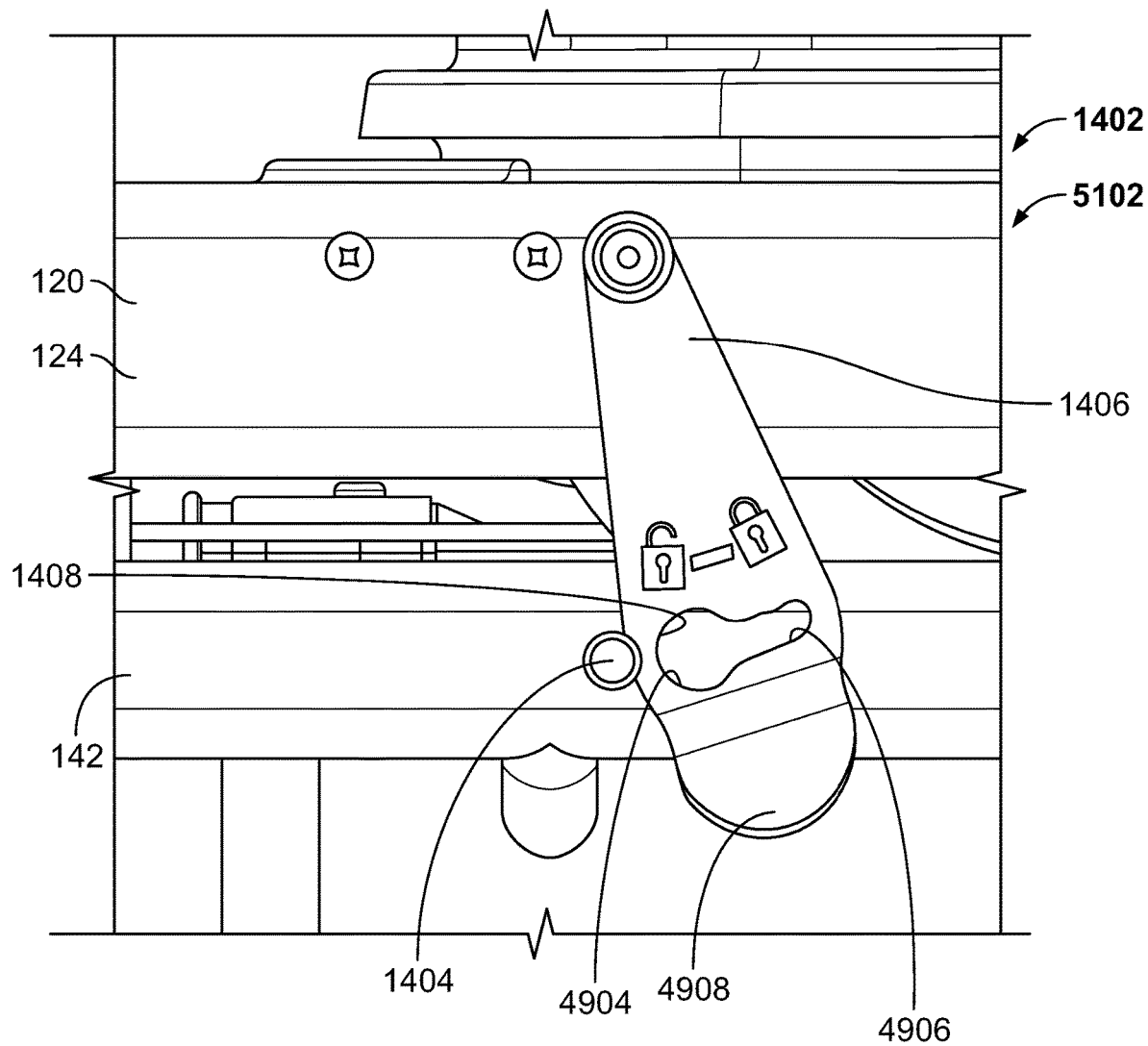
FIG. 51 is a rear sectional view of the leg latch assembly of the portable grill of FIGS. 1-20, with the leg latch assembly shown positioned in an example unlatched configuration.

In the illustrated example of FIGS. 1-20, the swing plate 1406 includes an example opening 1408 configured to selectively receive the post 1404 when the portable grill 100 is in the collapsed configuration 1102. FIGS. 49-51 illustrate the leg latch assembly 1402 of the portable grill 100 in greater detail. In this regard, FIG. 49 is a rear sectional view of the leg latch assembly 1402 of the portable grill 100 of FIGS. 1-20, with the leg latch assembly 1402 shown positioned in an example latched configuration 4902. FIG. 50 is a perspective sectional view of the leg latch assembly 1402 of the portable grill 100 of FIGS. 1-20, with the leg latch assembly 1402 shown positioned in the latched configuration 4902 of FIG. 49. FIG. 51 is a rear sectional view of the leg latch assembly 1402 of the portable grill 100 of FIGS. 1-20, with the leg latch assembly 1402 shown positioned in an example unlatched configuration 5102. As shown in FIGS. 49-51, the opening 1408 of the swing plate 1406 includes an example first post-receiving portion 4904 having a first diameter, and an example second post-receiving portion 4906 having a second diameter less than the first diameter. The swing plate 1406 is pivotable (e.g., about fastener that couples the swing plate 1406 to the rear rail 124 of the frame 120) to selectively locate the post 1404 in the first post-receiving portion 4904 of the opening 1408 or the second post-receiving portion 4906 of the opening 1408.

The swing plate 1406 is configured to be separable from the post 1404 when the post 1404 is located in the first post-receiving portion 4904 of the opening 1408, and to be inseparable from the post 1404 when the post 1404 is located in the second post-receiving portion 4906 of the opening 1408. For example, the post 1404 includes an example shaft 5002 extending away from the rear rail 124 of the frame 120. An example free end 5004 of the shaft 5002 (e.g., located away from the rear rail 124 of the frame 120) includes an example flange 5006 having a diameter that is greater than a diameter of the shaft 5002. In this regard, the diameter of the shaft 5002 is less than or equal to the diameter of the second post-receiving portion 4906 of the opening 1408, and less than the diameter of the first post-receiving portion 4904 of the opening 1408. By contrast, the diameter of the flange 5006 is greater than the diameter of the second post-receiving portion 4906 of the opening 1408, and less than or equal to the diameter of the first post-receiving portion 4904 of the opening 1408.

The above-described dimensional relationships between the first post-receiving portion 4904 of the opening 1408, the second post-receiving portion 4906 of the opening 1408, the shaft 5002 of the post 1404, and the flange 5006 of the post 1404 enable the swing plate 1406 to be pivoted (e.g., manually rotated by a user of the portable grill 100) relative to the post 1404 to move the post 1404 from a location within the second post-receiving portion 4906 of the opening 1408 (e.g., as shown in FIGS. 49 and 50) into a location within the first post-receiving portion 4904 of the opening 1408. When the post 1404 is located in the first post-receiving portion 4904 of the opening 1408, an example lower portion 4908 of the swing plate 1406 can be moved (e.g., manually pulled by a user of the portable grill 100) in a direction away from the rear rail 124 of the frame 120 of the portable grill 100, thereby enabling the post 1404 to be removed from the opening 1408 via the first post-receiving portion 4904 of the opening 1408, and further enabling the swing plate 1406 to be lifted off of and/or over both the shaft 5002 and the flange 5006 of the post 1404. In some examples, the swing plate 1406 is formed from a semi-flexible material to facilitate moving the swing plate 1406 off of and/or over both the shaft 5002 and the flange 5006 of the post 1404. In other examples, the swing plate 1406 can be slidable relative to the rear rail 124 of the frame 120 (e.g., in a direction toward and/or away from the rear rail 124 of the frame 120) to facilitate moving the swing plate 1406 off of and/or over both the shaft 5002 and the flange 5006 of the post 1404. Once the swing plate 1406 has been lifted off of and/or over both the shaft 5002 and the flange 5006 of the post 1404, the swing plate 1406 can be subsequently pivoted (e.g., manually rotated by a user of the portable grill 100) to a location past (e.g., laterally offset from) the post 1404, as generally shown in FIG. 51.

The above-described leg latch assembly 1402 is advantageously configured to latch the rear leg 142 of the first leg unit 136 in a fixed position relative to the frame 120 to prevent movement of the rear leg 142 and/or, more generally, of the first leg unit 136 relative to the frame 120. As a result of first leg unit 136 of the portable grill 100 being mechanically coupled to the second leg unit 158 of the portable grill 100, the latching of the rear leg 142 of the first leg unit 136 in the fixed position relative to the frame 120 additionally prevents movement of the second leg unit 158 relative to the frame 120. When the post 1404 is located in the second post-receiving portion 4906 of the opening 1408 of the swing plate 1406, the leg latch assembly 1402 prevents movement of the first leg unit 136 and/or the second leg unit 158 relative to the frame 120, which in turn prevents movement of the portable grill 100 from the collapsed configuration 1102 into the erected configuration 102. When the post 1404 is located in the first post-receiving portion 4904 of the opening 1408 of the swing plate 1406, and/or when the post 1404 is removed entirely from the opening 1408 of the seeing plate 1406, the leg latch assembly 1402 enables movement of the first leg unit 136 and/or the second leg unit 158 relative to the frame 120, which in turn enables movement of the portable grill 100 from the collapsed configuration 1102 into the erected configuration 102.

The portable grill 100 of FIGS. 1-20 further includes an example lid lock assembly 188 configured to restrict (e.g., prevent) the lid 106 of the portable grill 100 from opening relative to the cookbox 104 of the portable grill 100 when the portable grill 100 is positioned in the collapsed configuration 1102 shown in FIGS. 11-20. The lid lock assembly 188 is further configured to enable the lid 106 to open relative to the cookbox 104 when the portable grill 100 is positioned in the erected configuration 102 shown in FIGS. 1-10. In some examples, one or more portion(s) of one or more component(s) of the lid lock assembly 188 is/are located and/or positioned within one or more rail(s) (e.g., the front rail 122, the right side rail 126, and/or the left side rail 128) of the frame 120 of the portable grill such that said portion(s) of said component(s) of the lid lock assembly 188 is/are partially or fully concealed from exposure, thereby advantageously reducing wear on, and/or reducing the possibility of mechanical damage to, the concealed portion(s) of the component(s) of the lid lock assembly 188.

In some examples, movement and/or actuation of the lid lock assembly 188 from an unlocked configuration (e.g., which enables the lid 106 to open relative to the cookbox 104) into a locked configuration (e.g., which prevents the lid 106 from opening relative to the cookbox 104) occurs automatically in response to the front leg 140 of the first leg unit 136 and/or the front leg 162 of the second leg unit 158 engaging and/or contacting one or more actuatable component(s) of the lid lock assembly 188 in connection with the portable grill 100 being transitioned from the erected configuration 102 shown in FIGS. 1-10 into the collapsed configuration 1102 shown in FIGS. 11-20. Thus, the lid lock assembly 188 advantageously provides a mechanically-automated failsafe against the possibility of the lid 106 opening relative to the cookbox 104 when the portable grill 100 is positioned in the collapsed configuration 1102, as may occur when the portable grill 100 is being transported and/or stowed.

Figure 52:
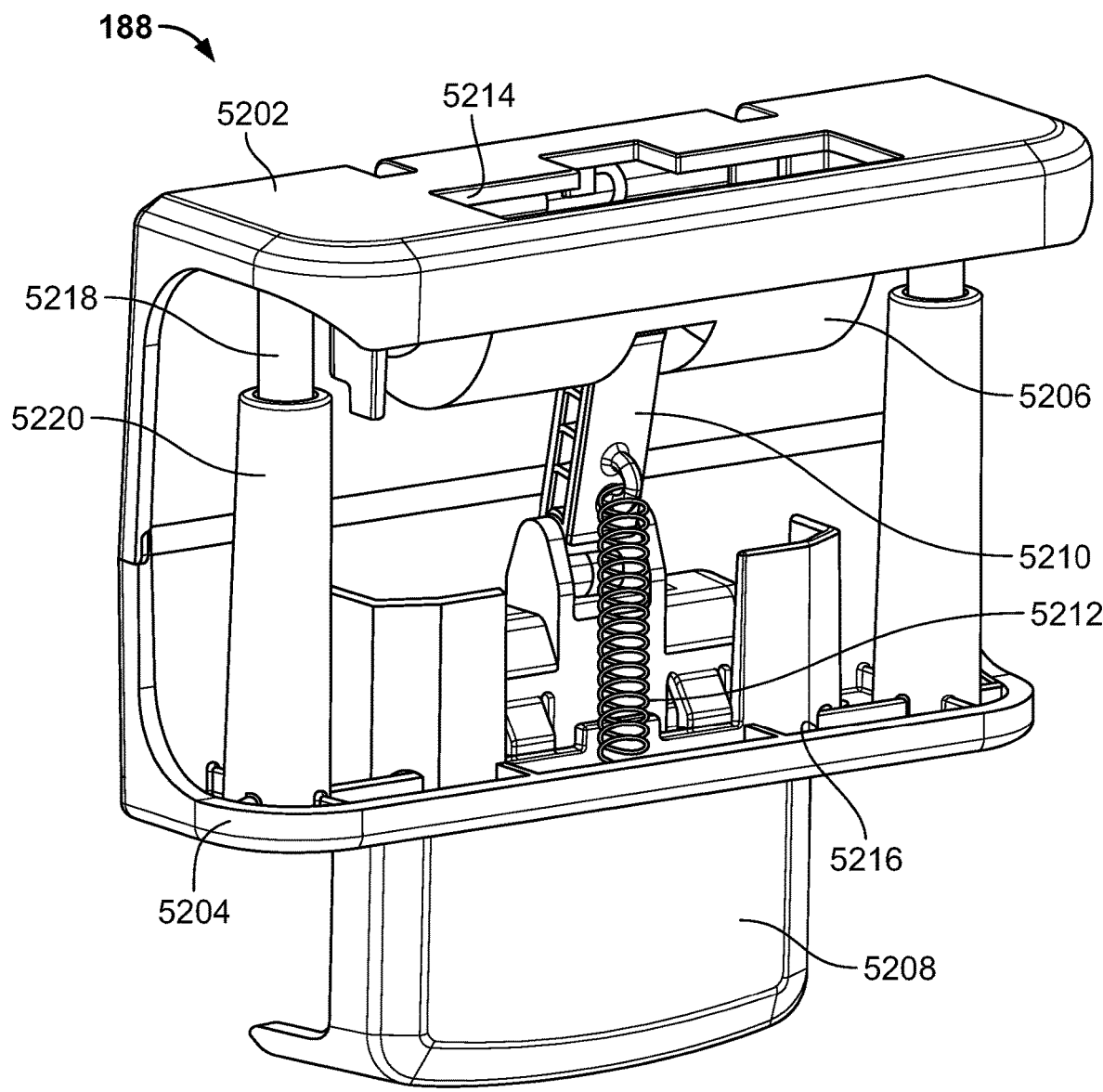
FIG. 52 is a first perspective view of the lid lock assembly of the portable grill of FIGS. 1-20, with the lid lock assembly shown in isolation.
Figure 53:
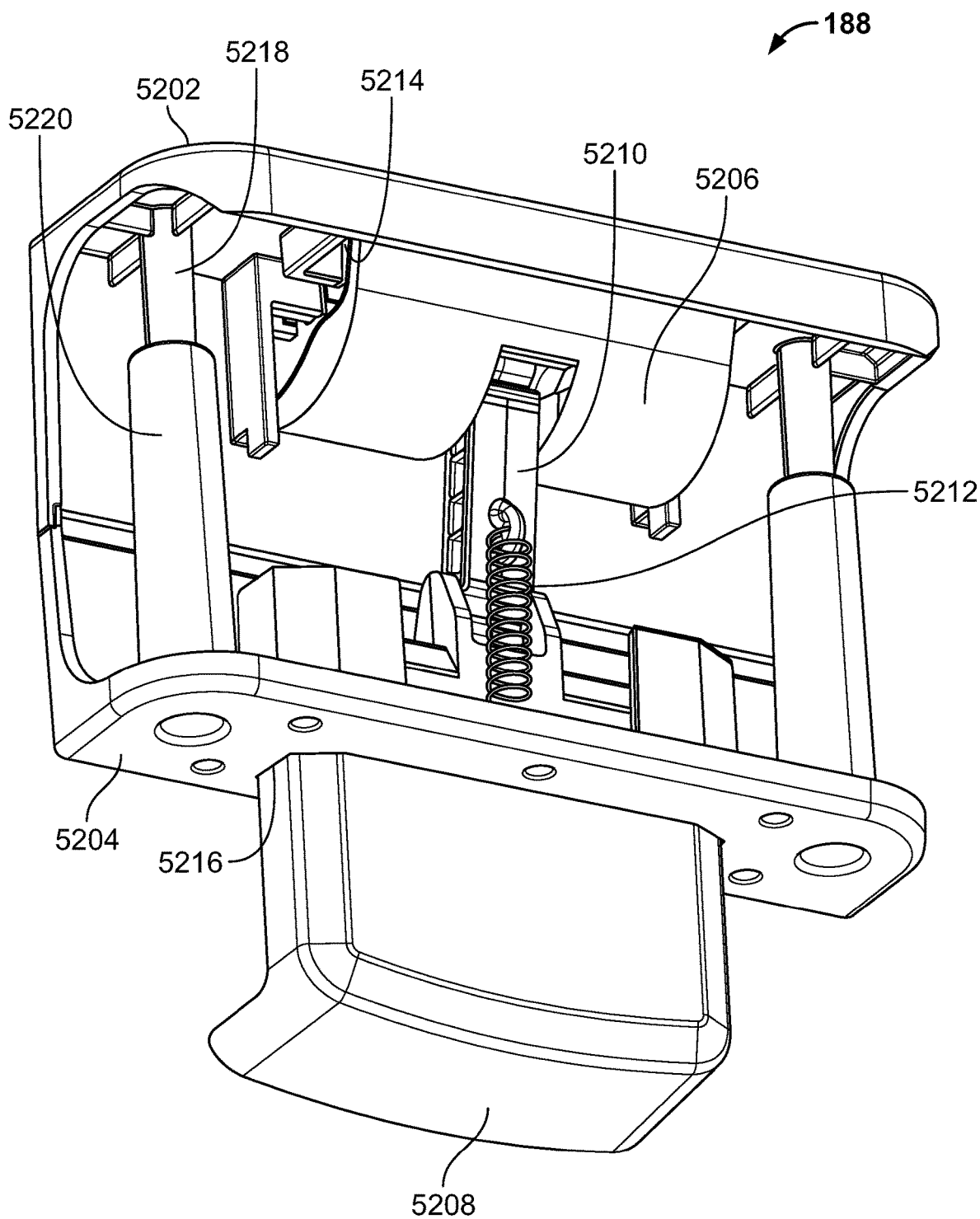
FIG. 53 is a second perspective view of the lid lock assembly of the portable grill of FIGS. 1-20, with the lid lock assembly shown in isolation.
Figure 54:
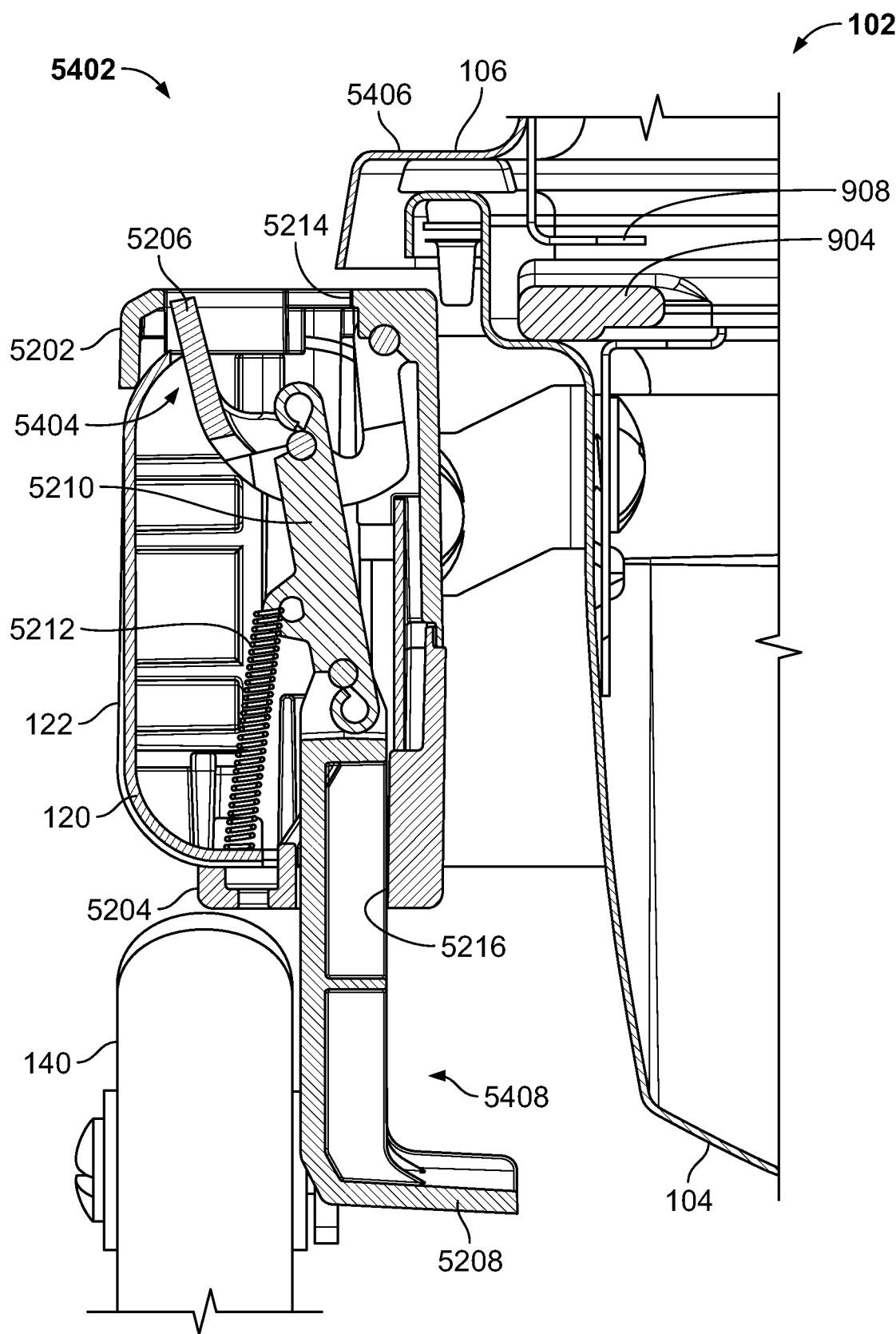
FIG. 54 illustrates the lid lock assembly of the portable grill of FIGS. 1-20 positioned in an example unlocked configuration.
Figure 55:
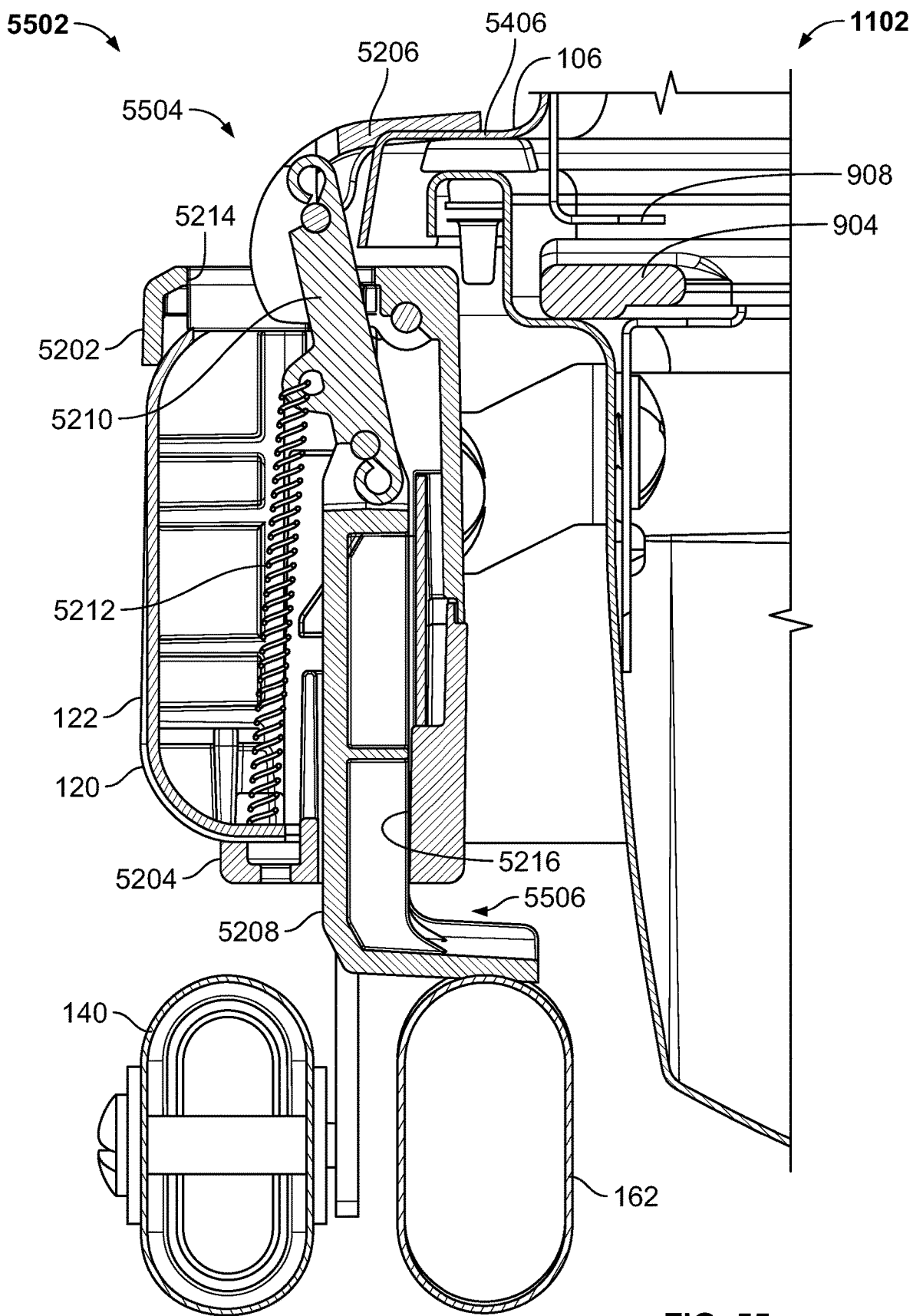
FIG. 55 illustrates the lid lock assembly of the portable grill of FIGS. 1-20 positioned in an example locked configuration.

FIGS. 52-55 further illustrate the lid lock assembly 188 of the portable grill 100 of FIGS. 1-20. FIG. 52 is a first perspective view of the lid lock assembly 188 in isolation. FIG. 53 is a second perspective view of the lid lock assembly 188 in isolation. FIG. 54 illustrates the lid lock assembly 188 positioned in an example unlocked configuration 5402, as may occur when the portable grill 100 is positioned in the erected configuration 102 shown in FIGS. 1-10. FIG. 55 illustrates the lid lock assembly 188 positioned in an example locked configuration 5502, as may occur when the portable grill 100 is positioned in the collapsed configuration 1102 shown in FIGS. 11-20.

As shown in FIGS. 52-55, the lid lock assembly 188 of the portable grill 100 includes an example upper housing 5202, an example lower housing 5204, an example locking flange 5206, an example lever 5208, an example link 5210, and an example tension spring 5212. The upper housing 5202 of the lid lock assembly 188 includes an example slot 5214 configured to receive the locking flange 5206 of the lid lock assembly 188 such that a portion of the locking flange 5206 is rotatable through the slot 5214 of the upper housing 5202. The lower housing 5204 of the lid lock assembly 188 includes an example slot 5216 configured to receive the lever 5208 of the lid lock assembly 188 such that a portion of the lever 5208 is slidable through the slot 5216 of the lower housing 5204.

The upper housing 5202 and the lower housing 5204 of the lid lock assembly 188 are rigidly coupled to one another via one or more fastener(s) extending through example upper bosses 5218 of the upper housing 5202 and example lower bosses 5220 of the lower housing 5222. The upper housing 5202 and the lower housing 5204 and respectively configured to couple the lid lock assembly 188 to the front rail 122 of the frame 120 of the portable grill 100. In the illustrated example of FIGS. 52-55, one or more portion(s) of the locking flange 5206, the lever 5208, the link 5210, the tension spring 5212, the upper bosses 5218, and the lower bosses 5220 are located and/or positioned within the front rail 122 of the frame 120 and partially or fully concealed from exposure, thereby advantageously reducing wear on, and/or reducing the possibility of mechanical damage to, the concealed portion(s) of the locking flange 5206, the lever 5208, the link 5210, the tension spring 5212, the upper bosses 5218, and the lower bosses 5220 of the lid lock assembly 188.

The locking flange 5206 of the lid lock assembly 188 is pivotally coupled to the upper housing 5202 of the lid lock assembly 188 such that the locking flange 5206 can be rotated relative to the upper housing 5202 (e.g., through the slot 5214 of the upper housing 5202) between an example lowered position 5404 associated with the unlocked configuration 5402 of the lid lock assembly 188 (e.g., as shown in FIG. 54) and an example raised position 5504 associated with the locked configuration 5502 of the lid lock assembly 188 (e.g., as shown in FIG. 55). When the locking flange 5206 is in the lowered position 5404 shown in FIG. 54, the locking flange 5206 does not cover, block, restrict, and/or otherwise interfere with any portion of the lid 106 of the portable grill 100, and the lid 106 of the portable grill 100 accordingly remains free to move (e.g., from a closed position into and open position, and vice-versa) relative to the cookbox 104 of the portable grill 100. When the locking flange 5206 is in the raised position 5504 shown in FIG. 55, the locking flange 5206 covers, blocks, restricts, and/or otherwise interferes with an example lip 5406 (e.g., an outwardly extending flange) of the lid 106 of the portable grill 100, thereby locking the lid 106 in a closed position relative to the cookbox 104 of the portable grill 100. When the lid 106 is locked in the closed position relative to the cookbox 104 via the locking flange 5206, the locking flange 5206 blocks and/or prevents the lid 106 from opening relative to the cookbox 104.

The lever 5208 of the lid lock assembly 188 is slidably coupled to the lower housing 5204 of the lid lock assembly 188 such that the lever 5208 can be moved (e.g., slid) relative to the lower housing 5204 (e.g., through the slot 5216 of the lower housing 5204) between an example lowered position 5408 associated with the unlocked configuration 5402 of the lid lock assembly 188 (e.g., as shown in FIG. 54) and an example raised position 5506 associated with the locked configuration 5502 of the lid lock assembly 188 (e.g., as shown in FIG. 55). The link 5210 of the lid lock assembly 188 extends between and is pivotally coupled (e.g., via one or more fastener(s)) to the locking flange 5206 and to the lever 5208. The link 5210 operatively couples the locking flange 5206 to the lever 5208 such that movement of the lever 5208 is transferred from the lever 5208 to the link 5210, and from the link 5210 to the locking flange 5206. In this regard, the link 5210 is configured to transfer and/or convert sliding movement of the lever 5208 into rotational movement of the locking flange 5206. Accordingly, the locking flange 5206 is positioned in the lowered position 5404 described above when the lever 5208 is positioned in the lowered position 5408 shown in FIG. 54. Conversely, the locking flange 5206 is positioned in the raised position 5504 described above when the lever 5208 is positioned in the raised position 5506 shown in FIG. 55.

The tension spring 5212 of the lid lock assembly 188 is coupled at a first end to the link 5210 of the lid lock assembly 188, and is further coupled at a second end opposite the first end to the lower housing 5204 of the lid lock assembly 188, thereby directly biasing the link 5210 downward (e.g., in a direction toward the bottom of lower housing 5204), and indirectly biasing the locking flange 5206 into the lowered position 5404 and/or the lever 5208 into the lowered position 5408 respectively shown in FIG. 54. The lever 5208 is configured to move (e.g., slide) from the lowered position 5408 into the raised position 5506 shown in FIG. 55 in response to the front leg 140 of the first leg unit 136 and/or the front leg 162 of the second leg unit 158 of the portable grill 100 contacting the lever 5208 and forcing the lever 5208 upwards (e.g., against the biasing force produced by the tension spring 5212) in connection with the portable grill 100 being transitioned from the erected configuration 102 shown in FIGS. 1-10 into the collapsed configuration 1102 shown in FIGS. 11-20.

When the lid lock assembly 188 is positioned in the unlocked configuration 5402 shown in FIG. 54, as occurs when the portable grill 100 is positioned in the erected configuration 102 shown in FIGS. 1-10, the lever 5208 is in the lowered position 5408, the locking flange 5206 is in the lowered position 5404, and the lid 106 of the portable grill 100 is free to open relative to the cookbox 104 of the portable grill 100. Conversely, when the lid lock assembly 188 is positioned in the locked configuration 5502 shown in FIG. 55, as occurs when the portable grill 100 is positioned in the collapsed configuration 1102 shown in FIGS. 11-20, the lever 5208 is in the raised position 5506, the locking flange 5206 is in the raised position 5504, and the lid 106 of the portable grill 100 is blocked and/or prevented from opening relative to the cookbox 104 of the portable grill 100.

Figure 56:
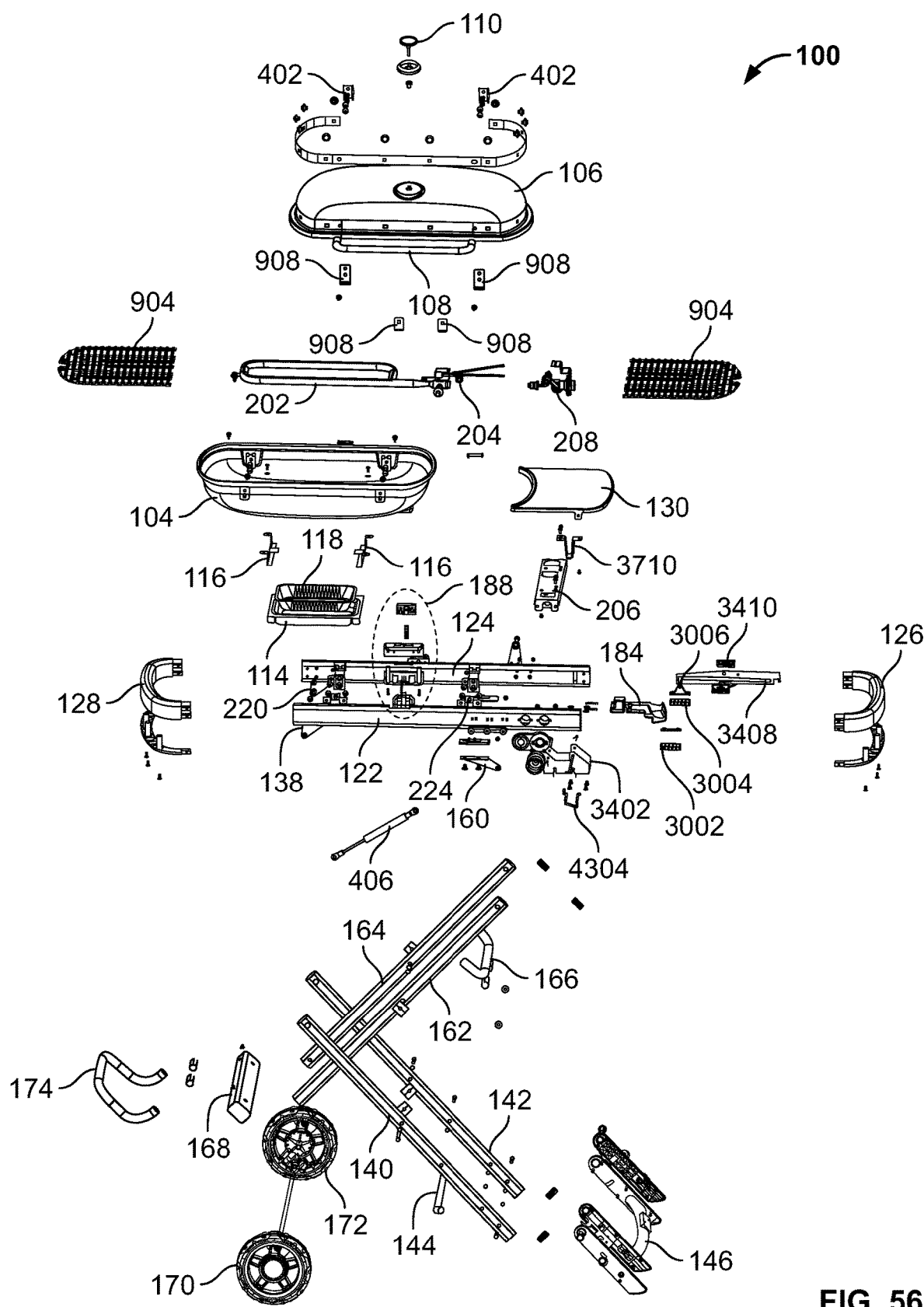
FIG. 56 is an exploded view of the portable grill of FIGS. 1-20.

FIG. 56 is an exploded view of the portable grill 100 of FIGS. 1-20, showing numerous parts and/or components of the portable grill 100 in an unassembled or partially unassembled state, including parts and/or components of the portable grill 100 that may otherwise be covered, concealed, hidden, and/or not entirely visible in the views of the portable grill 100 provided via FIGS. 1-20 and described above.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A portable grill movable between an erected configuration and a collapsed configuration, the portable grill comprising:
   a valve and regulator assembly having a tank connector, the tank connector configured to removably couple a fuel tank to the valve and regulator assembly; and
   a tank blocker configured to prevent the portable grill from being moved from the erected configuration into the collapsed configuration when the portable grill is in the erected configuration and the fuel tank is coupled to the tank connector, the tank blocker movable from a blocked configuration into an unblocked configuration, the tank blocker configured to:
      prevent movement of the portable grill from the erected configuration into the collapsed configuration when the tank blocker is in the blocked configuration; and
      enable movement of the portable grill from the erected configuration into the collapsed configuration when the tank blocker is in the unblocked configuration;
   wherein movement of the tank blocker from the blocked configuration into the unblocked configuration occurs automatically in response to the fuel tank being uncoupled from the tank connector.

2. The portable grill of claim 1, wherein the tank blocker is operatively coupled to a leg lock assembly of the portable grill, the leg lock assembly including a handle actuatable to unlock a leg unit of the portable grill, the unlocking of the leg unit to enable movement of the portable grill from the erected configuration into the collapsed configuration.

3. The portable grill of claim 2, wherein the leg lock assembly further includes a lever, the handle coupled to the lever and slidable relative to the lever between a retracted position and an extended position.

4. The portable grill of claim 3, wherein the leg lock assembly further includes a spring configured to bias the handle into the retracted position.

5. The portable grill of claim 3, wherein the lever includes a first notch and the handle includes a second notch, the first notch being aligned with the second notch when the handle is in the retracted position, the first notch being offset from the second notch when the handle is in the extended position.

6. The portable grill of claim 5, wherein the tank blocker includes an arm pivotally coupled to the lever, the arm being receivable within the first notch and the second notch when the handle is in the retracted position, the arm being blocked from being received within the first notch and the second notch when the handle is in the extended position.

7. The portable grill of claim 6, wherein the tank blocker is configured to:
   enable an uncoupled fuel tank to become coupled to the tank connector when the handle is in the retracted position; and
   prevent an uncoupled fuel tank from becoming coupled to the tank connector when the handle is in the extended position.

8. The portable grill of claim 5, wherein the tank blocker includes a wire form having a first arm, a second arm spaced apart from the first arm, and a central portion extending between the first and second arms, the first and second arms pivotally coupled to the lever.

9. The portable grill of claim 8, wherein the central portion includes a contoured profile configured to complement a contoured profile of the fuel tank.

10. A portable grill movable between an erected configuration and a collapsed configuration, the portable grill comprising:
   a valve and regulator assembly having a tank connector, the tank connector configured to removably couple a fuel tank to the valve and regulator assembly; and
   a tank blocker including a wire form, the wire form having a first arm, a second arm spaced apart from the first arm, and a central portion extending between the first and second arms, the central portion having a contoured profile configured to complement a contoured profile of the fuel tank, the tank blocker configured to prevent the portable grill from being moved from the erected configuration into the collapsed configuration when the portable grill is in the erected configuration and the fuel tank is coupled to the tank connector, the tank blocker movable from a blocked configuration into an unblocked configuration, the tank blocker configured to:
      prevent movement of the portable grill from the erected configuration into the collapsed configuration when the tank blocker is in the blocked configuration; and enable movement of the portable grill from the erected configuration into the collapsed configuration when the tank blocker is in the unblocked configuration;

wherein movement of the tank blocker from the blocked configuration into the unblocked configuration occurs automatically in response to the fuel tank being uncoupled from the tank connector.

11. The portable grill of claim 10, wherein the tank blocker is operatively coupled to a leg lock assembly of the portable grill, the leg lock assembly including a handle actuatable to unlock a leg unit of the portable grill, the unlocking of the leg unit to enable movement of the portable grill from the erected configuration into the collapsed configuration.

12. The portable grill of claim 11, wherein the leg lock assembly further includes a lever, the first and second arms pivotally coupled to the lever, the handle coupled to the lever and slidable relative to the lever between a retracted position and an extended position.

13. The portable grill of claim 12, wherein the leg lock assembly further includes a spring configured to bias the handle into the retracted position.

14. The portable grill of claim 12, wherein the lever includes a first notch and the handle includes a second notch, the first notch being aligned with the second notch when the handle is in the retracted position, the first notch being offset from the second notch when the handle is in the extended position.

15. The portable grill of claim 14, wherein the first arm is receivable within the first notch and the second notch when the handle is in the retracted position, and wherein the first arm is blocked from being received within the first notch and the second notch when the handle is in the extended position.

16. The portable grill of claim 15, wherein the tank blocker is configured to:
  enable an uncoupled fuel tank to become coupled to the tank connector when the handle is in the retracted position; and
  prevent the uncoupled fuel tank from becoming coupled to the tank connector when the handle is in the extended position.

* * * * *